US012572905B1

(12) United States Patent
Duane

(10) Patent No.: US 12,572,905 B1
(45) Date of Patent: Mar. 10, 2026

(54) AUTOMATED EVENT TRACKING AND CONDITIONAL ASSET TRANSFER

(71) Applicant: Block, Inc., Oakland, CA (US)

(72) Inventor: Michael Duane, San Francisco, CA (US)

(73) Assignee: Block, Inc., Oakland, CA (US)

( * ) Notice: Subject to any disclaimer, the term of this patent is extended or adjusted under 35 U.S.C. 154(b) by 170 days.

(21) Appl. No.: 17/985,103

(22) Filed: Nov. 10, 2022

(51) Int. Cl.
G06Q 20/10 (2012.01)
(52) U.S. Cl.
CPC .................................... G06Q 20/10 (2013.01)
(58) Field of Classification Search
CPC .................................................. G06Q 20/10
USPC .......................................................... 705/39
See application file for complete search history.

(56) References Cited

U.S. PATENT DOCUMENTS

| | | | |
|---|---|---|---|
| 8,401,968 | B1 | 3/2013 | Schattauer et al. |
| 11,514,437 | B1 | 11/2022 | Jarosch et al. |
| 11,588,802 | B2 | 2/2023 | Way |
| 2009/0144193 | A1 | 6/2009 | Giordano et al. |
| 2011/0202874 | A1 | 8/2011 | Ramer et al. |
| 2012/0143753 | A1 | 6/2012 | Gonzalez et al. |

| | | | | |
|---|---|---|---|---|
| 2012/0150731 | A1 | 6/2012 | Isaacson et al. | |
| 2012/0290950 | A1 | 11/2012 | Rapaport et al. | |
| 2015/0006426 | A1 | 1/2015 | Sobhani et al. | |
| 2016/0117651 | A1 | 4/2016 | Davis | |
| 2016/0117665 | A1 | 4/2016 | Davis | |
| 2016/0117666 | A1 | 4/2016 | Davis | |
| 2016/0117670 | A1 | 4/2016 | Davis | |
| 2019/0392536 | A1* | 12/2019 | Rice | H04L 9/0643 |
| 2020/0294128 | A1* | 9/2020 | Cella | H04L 9/3239 |
| 2021/0174435 | A1 | 6/2021 | Reses et al. | |
| 2023/0045946 | A1 | 2/2023 | Duane et al. | |
| 2023/0047509 | A1 | 2/2023 | Dhodapkar | |

* cited by examiner

*Primary Examiner* — Cho Yiu Kwong
(74) *Attorney, Agent, or Firm* — Polsinelli PC

(57) ABSTRACT

Systems and methods for conditional asset transfers based on outcomes of events are provided. An event-based transfer system stores a record for a conditional asset transfer based on an outcome of an event based on a corresponding request. The system monitors information sources and/or feeds (e.g., of sensors, news sources, social media, etc.) to monitor and/or track the status of the event. The system determines when the outcome of the event becomes settled, and determines, based on the record, a direction of the conditional asset transfer based on the settled outcome of the event. The system automatically alerts user device(s) of user(s) participating in the transfer, and automatically facilitates processing of the transfer of the asset in the direction based on the settled outcome.

20 Claims, 15 Drawing Sheets

USER INTERFACE 505
OF LOCAL APP 510
(E.G., COND. TX. APP)
OF USER DEVICE 515
*Adam*
**Event 520:
Gaming Tournament**
Asset 525 required to enter:
$10
Winner wins asset total 530:
$370 (37 players so far)
Validator 535: GameStation
Schedule 540:
Nov. 20, 2022 at 7:00pm
ACCEPT    REJECT
Invite Bella!
FIG. 5

BLOCKCHAIN LEDGER 600

| BLOCK A 605 | BLOCK B 635 | BLOCK C 665 |
|---|---|---|
| BLOCK A HEADER 610 | BLOCK B HEADER 640 | BLOCK C HEADER 670 |
| HASH OF PREVIOUS BLOCK AND/OR BLOCK HEADER 615 | HASH OF PREVIOUS BLOCK AND/OR BLOCK HEADER 645 | HASH OF PREVIOUS BLOCK AND/OR BLOCK HEADER 675 |
| MERKLE ROOT 620 | MERKLE ROOT 650 | MERKLE ROOT 680 |
| METADATA (VERSION, TIME, DIFFICULTY, NONCE) 625 | METADATA (VERSION, TIME, DIFFICULTY, NONCE) 655 | METADATA (VERSION, TIME, DIFFICULTY, NONCE) 685 |
| BLOCK A PAYLOAD 630 (E.G., TOKENS, TRANSACTIONS, SMART CONTRACTS) | BLOCK B PAYLOAD 660 (E.G., TOKENS, TRANSACTIONS, SMART CONTRACTS) | BLOCK C PAYLOAD 690 (E.G., TOKENS, TRANSACTIONS, SMARTS CONTRACTS) |

SMART CONTRACT 695

IDENTIFICATION 755:
I HAVE EXECUTED THE SMART CONTRACT CODE, IDENTIFIED THAT A CONDITION IN THE RULES 735 OF THIS SMART CONTRACT HAS BEEN MET (TEAM A WINS), AND IDENTIFIED THE ACTION TO BE TAKEN (TRANSFER OF $50 FROM BELLA TO ADAM)

VERIFICATION 760A:
I HAVE EXECUTED THE SMART CONTRACT CODE, VERIFIED THAT THE CONDITION IN THE RULES 735 OF THIS SMART CONTRACT HAS BEEN MET (TEAM A WINS), AND IDENTIFIED THE ACTION TO BE TAKEN (TRANSFER OF $50 FROM BELLA TO ADAM)

VERIFICATION 760B:
I HAVE EXECUTED THE SMART CONTRACT CODE, VERIFIED THAT THE CONDITION IN THE RULES 735 OF THIS SMART CONTRACT HAS BEEN MET (TEAM A WINS), AND IDENTIFIED THE ACTION TO BE TAKEN (TRANSFER OF $50 FROM BELLA TO ADAM)

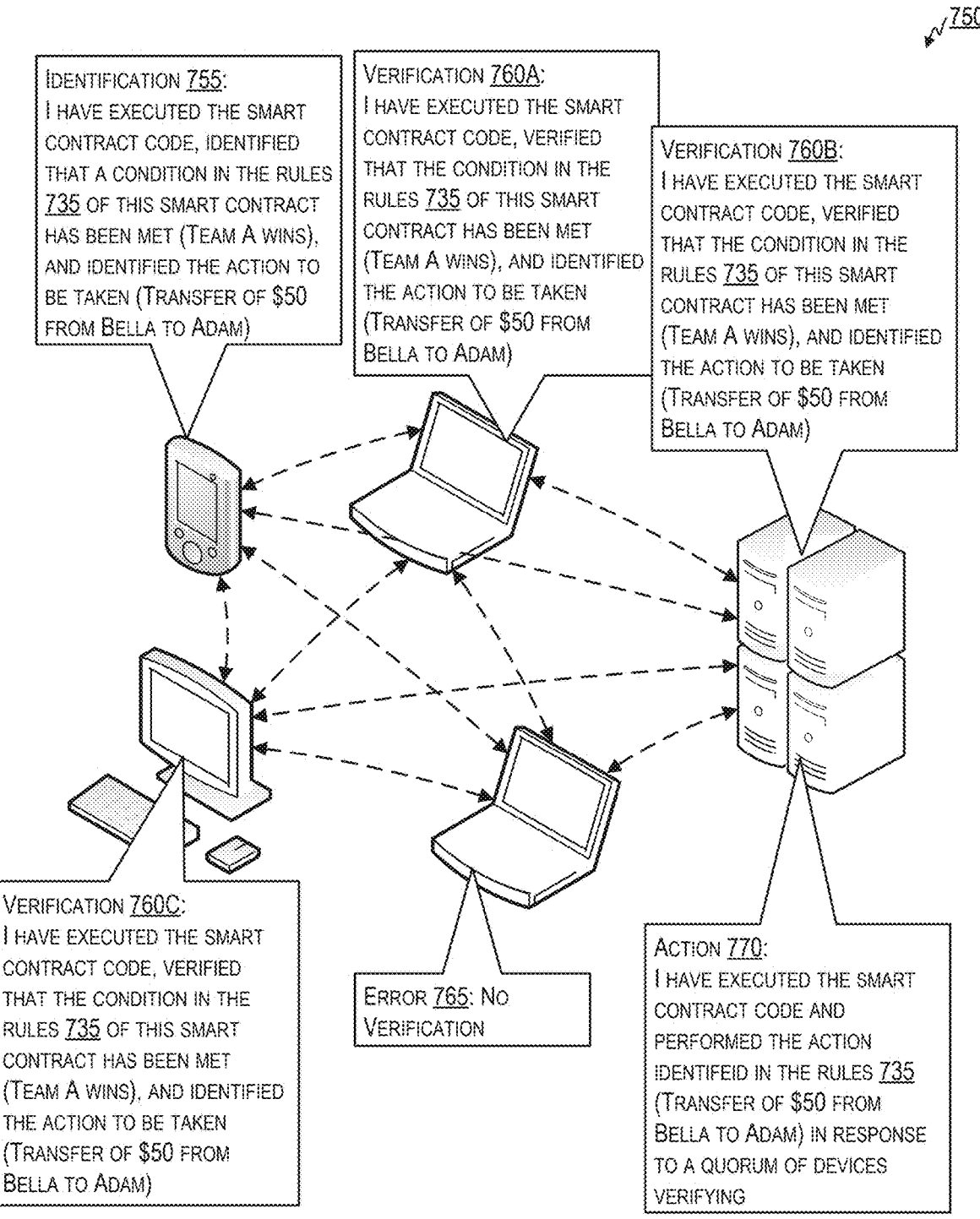

VERIFICATION 760C:
I HAVE EXECUTED THE SMART CONTRACT CODE, VERIFIED THAT THE CONDITION IN THE RULES 735 OF THIS SMART CONTRACT HAS BEEN MET (TEAM A WINS), AND IDENTIFIED THE ACTION TO BE TAKEN (TRANSFER OF $50 FROM BELLA TO ADAM)

ERROR 765: NO VERIFICATION

ACTION 770:
I HAVE EXECUTED THE SMART CONTRACT CODE AND PERFORMED THE ACTION IDENTIFEID IN THE RULES 735 (TRANSFER OF $50 FROM BELLA TO ADAM) IN RESPONSE TO A QUORUM OF DEVICES VERIFYING

FIG. 7B

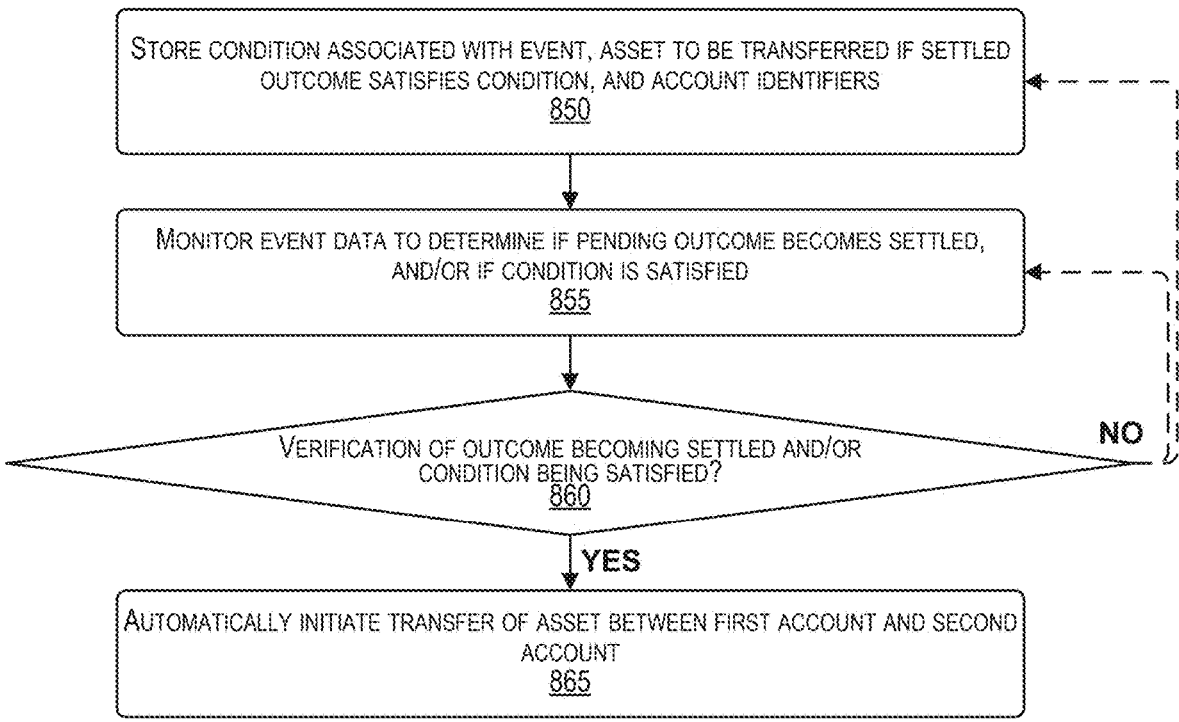
FIG. 8B

AUTOMATED EVENT TRACKING AND CONDITIONAL ASSET TRANSFER

TECHNICAL FIELD

Events can include sports, video games, elections, races, workouts, and other occurrences that eventually reach an outcome. Information about events can be obtained from various sources, such as news portals, stock tickers, sports score portals, social media portals, and weather portals. Information about events can be dynamic and can change from one moment to the next as a status of the event unfolds. For instance, at one moment, a first team may be winning a game, but at the next moment, a second game may be winning the game, for instance after the second team scores a goal. The status of the game, like many events, may change multiple times over the course of the game, until eventually the outcome of the game is settled, for instance when one of the teams eventually wins the game. Technology is usable to track statuses of events in real-time or near-real-time and for providing such statuses to one or more downstream applications via integrations.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features. Moreover, multiple instances of the same part are designated by a common prefix, in some cases separated from the instance number by a dash and/or parentheses. The drawings are not to scale.

FIG. 5 is a conceptual diagram illustrating examples of a user interface for an automated conditional transfer associated with a video game tournament event in a local application associated with the event-based transfer system on a user device, in accordance with some examples;

FIG. 6 is a block diagram illustrating three consecutive blocks of a blockchain ledger that may be used as a condition data store for conditional asset transfer system(s), in accordance with some examples;

FIG. 7B is a conceptual diagram illustrating execution of a smart contract, in accordance with some examples;

FIG. 8B is a flow diagram illustrating a process for event-based asset transfer, in accordance with some examples;

DETAILED DESCRIPTION

Figure 1:
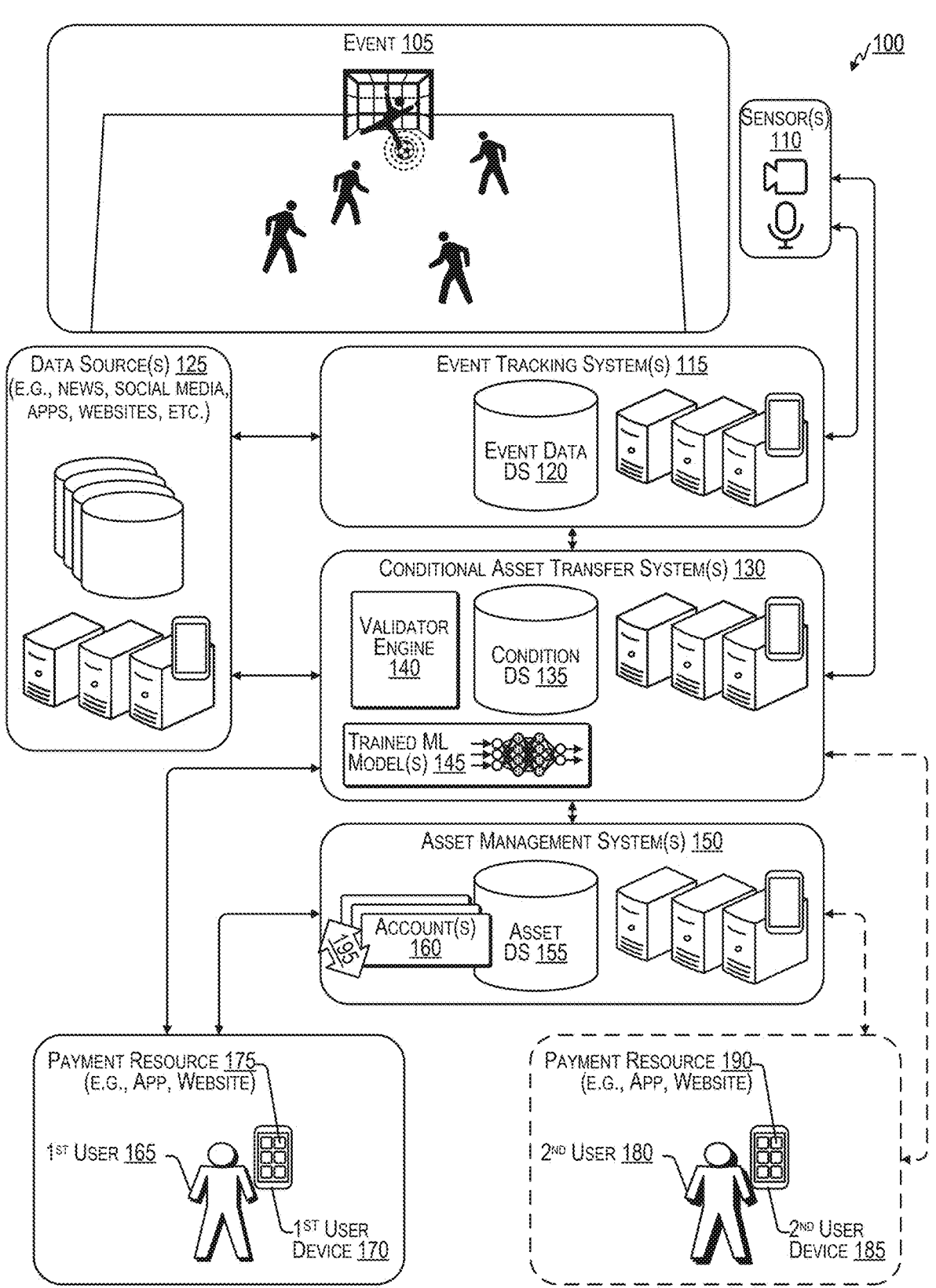
FIG. 1 is a block diagram illustrating an architecture of an event-based transfer system, in accordance with some examples.

Systems and methods for conditional asset transfers based on outcomes of events are described herein. In some examples, an event-based transfer system monitors information sources and/or feeds to monitor and/or track the status of an event, such as a sports game, a video game, an election, a race, a workout, or another event that eventually reaches an outcome. In some examples, the information sources and/or feeds that the event-based transfer system monitors can include sensors, news portals, video game portals, stock tickers, sports score portals, social media portals, weather portals, other resources (e.g., websites, apps, and/or portals) described herein, or combinations thereof. The information gathered by the event-based transfer system from these information sources and/or feeds may be referred to as event data, event information, event status data, event status information, information about the event, contextual data, and/or contextual information.

In some examples, the systems and methods disclosed herein store information about a conditional transfer in response to receipt of a request for a conditional transfer. For instance, an event-based transfer system can receive a request to set up an automated transfer associated with a pending outcome of an event. The request may be received from a user device and/or from another component of the event-based transfer system. In some examples, the automated transfer is a transfer of a specified amount of a specified asset between a first account associated with a first user and a second account. In some examples, the second account is associated with a second user, in which case the event-based transfer system can wait to receive agreement from the first user and the second user as to the amount, the asset, and a direction of transfer of the amount of the asset based on the outcome of the event. In an illustrative example, the event can be a sports game between Team A and Team B. Users Adam and Bella can agree to a transfer of $50 based on the outcome of the event, with different directions of transfer based on different outcomes. For instance, if the outcome of the sports game settles, and Team A wins, then the transfer goes in a first direction, with the $50 being transferred from Bella's account to Adam's account. If the outcome of the sports game settles, and Team B wins, then the transfer goes in a second direction, with the $50 being transferred from Adam's account to Bella's account. In some examples, the systems and methods disclosed herein store the information as to the amount, the asset, and a direction of transfer of the amount of the asset based on the outcome of the event in a distributed ledger, such as a blockchain ledger. In some examples, the second account is not associated with an individual person, but is instead associated with a different entity, such a charity, a business, or another organization. For instance, the event-based transfer system can be requested to initiate a transfer of a specified amount of a specified asset to a charity if a user reaches a personal milestone in the user's workout. In some examples, the first and second user may represent different accounts associated the same user, such that an event-based transfer can cause funds to be transferred from a first account of a user to a second account of the user.

In some examples, the systems and methods disclosed herein validate and/or verify event data to determine when the outcome of the event changes from pending to settled, to determine what the settled outcome of the event ultimately is, and to determine the direction of asset transfer based on the settled outcome. For instance, while an event is pending, an event-based transfer system can track and/or monitor the pending outcome. For instance, in a sports game, at one moment, a first team may be winning a game, but at the next moment, a second game may be winning the game, for instance after the second team scores a goal. The status of the game, like many events, may change multiple times over the course of the game, until eventually the outcome of the game is settled, for instance when one of the teams eventually wins the game. The event-based transfer system can determine when the event outcome is settled, for instance by comparing the monitored event data to rules of the sports game (or other event) that indicate when the sports game is over and the event outcome is thus settled. The event-based transfer system can determine what the settled outcome is, for instance by parsing and/or interpreting event data from an information source, by monitoring sensor data at the end of the event, and the like. The event-based transfer system can determine the direction of transfer of the specified amount of the specified asset, for instance based on a comparison of the settled outcome to the initial request for the conditional transfer. In some examples, the systems and methods disclosed herein use smart contract(s) to store the conditions for the transfer, to validate the outcome of the event, and/or to facilitate the transfer of the amount of the asset.

In some examples, the systems and methods disclosed herein hold the amount of the asset in escrow until the event has a settled outcome, and then automatically transfers the amount of the asset from escrow to the appropriate party associated with the settled outcome in the request for the conditional transfer. In some examples, the systems and methods disclosed herein have more than two participants to a conditional transfer, for instance allowing multiple users for each of multiple possible outcomes of the event. In some examples, the systems and methods disclosed herein allow conditional transfers to expire after a predetermined expiration time period, for instance automatically returning the amount(s) of the asset(s) to their original holders if the event does not happen or the outcome is not settled once the predetermined expiration time period has passed. In some examples, the systems and methods disclosed herein can allow for one or more users to dispute the outcome (e.g., based on the outcome still pending rather than actually being settled, based on the settled outcome being incorrectly determined, and/or based on the direction of transfer being incorrectly determined), causing the systems and methods to re-evaluate whether the outcome is actually settled or still pending, whether the settled outcome was correctly determined, and/or whether the direction of transfer was correctly determined. The systems and methods can reverse the transfer if it turns out that the outcome is still pending rather than actually being settled, if the settled outcome is incorrectly determined, and/or if the direction of transfer is incorrectly determined.

By providing such an end-to-end framework, the techniques and systems described herein provide a technical improvement over other systems that only provide information about events (e.g., news platforms, social media platforms, sports score portals, etc.), which are inefficient because they only provide an avenue to track the status of an event without a way to do anything about the status of the event. The techniques and systems described herein also provide a technical improvement over other systems that only facilitate asset transfers, which are inefficient because they do not provide the type of automation, conditions, or rules to transfers that are provided using the techniques and systems described herein. For instance, the techniques and systems described herein can automatically analyze dynamic information sources (e.g., in real-time or near-real-time) to track a pending outcome of an event, can automatically determine when the pending outcome becomes a settled outcome of the event, can automatically determine a direction of transfer of a specified amount of a specified asset based on the settled outcome, and can automatically facilitate transfer of the specified amount of the specified asset in the between accounts according to the determined direction. As used here, "automatic" or "automatically" can refer to the performance of one or more operations without input, or further input, from a user at the time the operation(s) are performed. Automation of the outcome verification and transfer is efficient and frictionless, and allows for the transfer of the amount of the asset to be automatically transferred without any further interaction(s) with any user interface by any user after the initial request (and, in some cases, confirmation(s) by participating user(s)). This improves efficiency in the user interface and experience, and also dramatically reduces bandwidth usage and data storage requirements by limiting user interface interactions that the user(s) conduct to process the transfer.

In some examples, the event-based transfer system addresses an Internet-centric challenge of alerting a user with time-sensitive information (e.g., regarding a settled outcome of an event and/or the resulting transfer) even when the user mobile device is offline, for instance by activating the local application on the user mobile device when the event-based transfer system and/or the user mobile device come online, and/or by causing the event-based transfer system and/or the user mobile device to come online and activate the local application. The event-based transfer system addresses an Internet-centric challenge of alerting a user with time-sensitive information (e.g., regarding the settled outcome of the event and/or the resulting transfer) even when an associated local application is closed or in the background, for instance by bringing the local application on the user mobile device from the background or closed state to a foreground state, which can be referred to as surfacing the local application.

In some examples, the techniques and systems described herein further provide conditional transfers based on outcomes of events that are customized, personalized, and/or tailored to different users, different events, different outcomes, and different assets. The customization may be stored at system(s) (e.g., server(s) and/or distributed ledger(s)) that can be remote from user device(s) of the user(s) to whom the conditional transfers are personalized to. In some examples, the event-based transfer system provides user-level customization even when sifting through enormous volumes of data in dynamic event information feeds without becoming intractably complex, for instance, by comparing information about the events to stored information about the conditional transfer (e.g., identifying what outcome(s) trigger the transfer). This improves efficiency in the user interface and experience, and also dramatically reduces bandwidth usage and data storage requirements by limiting what is shared with users to recommended causes that are determined to be relevant to the user.

In some examples, the techniques and systems described herein further provide customized interactive elements, such as specially configured identifiers having a particular syntax, quick response (QR) codes, or near field communication (NFC) tags, that can be generated on-the-fly, for example, in response to initiating the conditional transfer for the event. The customized interactive elements can provide a frictionless way to allow another user to join as parties to the conditional transfer, for instance by using the user device of the other user to scan the QR code, tap the NFC tag, or otherwise interact with the interactive element. In some examples, the interaction with the interactive element provides a technical solution to improve security by providing additional factors of authentication (e.g., two-factor authentication or N-factor authentication, where Nis greater than or equal to two) for the conditional transfer, on top of other factors of authentication such as passwords, personal identification number (PIN) codes, signatures, biometric sensor-based authentication, and the like.

In some examples, the techniques and systems described herein further provide for new kinds of storage elements (e.g., files, ledgers) that are tailored to different users and allow an event-based transfer system to automatically identify satisfaction of a condition—a specific settled outcome to an event—and even automatically conduct an associated transfer, all even before a user device has detected the settled outcome.

In some examples, the techniques and systems described herein uses an unconventional distributed architecture to automatically monitor and track event data, to automatically analyze dynamic information sources (e.g., in real-time or near-real-time) to track a pending outcome of an event, to automatically determine when the pending outcome becomes a settled outcome of the event, to automatically determine a direction of transfer of a specified amount of a specified asset based on the settled outcome, and to automatically facilitate transfer of the specified amount of the specified asset in the between accounts according to the determined direction. A centralized system can make it very difficult to keep up with the massive record flows of event data, for instance from sensors and various network-based dynamic data feed systems. Dynamic systems, such as distributed ledgers and smart contracts, can allow the techniques and systems described herein to improve scalability and efficiency, for instance reducing the volume of even data sent to any one system, and spreading computational load from even data analysis from any one system.

Various aspects of the application will be described with respect to the figures. FIG. 1 is a block diagram illustrating an architecture of an event-based transfer system 100. The event-based transfer system 100 can include event tracking system(s) 115 that include one or more computing systems that are configured to track a status (e.g., a pending outcome) of an event 105. The event 105 is illustrated as a soccer game, but can be any type of event discussed herein, such as a sports game, a video game, an election, a race, a workout, or another event that eventually reaches an outcome.

The event tracking system(s) 115 can track the status (e.g., pending outcome) of the event 105 in an event data data store (DS) 120 using sensors 110 located in (or directed toward) an environment in which the event 105 takes place, using information from data source(s) 125, or a combination thereof. The sensors 110 can include, for instance, cameras, microphones, depth sensors, biometric sensors, movement sensors, positioning sensors, and the like. Depth sensors can include, for instance, radio detection and ranging (RADAR) sensors, light detection and ranging (LIDAR) sensors, sound detection and ranging (SODAR) sensors, sound navigation and ranging (SONAR) sensors, structured light sensors, time of flight sensors, stereoscopic camera systems, or combinations thereof. Movement and/or positioning sensors can include, for instance, global navigation satellite system (GNSS) receivers, accelerometers, gyrometers, gyroscopes, inertial measurement units (IMUs), altimeters, barometers, or combinations thereof. Biometric sensors can include, for instance heart rate sensors, breathing rate sensors, blood oxygen sensors, fingerprint recognition sensors, facial recognition sensors, handprint recognition sensors, and the like. For instance, in an illustrative example, the event tracking system(s) 115 can determine that a goal was score in the event 105 by detecting (via object recognition using a video feed from camera(s) of the sensor(s) 110) that the soccer ball entered the goal, by detecting (via audio from microphone(s) of the sensor(s) 110) that the audience is cheering, by detecting movement in the goal itself (e.g., via sensor(s) 110 in the goal itself), or a combination thereof.

The data source(s) 125 can include various types of resources, such as websites, apps, servers, services, feeds, databases, streams, television programs, radio programs, or combinations thereof. Examples of the data source(s) 125 include news resources, video game resources, stock tickers, sports score resources, social media resources, weather resources, financial market resources, other resources (e.g., websites, apps, portals, and/or other types of resources) described herein, or combinations thereof. In some examples, the data source(s) 125 dynamically update with more event data as the event 105 progresses, for instance updating to identify and/or describe developments in the event 105 in real-time or near-real-time as the developments happen in the event 105, shortly after the developments happen in the event 105, and/or as the event 105 progresses. For instance, if the event 105 is a sports game (as illustrated in FIG. 1), the event tracking system 115 can track the score of the game in the event data DS 120, as obtained using sensor(s) 110, news articles that identify the score, sports resource(s) that identify the score, social media posts that identify the score, other resources of the data source(s) 125 that identify the score, or a combination thereof.

Event data may include, and/or be based on, sensor data from the sensor(s) 110, event data from the event tracking system(s) 115, event data from the event data DS 120, data from the data source(s) 125), or a combination thereof. Event data may be referred to as event information, event status data, event status information, information about the event, contextual data, and/or contextual information. Event data can include, for instance, indications that a score of the event 105 (e.g., the score of a game) has changed, indications that at least one specified person has entered a specified region (e.g., a player has entered an endzone), indications that at least one specified person has reached and/or crossed a threshold (e.g., a racer has reached and/or crossed a finish line), indications that at least one specified person has exited a specified region, indications that at least one specified object has entered a specified region (e.g., a ball or puck has entered a goal or basket), indications that at least one specified object has reached and/or crossed a threshold (e.g., a car or other vehicle has reached or crossed a finish line), indications that at least one specified object has exited a specified region, indications that at least one person or object has reached or exceeded a specified speed (e.g., a ball, vehicle, or person has reached or exceeded the specified speed), indications that at least one person or object is moving in a specified direction, indications that at least one person or object has moved at least a specified distance, indications that at least one person or object has moved along a specified path (e.g., a ball reaches a goal or basket from a specific distance or area), indications that at least one person or object has changed state (e.g., location, direction, orientation, speed, altitude, temperature, or another characteristic), indications that at least one person or object has maintained state (e.g., location, direction, orientation, speed, altitude, temperature, or another characteristic) for at least a predetermined amount of time, indications of detection of a specified object or person in image data captured by image sensor(s) of the sensor(s) 110, indications of detection of a specified sound in audio data captured by microphone(s) of the sensor(s) 110, indications of one or more news articles or items about the event 105, indications of one or more social media posts or items about the event 105, indications of weather at the event 105 (or changes thereto), indications of one or more updates in data feeds about the event 105, indications of one or more updates in websites about the event 105, indications of one or more updates in apps about the event 105, indications of one or more updates in other resources about the event 105, indications of one or more transactions related to the event 105, indications of one or more transactions related to the event 105, indications of one or more asset transfers related to the event 105, or a combination thereof.

The event-based transfer system 100 includes a conditional asset transfer system 130 that is configured to, and can, set up a conditional asset transfer (e.g., in response to a request from a first user device 170 associated with a first user 165 and/or a second user device 185 associated with a second user 180), store the conditions and/or rules for the conditional asset transfer (e.g., identifying a particular settled outcome that is configured to trigger the conditional transfer) in a condition data store (DS) 135, validate when the outcome of the event is settled using a validator engine 140, validate whether the settled outcome of the event matches or otherwise satisfies the conditions and/or rules for the conditional asset transfer using the validator engine 140, and initiate a transfer 195 of asset(s) for the conditional asset transfer by interacting with an asset management system 150. For instance, the conditional asset transfer system 130 can receive a request from a user device (e.g., the first user device 170 associated with the first user 165 and/or the second user device 185 associated with the second user 180), to set up the conditional asset transfer to be automated based on a pending outcome of the event 105. The request, and/or subsequent interaction(s) between the conditional asset transfer system(s) 130 and the user device(s) (e.g., the first user device 170 and/or the second user device 185), can specify asset(s) to be transferred, amount(s) of the asset(s) to be transferred, and direction(s) of asset transfer corresponding to different possible outcomes for the event 105. The request, and/or the subsequent interaction(s) between the conditional asset transfer system(s) 130 and the user device(s), can be performed using a payment resource, such as the payment resource 175 of the first user device 170 and/or the payment resource 190 of the second user device 185. The payment resource (e.g., the payment resource 175 and/or the payment resource 190) may be, or may include, an application ("app"), a website, a portal, an application programming interface (API), a service, or a combination thereof.

In some examples, the event tracking system 115 and/or the conditional asset transfer system(s) 130 can identify one or more events to recommend to one or more users. In some examples, such events can be identified based at least in part on interactions and/or transactions of individual users using asset management system(s) 150. That is, techniques described herein can utilize historical interaction and/or transaction data of individual users to determine which event(s) are relevant to such users and to recommend such events to the users. In some examples, techniques described herein can utilize contextual data, such as proximity of individual users (e.g., are multiple users close to one another), location of individual users (e.g., are users at a particular event), social posting or interactions of individual users (e.g., do users post about the same event), groups with which individual users belong within the asset management system(s) 150 or external thereto, calendared events (e.g., events appearing on user's calendars), streaming data (e.g., which games or events are users watching or participating in), and so on, to determine which event(s) are relevant to such users. In some examples, such events can be determined using a machine-learning model, algorithm, or the like. In some examples, events can be recommended to users (and users can opt in) or users can be automatically associated with individual user accounts (and users can opt out).

In an example, in a sports game between Team A and Team B, different possible outcomes for the event 105 can include Team A winning, Team B winning, or a tie. Different users can become the recipients for the transfer based on which of these outcomes ends up being the settled outcome of the event 105 by the end of the game. The conditional DS 135 can store at last one data record corresponding to the conditional asset transfer. The at least one data record in the conditional DS 135 can identify, based on information in the request and/or the subsequent interaction(s) between the conditional asset transfer system(s) 130 and the user device(s), which users are to receive the amount(s) of the asset(s) from which other user(s) in case of each possible outcome. For instance, the at least one data record in the conditional DS 135 can identify that, if Team A wins the game, the first user 165 is to automatically receive $50 from the second user 180; while if Team B wins the game, the second user 180 is to automatically receive $50 from the first user 165. In some examples, the asset(s) to be transferred, and/or the amount(s) of the asset(s) to be transferred, can be different depending on the direction of transfer (e.g., who is the recipient), for instance based on the probability of each outcome. For instance, if the probability of Team A winning is 90% and the probability of Team B winning is 10%, then the second user 180 can automatically receive $90 from the first user 165 if Team B wins, while the first user 165 can automatically receive $10 from the second user 180 if Team A wins.

In some examples, conditional asset transfer system 130 can generate conditional asset transfer(s) between more than two users, for instance with different users corresponding to more than two different possible outcomes, and/or with more than one user corresponding to at least one of the possible outcomes. In some examples, customized interactive elements, such as specially configured identifiers having a particular syntax, QR codes, or NFC tags, that can be generated on-the-fly, for example, in response to initiating the conditional transfer for the event, can be used to enable multiple users to join an event and configure conditional asset transfers. For instance, as indicated above, if the event 105 is a sports game between Team A and Team B, different possible outcomes for the event 105 can include Team A winning, Team B winning, or a tie. In some examples, a third user (not pictured) can be a recipient for the transfer(s) 195 (e.g., from the first user 165 and/or the second user 180) if the settled outcome of the game is a tie. In situations where the amount(s) of the asset(s) to be transferred are based on the probability of the possible outcome, the amount(s) of the asset(s) to be transferred can be higher for the tie than for other outcomes (e.g., one of the teams winning) due to the probability of a tie being lower than the respective probabilities of the other outcomes. In another example, a first group of users (e.g., the first user 165 and a first set of one or more additional users) can be the recipients of the transfer(s) 195 if Team A wins, a second group of users (e.g., the second user 180 and a second set of one or more additional users) can be the recipients of the transfer(s) 195 if Team B wins, and a third group of users (e.g., the third user and a third set of one or more additional users) can be the recipients of the transfer(s) 195 if there is a tie between Team A and Team B. In situations where a group of multiple users are recipients, each of the recipient users in the group may receive a share of the transfer amount that may be divided based on number of users in the group, based on a respective amount of asset(s) that each of the recipient users initially put into escrow to set up the conditional asset transfer (e.g., how much each user is "wagering" on the outcome of the event), how early or late each of the recipient users put asset(s) into escrow or otherwise joined the conditional asset transfer relative to other recipient users, or a combination thereof.

In some examples, the conditional asset transfer system 130 can instead generate the conditional asset transfer, and/or the request, by itself. For instance, if the conditional asset transfer system 130 is aware that an event 105 that users are likely to be interested in is coming up (e.g., based on an indication in the data source(s) 125 that the event 105 is scheduled for a specified date and/or time), the conditional asset transfer system 130 can automatically generate a conditional asset transfer for the event 105, and can notify user device(s) (e.g., the first user device 170 and/or the second user device 185) to give associated users (e.g., the first user 165 and/or the second user 180) an opportunity to join the conditional asset transfer for the event 105. In an illustrative example, the conditional asset transfer system 130 may determine, based on the data source(s) 125 (e.g., based on a sports website and a news article), that a final championship game of a sports season is scheduled for February 12. Based on this determination, the conditional asset transfer system(s) 130 can automatically generate a conditional asset transfer for the final championship game, with the final championship game as the event 105 for the conditional asset transfer. The conditional asset transfer system(s) 130 can send notification(s) to user device(s) (e.g., the first user device 170 and/or the second user device 185) to ask the associated users (e.g., the first user 165 and/or the second user 180) if they would like to join the conditional asset transfer for the event 105, for instance to sign up as recipients in a first outcome (a first team wins) and transferors in a second outcome (a second team wins), or to sign up as recipients in the second outcome (the second team wins) and transferors in the first outcome (the first team wins).

The conditional asset transfer system(s) 130 include a validator engine 140 that is configured to validate (e.g., verify, certify) event data (e.g., based on sensor data from the sensor(s) 110, event data from the event tracking system(s) 115, event data from the event data DS 120, data from the data source(s) 125), or a combination thereof) to validate when the outcome of the event changes from pending to settled, to validate what the settled outcome of the event ultimately is, and to validate the direction of asset transfer based on the settled outcome. For instance, in some examples, the validator engine 140 of the conditional asset transfer system(s) 130 receives, from the event tracking system(s) 115 (e.g., from the event data DS 120), a stream of sensor data captured by the sensor(s) 110 and a steam of other even data from the data source(s) 125. The streams can provide updates about the status of the event 105. As soon as any of these streams of data include an indication that the outcome of the event 105 is settled, in some examples, the validator engine 140 can determine that the outcome of the event 105 is settled, and can move on to determining, from these streams, what the settled outcome of the event 105 is. In some examples, the validator engine 140 can require confirmation from a predetermined number and/or type of data source(s) to formally validate that the outcome of the event 105 is settled and/or what the settled outcome of the event 105 is. For instance, the validator engine 140 can require confirmation from sensor data (from the sensor(s) 110) and from a news article of the data source(s) 125. In some examples, the validator engine 140 can require confirmation from a specific data source of the data source(s) 125, such as a provider of sports news that the first user 165 and the second user 180 both indicate (e.g., via the payment resource 175 and/or the payment resource 190) that they trust.

Furthermore, in some examples, the conditional asset transfer system(s) 130 can utilize event information, event status information, and/or contextual information to identify, determine, select, etc. one or more validation or verification sources to recommend to the user in association with an event. For example, utilizing event information, event status information, and/or contextual information, the event-based transfer system can determine an optimal validation or verification source for a particular event and/or user. In some examples, such optimization can be based on the accuracy of individual validation or verification sources, timeliness of individual validation or verification sources (e.g., how close in time validation or verification is provided), relevance of individual validation or verification sources to a particular event, preferences of the user, channel of validation or verification (e.g., radio vs. television vs. streaming vs. self-submitted photo or video vs. in-person reporting, etc.), and so on. In some examples, the conditional asset transfer system(s) 130 can utilize one or more machine-trained models to determine optimal validation or verification source(s) to recommend to a user. In some examples, the conditional asset transfer system(s) 130 can automatically select an optimal validation or verification source for the user and/or the event. In some examples, multiple validation or verification sources can be recommended and/or selected to ensure accurate, timely validation or verification. In some examples, validation or verification sources can be third-party or external validation or verification sources, which can be integrated into a payment resource via an application programming interface or the like. Data can be received from the validation or verification sources, and by the validator engine 140, to validate or verify the outcome of an event, as described herein.

In some examples, the conditional asset transfer system(s) 130 include one or more trained machine learning (ML) model(s) 145. In some examples, validator engine 140 of the conditional asset transfer system(s) 130 can use the trained ML model(s) 145 for validation that an outcome of the event 105 is settled and/or that the settled outcome of the event 105 matches a particular predetermined outcome or condition (e.g., the settled outcome of the event 105 matches one of predetermined outcome A, predetermined outcome B, or predetermined outcome C, and the like). For instance, in some examples, validation may include certain data analysis tasks, such as image analysis. For instance, in some examples, validation may include feature extract, feature detection, feature recognition, feature tracking, object detection, object recognition, object tracking, facial detection, facial recognition, facial tracking, person detection, person recognition, person tracking, vehicle detection, vehicle recognition, vehicle tracking, animal detection, animal recognition, animal tracking, or a combination thereof. The trained ML model(s) 145 can include, for instance, or more neural network (NNs), convolutional neural networks (CNNs), trained time delay neural networks (TDNNs), deep networks, autoencoders, deep belief nets (DBNs), recurrent neural networks (RNNs), generative adversarial networks (GANs), trained support vector machines (SVMs), trained random forests (RFs), gradient boosting regressors, encoders, decoders, deep learning systems, transformers, classifiers, or combinations thereof. The trained ML model(s) 145 can be trained using training data via supervised learning, unsupervised learning, or a combination thereof. The training data can include, for instance, sensor data (e.g., image(s)) captured by the sensor(s) 110 (e.g., camera(s) and/or depth sensors), as well as predetermined indications of what feature(s) or object(s) are detected in the sensor data and where in the sensor data the feature(s) or object(s) are represented (e.g., depicted). In some examples, the conditional asset transfer system(s) 130 can update the trained ML model(s) 145 based on validations by the validator engine 140, for instance using the validated condition and the data (from the sensor(s) 110, the event tracking system(s) 115, the event data DS 120, and/or the data source(s) 125) used to validate the condition as training data.

An illustration of the trained ML model(s) 145 in FIG. 1 illustrates the input layer(s) of the trained ML model(s) 145 as a column of white circles on the left-hand side of the illustration, the output layer(s) of the trained ML model(s) 145 as another column of white circles on the right-hand side of the illustration, and the hidden layers of the trained ML model(s) 145 as two columns of grey-shaded circles in between the input layer(s) and the output layer(s). The circles can represent neurons, channels, layers, filters, pooling layers, normalization layers, maps, parameters, other elements of the trained ML model(s) 145, or combinations thereof. In some examples, the trained ML model(s) 145 include one or more trained ML models that are personalized to a specific user (e.g., the first user 165 and/or the second user 180) by being trained based on data that is specific to that specific user. In some examples, the trained ML model(s) 145 include one or more trained ML models that are generalized for multiple users by being trained based on data specific to various users and/or simulated data for simulated users.

In some examples, the condition DS 135 includes at least one distributed ledger, such as a blockchain ledger, a hashgraph ledger, a directed acyclic graph (DAG) ledger, a holochain ledger, a logical clock based ledger, a public ledger, a permissionless ledger, a private ledger, a permissioned ledger, or a combination thereof. In some examples, the conditional asset transfer system(s) 130 can store the conditional asset transfer in the condition DS 135 as at least one smart contract, in some cases with additional corresponding on-chain data (e.g., in a distributed ledger) and/or off-chain data (e.g., outside of a distributed ledger, for instance in a database or other data structure). In examples where the conditional asset transfer system(s) 130 store the conditional asset transfer in the condition DS 135 as the at least one smart contract, the terms of the smart contract may identify the conditions for the various asset transfer directions, for instance, if the settled outcome of the event 105 is outcome A, then transfer a first amount of an asset from the second user 180 to the first user 165, but if the settled outcome of the event 105 is outcome B, then transfer a second amount of the asset from the first user 165 to the second user 180. In some examples (e.g., examples where the conditional asset transfer system(s) 130 store the conditional asset transfer in the condition DS 135 as the at least one smart contract), multiple computing systems (e.g., computing system(s) that are part of the conditional asset transfer system(s) 130 and/or computing system(s) that are not part of the conditional asset transfer system(s) 130) can independently validate that an outcome of the event 105 is settled and/or that the settled outcome of the event 105 matches a particular predetermined outcome or condition, for instance using respective validator engines 140 and/or respective trained ML models 145 of the multiple computing systems. In some examples, a quorum (e.g., a majority or some other predetermined proportion) of the multiple computing systems must validate before validation by the validator engine 140 is considered complete.

The asset management system 150 of the event-based transfer system 100 includes an asset data store (DS) 155 that is configured to, and can, store information about asset(s) to be transferred in a conditional asset transfer. In some examples, the information about the asset(s) stored in the asset DS 155 includes location(s) of where the asset(s) are stored, for instance in one or more account(s) 160. The account(s) 160 can include an account associated with the first user 165, an account associated with the second user 180, respective account(s) associated with one or more additional users (not pictured) (e.g., if the transfer 195 is between one or more groups of users), an account associated with the conditional asset transfer system(s) 130 (e.g., to use as an escrow account for the transfer 195), an account associated with the asset management system(s) 150 (e.g., to use as an escrow account for the transfer 195), or a combination thereof. In some examples, the transfer 195 can be a peer-to-peer (P2P) transfer between users. In some examples, transfer 195 can be a customer-merchant transfer between a customer and a merchant. For instance, in some examples, the first user 165 and the second user 180 are peers. In some examples, one of the users (of the first user 165 and the second user 180) is a customer, and the other is a merchant. As described above, in some examples, the first user 165 and the second user 180 can comprise a user and the asset management system, a non-profit, or other entity. Furthermore, in some examples, the first user 165 and the second user 180 can represent different user accounts of a same user.

In an illustrative example, the event 105 can be a sports game between Team A and Team B. The first user 165 and the second user 180 can agree to a transfer of $50 based on the outcome of the event, with different directions of transfer based on different outcomes. For instance, if the outcome of the sports game settles, and Team A wins, then the transfer goes in a first direction, with the $50 being transferred from the second user 180's account (of the account(s) 160) to the first user 165's account (of the account(s) 160). If the outcome of the sports game settles, and Team B wins, then the transfer goes in a second direction, with the $50 being transferred from the first user 165's account (of the account(s) 160) to the second user 180's account (of the account(s) 160). In some examples, the conditional asset transfer system(s) 130 stores the information as to the amount (e.g., 50), the asset (e.g., US dollars), and a direction of transfer (e.g., from the first user 165 to the second user 180 or vice versa) of the amount of the asset based on the outcome of the event 105 (e.g., Team A winning or Team B winning) in a distributed ledger, such as a blockchain ledger. In some examples, the second account is not associated with an individual person (such as the second user 180), but is instead associated with a different entity, such a charity, a business, or another organization. For instance, the event-based transfer system can be requested to initiate a transfer of a specified amount of a specified asset to a charity if a user reaches a personal milestone in the user's workout.

In some examples, the conditional asset transfer system(s) 130 can request(s) for the asset management system(s) 150 to earmark the amount of the asset for a conditional asset transfer in the account(s) 160 associated with the conditional asset transfer (e.g., an account associated with the first user 165 and/or an account associated with the second user 180) to prevent the balance(s) of the account(s) from falling below the amount of the asset before the transfer of the amount of the asset.

In some examples, the conditional asset transfer system(s) 130 can receive an indication (e.g., from one of the user devices, the event tracking system(s) 115, and/or the data source(s) 125) that the settled outcome is in dispute. The conditional asset transfer system(s) 130 can delay the transfer of the amount of the asset based on the indication until receipt of an indication of a resolution of the dispute, and can resume the transfer upon receiving an indication of the resolution of the dispute (e.g., from one of the user devices, the event tracking system(s) 115, and/or the data source(s) 125).

In some examples, the conditional asset transfer system(s) 130 can receive an indication (e.g., from one of the user devices, the event tracking system(s) 115, and/or the data source(s) 125) of a change (e.g., a reversal) to the settled outcome. The conditional asset transfer system(s) 130 can, in response to receiving the indication of the change to the settled outcome, automatically transmit a change alert indicating the change to at least one of the user devices, cause the user device to surface the change alert within the local application on the at least one user device, and automatically facilitate, based on the direction of transfer of the amount of the asset, a second transfer of the asset as a correction based on the change in the settled outcome. For instance, if an initial indication suggested that Team A won, but the initial indication turned out to be incorrect and Team B won based on further indications, then any transfer that the conditional asset transfer system(s) 130 may have affected can be reversed using the second transfer.

Figure 2:
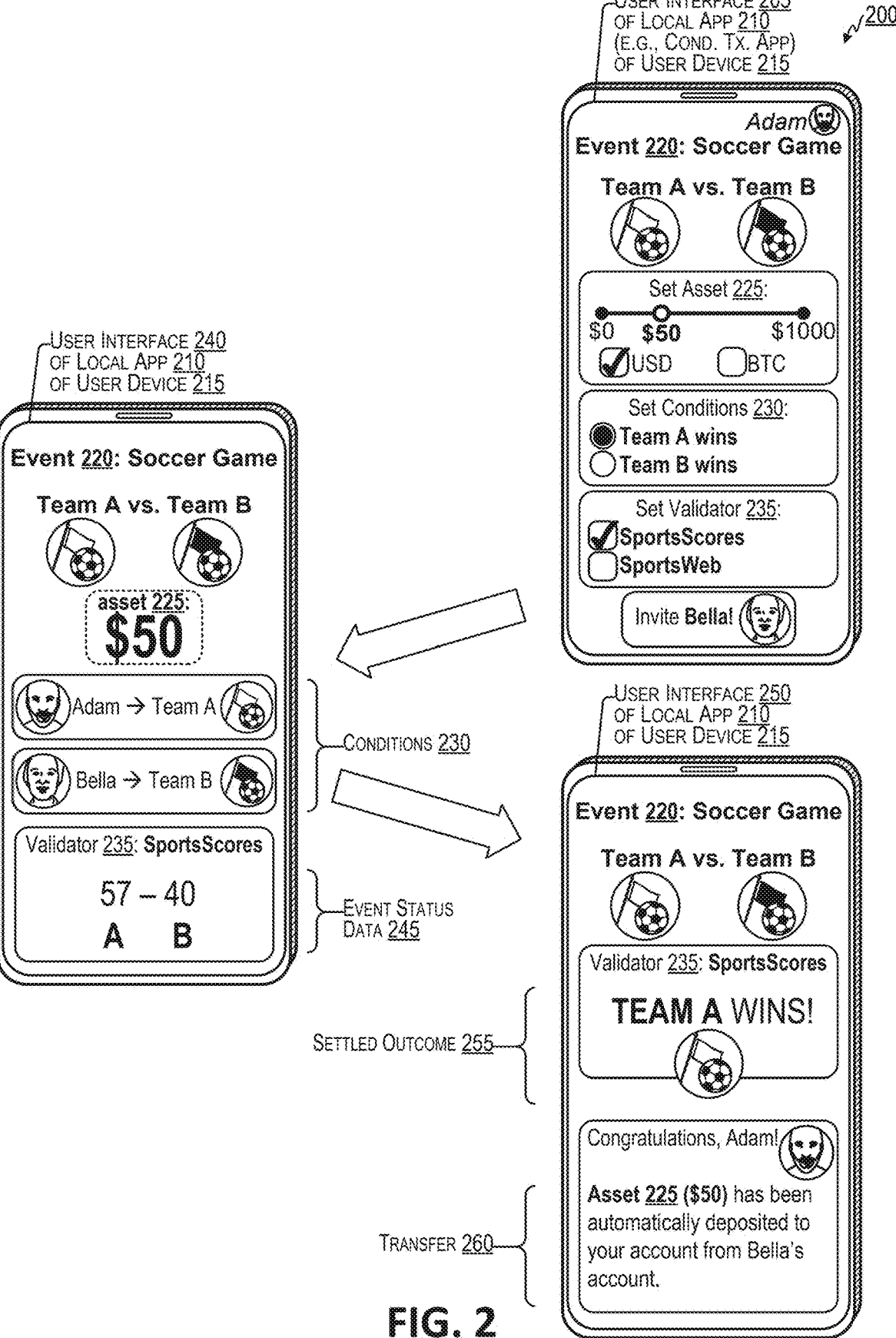
FIG. 2 is a conceptual diagram illustrating examples of user interfaces for an automated conditional transfer associated with a soccer game event in a local application associated with the event-based transfer system on a user device, in accordance with some examples.

FIG. 2 is a conceptual diagram illustrating examples of user interfaces for an automated conditional transfer associated with a soccer game event 220 in a local application 210 associated with the event-based transfer system on a user device 215. The local application 210 is identified in FIG. 2 as a conditional transfer application, and may be an example of the payment resource 175, the payment resource 190, a sports application, another application or resource described herein, or a combination thereof. The user device 215 may be an example of the first user device 170, the second user device 185, another user device described herein, a customer device described herein, a merchant device described herein, a point of sale (POS) device described herein, or a combination thereof.

A user interface (UI) 205 of the local application illustrates a user named Adam (e.g., the first user 165 or the second user 180) setting up an automated conditional transfer based on the soccer game event 220. The UI 205 includes an interface allowing the user to set an asset type of an asset 225 by selecting between US Dollars (USD) or Bitcoin (BTC). In some examples, other asset types may be selected or otherwise set, for instance other fiat currencies, other cryptocurrencies, non-fungible tokens (NFTs), stocks, bonds, gift cards, tokens, digital collectibles, physical collectibles, other digital assets, other physical assets, or combinations thereof. The UI 205 includes an interface allowing the user to set an amount of the selected asset type, with $50 selected as the amount of USD in FIG. 2 along a slider from $0 to $1000.

The UI 205 includes an interface that allows the user to set conditions 230 for the automated conditional transfer. The conditions 230 identify which user is set to be a recipient based on which outcome becomes the settled outcome for the soccer game event 220. The interface allows the user to choose, via radio buttons, whether they wish to be a recipient in the event that Team A wins the soccer game event 220, or whether they wish to be a recipient in the event that Team B wins the soccer game event 220. The user Adam is illustrated as having selected that he wishes to be a recipient in the event that Team A wins the soccer game event 220.

The UI 205 includes an interface that allows the user to set a data source to use as or with the validator 235. For instance, the data source may be one of the data source(s) 125, the sensor(s) 110, the event tracking system(s) 115, the event data DS 120, or a combination thereof. As described above, the data sources can be determined using event information, event status information, and/or contextual information, and/or the like. In the UI 205 illustrated in FIG. 2, the user can select between two data sources, SportsScores and SportsWeb. The user Adam is illustrated as having selected SportsScores for the validator 235. The validator 235 is an example of the validator engine 140. The UI 205 also includes an interface through which to add other users to the automated conditional asset transfer, for instance using the illustrated "Add Bella!" button to add a second user named Bella. In some examples, customized interactive elements, such as specially configured identifiers having a particular syntax, QR codes, or NFC tags, that can be generated on-the-fly, for example, in response to initiating the conditional transfer for the event, can be used to enable multiple users to join an event and configure conditional asset transfers. In some examples, one or more users to recommend to join an event can be intelligently determined, for example, using contextual information, including but not limited to proximity of individual users (e.g., are multiple users close to one another), location of individual users (e.g., are users at a particular event), social posting or interactions of individual users (e.g., do users post about the same event), groups with which individual users belong within the asset management system(s) 150 or external thereto, calendared events (e.g., events appearing on user's calendars), streaming data (e.g., which games or events are users watching or participating in), transaction and/or interaction data (e.g., indicating previous transactions or interactions of users), and so on, to determine which users to recommend to join an event.

A UI 240 of the local application 210 is illustrated summarizing the automated conditional asset transfer, for instance by showing the asset type and amount of the asset 225 ($50), the conditions 230 (user Adam is the recipient if Team A wins, while user Bella is the recipient if Team B wins), and the data source for the validator 235 (SportsScores). The UI 240 also shows event status data 245, for instance the current score of the soccer game event 220. The current score is still a pending outcome in the example of the UI 240, and is not yet a settled outcome.

A UI 250 of the local application 210 is illustrated, identifying that the validator 235 has validated that the outcome of the soccer game event 220 is now settled, and that the settled outcome 255 is that Team A has won the soccer game event 220. The UI 250 congratulates the user Adam and indicates that a transfer 260 of the asset type and amount of the asset 225 ($50) has automatically been processed, as $50 has been automatically deposited to Adam's account from Bella's account. The transfer 260 is an example of the transfer 195. Adam's account and Bella's account are examples of the account(s) 160.

Figure 3:
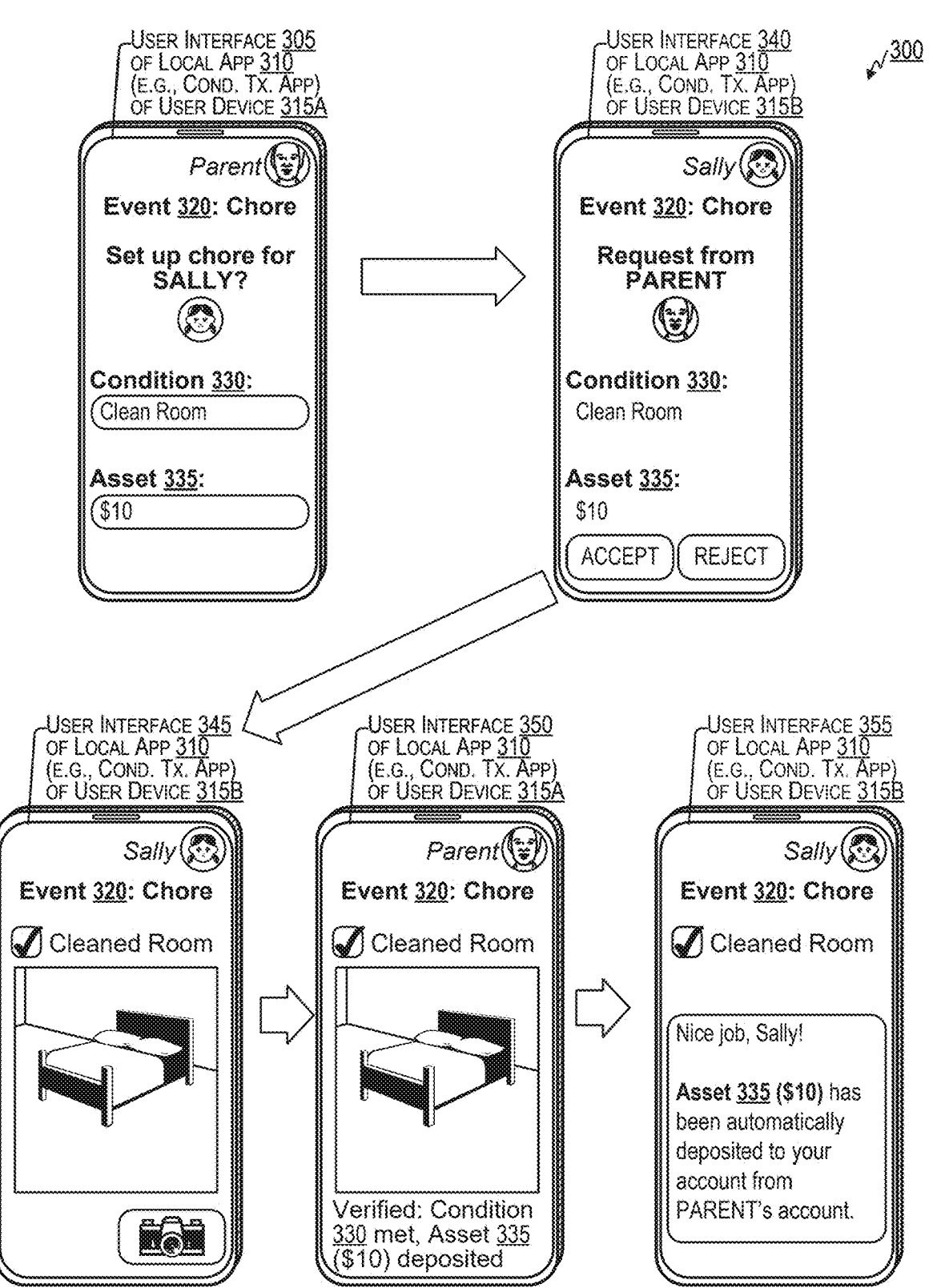
FIG. 3 is a conceptual diagram illustrating examples of user interfaces for an automated conditional transfer associated with a chore event in a local application associated with the event-based transfer system on user devices of two users, in accordance with some examples.

FIG. 3 is a conceptual diagram illustrating examples of user interfaces for an automated conditional transfer associated with a chore event 320 in a local application 310 associated with the event-based transfer system on user devices of two users. The local application 310 is identified in FIG. 3 as a conditional transfer application, and may be an example of the payment resource 175, the payment resource 190, the local application 210, a chore management application, a parenting application, another application or resource described herein, or a combination thereof. The user device 315A and user device 315B may be examples of the first user device 170, the second user device 185, another user device described herein, a customer device described herein, a merchant device described herein, a point of sale (POS) device described herein, or a combination thereof.

A user interface (UI) 305 of the local application 310 on the user device 315A of the user referred to as Parent (e.g., the first user 165 or the second user 180) illustrates the user Parent setting up an automated conditional transfer based on the chore event 320. The UI 305 includes an interface that allows the user to set conditions 330 for a second user named Sally for the automated conditional transfer by typing the conditions 330 into a field. The conditions 330 set by the user Parent indicate conditions under which the second user Sally is to receive an asset 335. The user Parent has indicated that the conditions 330 require the second user Sally to clean her room. The UI 305 includes an interface allowing the user to set an asset type and amount of an asset 335 by typing into a field. The user Parent has typed $10, indicating that the second user Sally is to automatically receive a transfer of $10 into Sally's account from Parent's account if the condition 330 (Sally cleaning her room) is satisfied.

A UI 340 of the local application 310 on the user device 315B of the user Sally identifies the condition 330 and asset 335, and allows the user Sally to accept or reject the chore event 320. A UI 345 of the local application 310 on the user device 315B of the user Sally allows Sally to capture and submit a photo of Sally's room as proof that the condition 330 (cleaning her room) is met. Sally can capture the photo using a camera of the user device 315B, which may be considered one of the sensor(s) 110 for the chore event 320. In some examples, the validator engine 140 uses the trained ML model(s) 145 to analyze the photo using object recognition to determine whether the room is in fact clean.

A UI 350 of the local application 310 on the user device 315A of the user Parent shows Parent the photo of Sally's room and indicates verification that condition 330 is met, and confirms that asset 335 is to be deposited (or already has been deposited) into Sally's account. A UI 345 of the local application 310 on the user device 315B of the user Sally confirms that the asset 335 ($10) has been automatically deposited (in a transfer 195) to Sally's account from Parent's account based on Sally's completion of the condition 330 (cleaning her room). The transfer of the asset 335 is an example of the transfer 195. Parent's account and Sally's account are examples of the account(s) 160.

Figure 4:
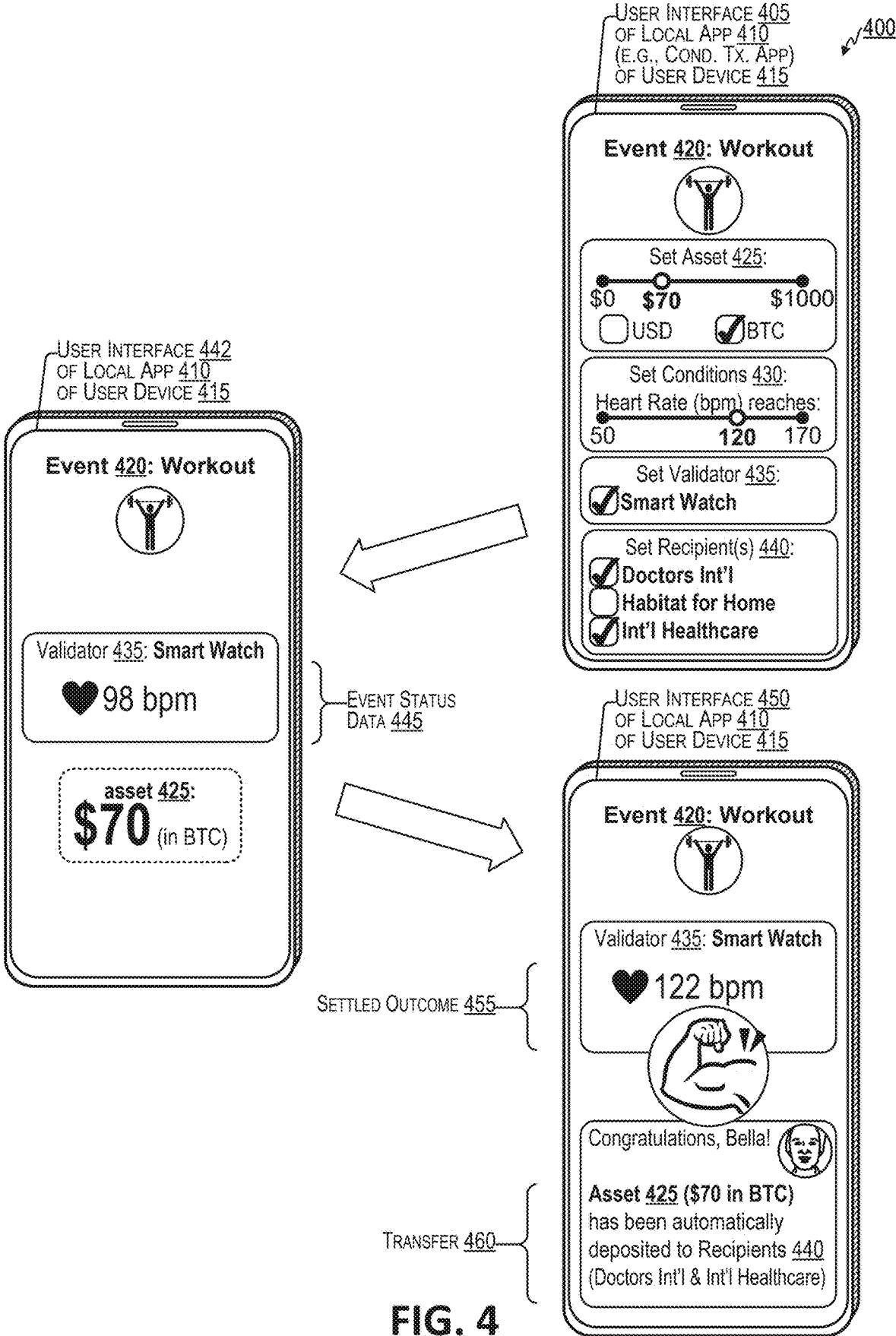
FIG. 4 is a conceptual diagram illustrating examples of user interfaces for an automated conditional transfer associated with a workout event in a local application associated with the event-based transfer system on a user device, in accordance with some examples.

FIG. 4 is a conceptual diagram illustrating examples of user interfaces for an automated conditional transfer associated with a workout event 420 in a local application 410 associated with the event-based transfer system on a user device 415. The local application 410 is identified in FIG. 4 as a conditional transfer application, and may be an example of the payment resource 175, the payment resource 190, the local application 210, the local application 310, a workout application, another application or resource described herein, or a combination thereof. The user device 415 may be an example of the first user device 170, the second user device 185, another user device described herein, a customer device described herein, a merchant device described herein, a point of sale (POS) device described herein, or a combination thereof.

A user interface (UI) 405 of the local application 410 on the user device 415 of the user referred to as Bella (e.g., the first user 165 or the second user 180) illustrates the user Bella setting up an automated conditional transfer based on the workout event 420. The UI 405 includes an interface that allows the user to set a type and quantity of an asset 425 to be transferred in the automated conditional transfer, where the user has set $70 work of bitcoin. The UI 405 includes an interface that allows the user to set conditions 430 for the automated conditional transfer to occur, where the user has set a maximum heart rate goal of 120 beats per minute (bpm). The UI 405 includes an interface that allows the user to set a data source for the validator 435 (e.g., validator engine 140), where the user has set their own smart watch (the heart rate sensors and/or other sensors of which may be used as the sensor(s) 110 for the workout event 420). The 405 includes an interface that allows the user to set recipient(s) 440 for the automated conditional transfer, where the user has selected several charities, including Doctors International and International Healthcare. In some examples, a user can configure an event-based transfer to occur each time the user performs an operation (e.g., a squat). As described above, in some examples, the transfer can be to a charity. In other examples, however, the transfer can be between accounts of a user. For instance, a user can set funds into a restricted account and, upon determination that the user performs an action that satisfies a condition, an amount can be transferred from the restricted account to an unrestricted account. In some examples, the restricted account can be managed or enforced by the asset management system(s) 150. In some examples, transfers can be "micro-payments" of very small amounts of an asset.

The UI 442 of the local application 410 is illustrated summarizing the automated conditional asset transfer, for instance by showing the asset type and amount of the asset 425 ($70 in bitcoin), the data source for the validator 435 (the user's Smart Watch). The UI 442 also shows event status data 445, for instance the maximum heart rate of the user during the workout event 420 thus far (98 bpm). The maximum heart rate of user during the workout event 420 thus far is still a pending outcome in the example of the UI 442, and is not yet a settled outcome.

A UI 450 of the local application 410 is illustrated, identifying that the validator 435 has validated that the outcome of the workout event 420 is now settled, and that the settled outcome 455 is that Bella's maximum heart rate is 122, exceeding the goal of 120 and thus meeting the conditions 430. The UI 450 congratulates the user Bella and indicates that a transfer 460 of the asset type and amount of the asset 425 ($70 in bitcoin) has automatically been processed, as $70 in bitcoin has been automatically deposited to from Bella's account to the accounts of the recipients 440. The transfer 460 is an example of the transfer 195. Bella's account and the accounts of the recipients are examples of the account(s) 160.

FIG. 5 is a conceptual diagram illustrating examples of a user interface 505 for an automated conditional transfer associated with a video game tournament event 520 in a local application 510 associated with the event-based transfer system on a user device 515.

The local application 510 is identified in FIG. 5 as a conditional transfer application, and may be an example of the payment resource 175, the payment resource 190, the local application 210, the local application 310, the local application 410, a gaming application, another application or resource described herein, or a combination thereof. The user device 515 may be an example of the first user device 170, the second user device 185, another user device described herein, a customer device described herein, a merchant device described herein, a point of sale (POS) device described herein, or a combination thereof.

The user interface (UI) 505 of the local application 510 on the user device 515 of the user referred to as Adam (e.g., the first user 165 or the second user 180) illustrates the user Adam setting up an automated conditional transfer based on the video game tournament event 520. The UI 505 identifies an amount and asset type of an assert 525 that is required to enter the video game tournament event 520 ($10). The automated conditional transfer associated with a video game tournament event 520 is set up to pool the assets 525 of each of the users to that the asset total 530 of each of the respective assets 525 is to be granted to the winner of the video game tournament event 520. Thus, the condition for the video game tournament event 520 is that a particular user wins the video game tournament event 520. The UI 505 identifies that the current asset total 530 is $370, based on 37 players having joined the video game tournament event 520 and provided their respective $10 assets 525 for entry. The UI 505 identifies that the data source for the validator 535 (e.g., validator engine 140) is GameStation, which may be one of the data source(s) 125. The UI 505 identifies a schedulele 540 indicating that the video game tournament event 520 will take place on Nov. 20, 2022 at 7:00 PM. The UI 505 allows the user Adam to accept or reject entry to the video game tournament event 520, and provides an "invite Bella" button to allow the user Adam to invite a second user (Bella). Each of the other players in the video game tournament event 520, including the eventual winner, is an example of a user (e.g., the first user 165 or the second user 180). The transfer to the account of the winner from the accounts of the other players is an example of the transfer 195. The accounts of each of the players are examples of the account(s) 160.

FIG. 6 is a block diagram illustrating three consecutive blocks of a blockchain ledger 600 that may be used as a condition data store 135 for conditional asset transfer system(s) 130. Three blocks of the blockchain ledger 600 are illustrated in FIG. 6, including Block A 605, Block B 635, and Block C 665.

Each block includes a block header 610/640/670 and a list of one or more payloads 630/660/690. In some examples, block header 610/640/670 includes a hash 610/640/670 of at least the block header of the previous block. For instance, the header 670 of block C 665 includes a hash 675 of the header 640 of block B 635. The header 640 of block B 635 likewise includes a hash 645 of the header 610 of block A 605. The header 610 of block A 605 likewise includes a hash 615 of a header (not pictured) of previous block (not pictured) that is before block A 605 in the blockchain ledger 600. Including the hash of the previous block's header secures the blockchain ledger 600 by preventing modification of any block of the blockchain ledger 600 after the block has been entered into the blockchain ledger 600, as any change to a particular block would cause that block header's hash 615/645/675 in the next block to be incorrect. Further, modification of that block header's hash in the next block would make the next block's header's hash 615/645/675 in the block after the next block incorrect, and so forth. A verifying device can verify that a block has not been modified by computing the hash of the block header, then comparing the computed hash to the stored hash 615/645/675 that is stored in the next block. In some distributed ledgers, a block header 610/640/670 can include hashes of multiple previous blocks and/or block headers of multiple previous blocks, as in a hashgraph ledger or a distributed acyclic graph (DAG) ledger.

Each block's block header 610/640/670 can include a Merkle root 620/650/680. The Merkle root 620/650/680 is generated based on hashes of each of the automated conditional transfers, tokens (e.g., non-fungible tokens (NFTs)), transactions, smart contracts, and/or other elements identified in the payload 630/660/690 for that block. Any attempt to modify a payload after the block has been entered would change the Merkle root. A verifying device can verify that the payload(s) 630/660/690 have not been modified by computing the Merkle root, then comparing the computed Merkle root to the stored Merkle root 620/650/680 that is stored in the block header 610/640/670. Changes to the payload 630/660/690 and/or to the Merkle root 620/650/680 would also change the hash for the block header, for which a value is stored in the next block as the hash 615/645/675. Each payload of each block may include one or more tokens, one or more transactions, one or more smart contracts, other content, or combinations thereof.

Each block's block header 610/640/670 may also include various elements of metadata, such as a version number for the blockchain ledger platform, a version number for the block itself, a timestamp for verification of each payload, a timestamp for generation of the block, a timestamp for entry of the block into the blockchain ledger 600, a timestamp for request of generation of the block, a difficulty target value (e.g., adjusting difficulty of mining), one or more randomized nonce values, a counter identifying how many nonces have been tried, a title of the blockchain ledger 600, an identifier as to what the blockchain ledger 600 is tracking, or a combination thereof. Each individual element added can further serve as information that can be verified by a verifying device to identify if the block, and the payload within, is accurate and authorized. The one or more randomized nonce values can serve to further complicate the hashes, improving security.

Each block 605/635/665 of the blockchain ledger 600 also includes a payload 630/660/690. The payload 630/660/690 for each block 605/635/665 can include one or more tokens, one or more transactions, one or more smart contracts, one or more other elements, metadata related to any of the previously-listed elements, or combinations thereof. A token may be, for example, a non-fungible token. Certain parts of such a token can be stored within the payload 630/660/690 of the blockchain ledger 600, and are thus stored "on-chain." Certain parts of such a token can include on-chain pointers that point to data outside of the blockchain ledger 600, such as a data structure, with such data being stored "off-chain." The payload 630/660/690 of the blockchain ledger 600 may store hashes of off-chain data, so that a verifying device can compute a hash of the off-chain data and compare the computed hash to the stored hash that is stored on-chain to verify that the off-chain data is accurate. In some examples, the payload 630/660/690 includes one or more smart contracts. The block may include the code of the smart contract stored within the payload 630/660/690 of the blockchain ledger 600, thus storing the code on-chain. If the payload 630/660/690 includes a smart contract, the block may include a hash of the code of the smart contract and/or a pointer to an off-chain data structure storing the code of the smart contract, thus storing the code off-chain. In some examples, some of the smart contract's code may be stored on-chain, while some of the smart contract's code may be stored off-chain. In some examples, smart contracts can be used to create, modify, transfer, or otherwise manage tokens. In some examples, the payload 630/660/690 includes transactions. In some examples, transactions may include transfers of tokens from one account to another account. In some examples, transactions may include changes to certain properties of tokens or the associated digital assets, such as changes to ownership of the tokens.

While FIG. 6 only illustrates three blocks 605/635/665 of the blockchain ledger 600, it should be understood that any blockchain discussed herein may be longer or shorter in that it may have more or fewer than three blocks.

In one illustrative example, a first computing device can store a blockchain ledger including a plurality of blocks. Each of a plurality of computing devices (e.g., in a distributed architecture) also stores a copy of the blockchain ledger. The first computing device can receive a message identifying an intended payload element (e.g., token and/or transaction and/or smart contract), such as a smart contract 695 added into the payload 690 of block C 665 by the conditional asset transfer system(s) 130 to store the conditions for a conditional asset transfer and to act as the mechanism for the validator engine 140 to validate when the conditions are satisfied. The first computing device can verify that the intended payload element is valid. In some blockchain ledger 600 implementations, the first computing device can verify that sufficient funds are allocated in order to pay for execution fee charges for the intended payload element, for instance in the form of gas on an Ethereum blockchain ledger. For a transaction, the first computing device can verify whether the transferor has a sufficient quantity of an asset (e.g., whether the transferor owns the token to be transferred) for the transaction to take place. For a smart contract like the smart contract 695, the first computing device can verify that the smart contract refers to valid accounts that include sufficient quantity of an asset (e.g., token) to execute the smart contract (e.g., to transfer the token), verify that the code of the smart contract can be executed (e.g., does not include syntax errors or other errors), verify that all parties involved in the smart contract have submitted agreement to the terms of the smart contract, or a combination thereof. For a token, the first computing device can verify that the token refers to a valid digital asset, for instance a valid type of digital asset.

The first computing device can generate a hash of a most recent block or block header of the blockchain ledger 600. The first computing device can generate a new block header for a new block. The new block header can include at least the hash of the most recent block or block header of the blockchain ledger 600. The first computing device can generate the new block, the new block including the new block header and a payload with one or more payload elements. The one or more payload elements include at least the intended payload element discussed above (e.g., token, smart contract, transaction), such as the smart contract 695. The first computing device can generate a Merkle root based on the payload elements, and include the Merkle root in the new block header. The first computing device can generate a metadata and a nonce value based on the payload elements, and include the metadata and the nonce value in the new block header. The first computing device can append the new block to the plurality of blocks of the blockchain ledger 600 in response to verifying the intended payload element. The first computing device can transmit the new block to the plurality of computing devices that each store the blockchain ledger 600 in response to verifying the intended payload element. Each of the plurality of computing devices also appends the new block to their respective copy of the blockchain ledger 600.

In another illustrative example, a first computing device can store a blockchain ledger 600 including a plurality of blocks. Each of a plurality of computing devices (e.g., in a distributed architecture) also stores a copy of the blockchain ledger 600. The first computing device can receive a UI input identifying an intended payload element (e.g., automated conditional transfer, transaction, and/or smart contract), such as the smart contract 695. The first computing device can generate a message identifying the intended payload element. The first computing device can retrieve a private key associated with an account corresponding to the first computing device. The first computing device can modify the message by encrypting at least a portion of the message with the private key. The first computing device can transmit the message to the plurality of computing devices other than the first computing device. A second computing device of the plurality of computing devices verifies that the intended payload element is valid, for instance as described in the previous paragraph. The first computing device receives a new block from the second computing device. The new block identifies and/or includes the intended payload element (e.g., in its payload). The first computing device appends the new block to the plurality of blocks of the blockchain ledger 600 at the first computing device.

It should be understood that the blockchain ledger 600 illustrated in FIG. 6 is a non-limiting example of a distributed ledger. In some examples, a distributed ledger may be a directed acyclic graph (DAG) ledger. In a DAG ledger, each block header includes the hashes of blocks, or block headers, of a predetermined number of other "parent" blocks in the DAG ledger selected either at random or in some other non-linear manner, rather than the hash of a single previous block in the blockchain. Where each block header includes multiple hashes corresponding to different parent blocks or their headers, these hashes can be combined together using a Merkle root. For example, if the blockchain ledger 600 were instead a DAG ledger, block A 605 and block B 635 could be parent blocks to block C 665, in which case the Merkle root 680 in the block C header 670 would be based on block A 605 and block B 635, and the hash 675 in the block C header 670 can be replaced with one hash of block A 605 and a second hash of block B 635. The resulting structure is a directed acyclic graph (DAG) of blocks, where each vertex block includes a hash of its parent vertex block(s), rather than a linear stream of blocks as in a blockchain. A DAG ledger may sometimes be referred to as a "web," a "tangle," or a "hashgraph."

In some examples, the number of parent blocks of a given block in a DAG ledger is not predetermined, but there may be a predetermined minimum number of parent blocks, such as a two-parent minimum or a one-parent minimum, meaning that each block has at least the predetermined minimum number of parent blocks. In some cases, each block in a DAG ledger may only identify only a single payload element rather than multiple payload element, and may therefore forego a Merkle root 620/650/680 of payload elements and/or replace it with a hash of the single payload element. In other implementations, each block may identify multiple payload elements associated with a predetermined time period, and/or may include a Merkle root 620/650/680 of the payload elements. Potential benefits of DAG ledgers over blockchain ledgers 600 may include parallelized validation, which may result in higher throughput.

Figure 7A:
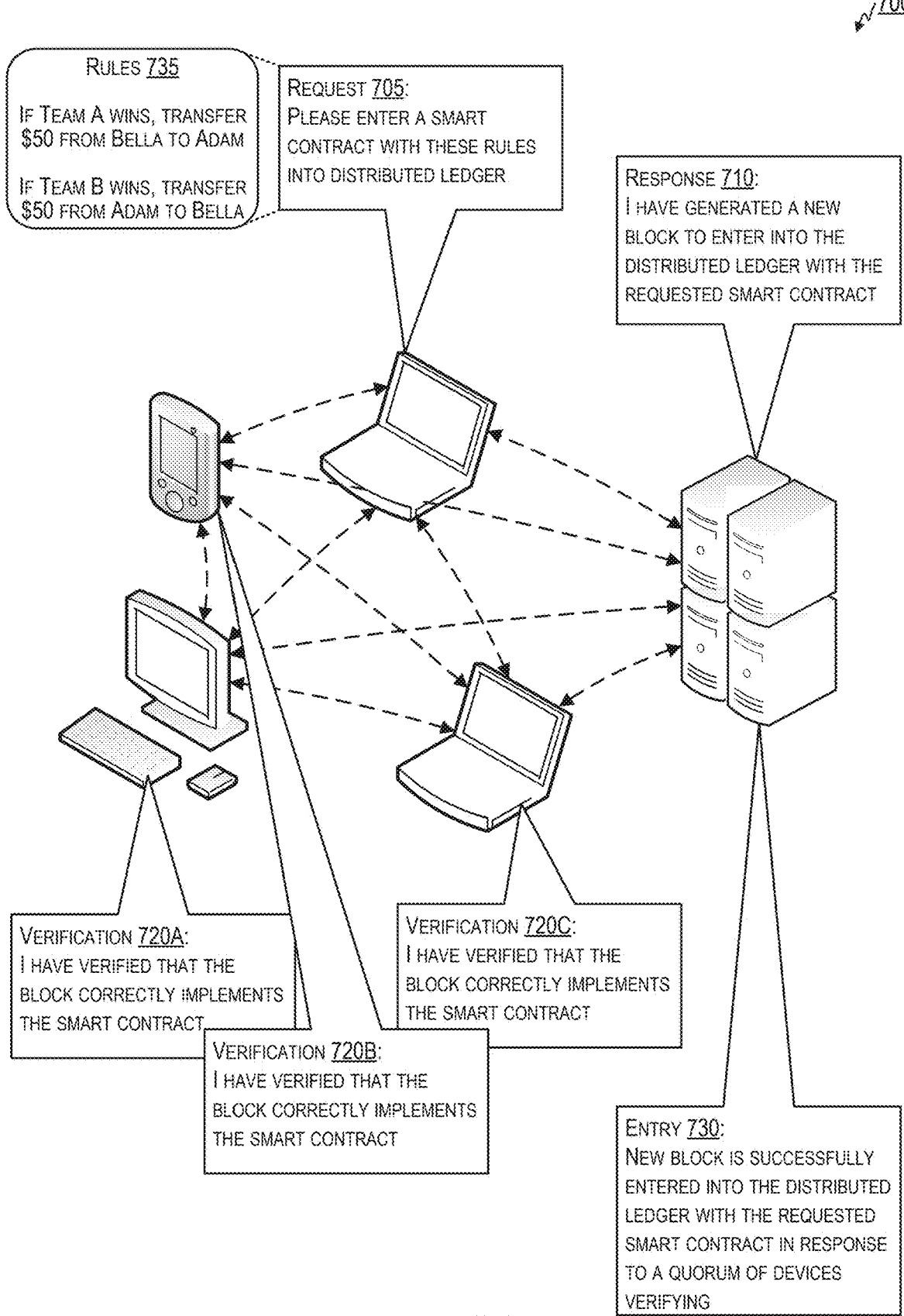
FIG. 7A is a conceptual diagram illustrating generation of a smart contract and entry of the smart contract into a distributed ledger, in accordance with some examples.

FIG. 7A is a conceptual diagram 700 illustrating generation of a smart contract and entry of the smart contract into a distributed ledger. The smart contract may be used to store and/or implement aspects of an automated conditional asset transfer, such as a set of rules 735, for instance by the conditional asset transfer system(s) 130. An exemplary set of rules 735 is illustrated. The distributed computing architecture includes multiple computing systems (referred to here as computers) that store and modify the distributed ledger (e.g., the blockchain ledger 600). A first computer submits a request 705 requesting entry of a smart contract with particular rules (e.g., the rules 735 of the automated conditional asset transfer) into distributed ledger. For instance, the rules of the smart contract may identify conditions of an automated conditional transfer (e.g., if Team A wins, then a first amount of an asset is transferred from User B to User A, while if Team B wins, then a second amount of the asset is transferred from User A to User B). The exemplary set of rules 735 identifies that if Team A wins, $50 is to be transferred from Bella to Adam, and if Team B wins, $50 is to be transferred from Adam to Bella. A second computer submits a response 710 indicating that the second computer has generated a new block to enter into the distributed ledger with the requested smart contract. Third, fourth, and fifth computers submit verification 720A-720C indicating that they have verified that the block correctly implements the smart contract, that the code of the smart contract can be executed (e.g., does not include syntax errors or other errors), that all parties involved in the smart contract have submitted agreement to the terms of the smart contract, that on-chain pointers correctly point to valid off-chain smart contract code, and/or that sufficient funds are allocated in order to pay for execution fee charges for the intended payload element. The second computer submits and entry confirmation indicating that the new block is successfully entered into the distributed ledger with the requested smart contract in response to a quorum of devices verifying.

A similar process to the process illustrated in FIG. 7A may be used to enter tokens, with the corresponding verification 720A-720C verifying, for instance, that the token refers to a valid type of digital asset, that on-chain pointers correctly point to valid off-chain media or metadata, and/or that sufficient funds are allocated in order to pay for execution fee charges for the intended payload element. A similar process to the process illustrated in FIG. 7A may be used to enter transaction, with the corresponding verification 720A-720C verifying, for instance, whether the transferor has a sufficient quantity of an asset (e.g., whether the transferor owns the token to be transferred) for the transaction to take place and/or that sufficient funds are allocated in order to pay for execution fee charges for the intended payload element.

FIG. 7B is a conceptual diagram 750 illustrating execution of a smart contract. A first computer submits an identification 755 that the first computer has executed the smart contract code, identified (e.g., based on the rules 735) that a condition in this smart contract has been met (e.g., Team A has won), and identified (e.g., based on the rules 735) the action to be taken (e.g., $50 is to be transferred from Bella to Adam). Second, third, and fourth computers submit verifications 760A-760C that identify that the second, third, and fourth computers have executed the smart contract code, verified that the condition in this smart contract has been met, and verified the action to be taken. A fifth computer indicates an error 765 with no verification. The third computer indicates an action 770, indicating that the third computer has executed the smart contract code and performed the action (e.g., transferred $50 from Bella to Adam) in response to a quorum of devices verifying (e.g. the verifications 760A-760C). The verifications 760A-760C may be examples of validations by the validator engine 140 of the conditional asset transfer system(s) 130 according to the rules 735 of a smart contract associated with an automated conditional asset transfer.

Figure 8A:
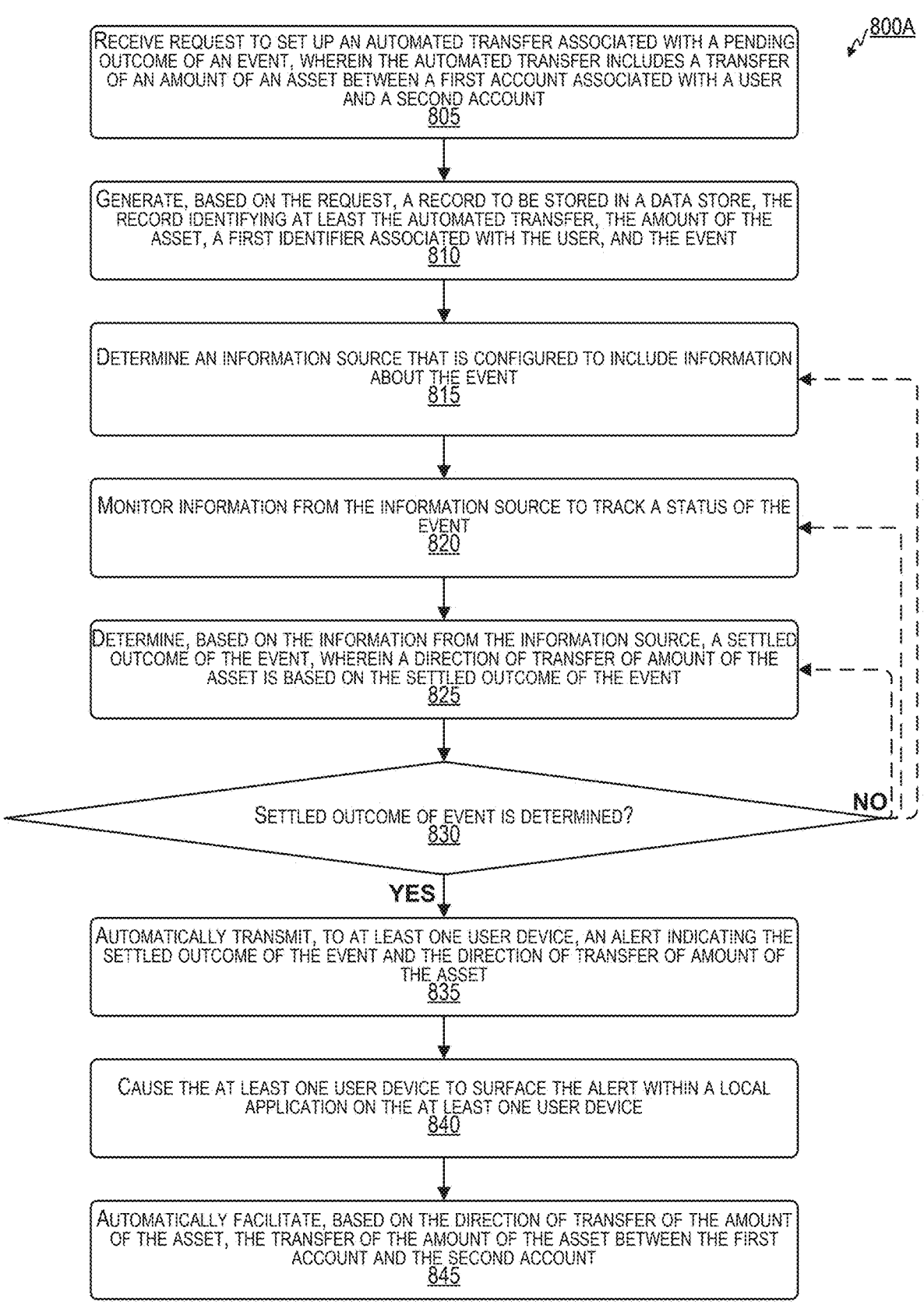
FIG. 8A is a flow diagram illustrating a process for event-based asset transfer, in accordance with some examples.

FIG. 8A is a flow diagram illustrating a process 800 for event-based asset transfer. The process 800 may be performed by the event-based transfer system 100 or a subset thereof, such as the event tracking system(s) 115, the conditional asset transfer system(s) 130, the asset management system(s) 150, or a combination thereof.

At operation 805, the event-based transfer system 100 is configured to, and can, receive a request to set up an automated transfer associated with a pending outcome of an event (e.g., event 105, soccer game event 220, chore event 320, workout event 420, gaming tournament event 520, or another event described herein). The automated transfer includes a transfer of an amount of an asset between a first account associated with a user and a second account. The event can be at least one of a sporting event, a gaming event, a chore event, an athletics event, a workout goal, a work event, a work goal, a financial goal, a dietary goal, or a personal challenge.

In some examples, the second account is associated with a second user (e.g., the second user 180). In some examples, the event-based transfer system 100 is configured to, and can, receive, from a first user device associated with the user, agreement upon a direction of transfer of the amount of the asset based on the settled outcome of the event. In some examples, the event-based transfer system 100 is configured to, and can, receive, from a second user device associated with the second user, agreement upon the direction of transfer of the amount of the asset based on the settled outcome of the event. In some examples, the first user and the second user can comprise a user and the asset management system, a non-profit, a charity, a business, or other entity. Furthermore, in some examples, the first user and the second user can represent different user accounts of a same user.

In some examples, the event-based transfer system 100 is configured to, and can, identify one or more events to recommend to one or more users. In some examples, such events can be identified based at least in part on interactions and/or transactions of individual users using asset management system(s) 150. For instance, the event-based transfer system 100 can utilize historical interaction and/or transaction data of individual users to determine which event(s) are relevant to such users and to recommend such events to the users. In some examples, the event-based transfer system 100 can utilize contextual data, such as proximity of individual users (e.g., are multiple users close to one another), location of individual users (e.g., are users at a particular event), social posting or interactions of individual users (e.g., do users post about the same event), groups with which individual users belong within the asset management system(s) 150 or external thereto, calendared events (e.g., events appearing on user's calendars), streaming data (e.g., which games or events are users watching or participating in), and so on, to determine which event(s) are relevant to such users. In some examples, such events can be determined using a machine-learning model, algorithm, or the like. In some examples, events can be recommended to users (and users can opt in) or users can be automatically associated with individual user accounts (and users can opt out).

At operation 810, the event-based transfer system 100 is configured to, and can, generate, based on the request, a record to be stored in a data store (e.g., the condition DS 135), the record identifying at least the automated transfer, the amount of the asset, a first identifier associated with the user (e.g., of an account associated with the user), and the event.

In some examples, the data store includes a distributed ledger (e.g., the blockchain ledger 600), and the record is at least part of a payload of a block in the distributed ledger. In some examples, the record is associated with a smart contract (e.g., the smart contract of FIGS. 7A-7B), and determining the settled outcome of the event and facilitating the transfer is associated with execution of the smart contract.

In some examples, the event-based transfer system 100 is configured to, and can, transmit a first request for the first account system (e.g., the asset management system(s) 150) to earmark the amount of the asset in the first account to prevent a balance of the first account from falling below the amount of the asset before the transfer of the amount of the asset. In some examples, the event-based transfer system 100 is configured to, and can, transmit a second request for the second account system to earmark the amount of the asset in the second account to prevent a balance of the second account from falling below the amount of the asset before the transfer of the amount of the asset.

In some examples, a user can configure an event-based transfer to occur each time the user performs an operation (e.g., a squat). As described above, in some examples, the transfer can be to a charity. In other examples, however, the transfer can be between accounts of a user. For instance, a user can set funds into a restricted account and, upon determination that the user performs an action that satisfies a condition, an amount can be transferred from the restricted account to an unrestricted account. In some examples, the restricted account can be managed or enforced by the asset management system(s) 150. In some examples, transfers can be "micro-payments" of very small amounts of an asset In some examples, the event-based transfer system 100 is configured to, and can, generate (e.g., on-the-fly) customized interactive elements, such as specially configured identifiers having a particular syntax, QR codes, or NFC tags, that can be generated on-the-fly, for example, in response to initiating the conditional transfer for the event, can be used to enable multiple users to join an event and configure conditional asset transfers. In some examples, one or more users to recommend to join an event can be intelligently determined, for example, using contextual information, including but not limited to proximity of individual users (e.g., are multiple users close to one another), location of individual users (e.g., are users at a particular event), social posting or interactions of individual users (e.g., do users post about the same event), groups with which individual users belong within the asset management system(s) 150 or external thereto, calendared events (e.g., events appearing on user's calendars), streaming data (e.g., which games or events are users watching or participating in), transaction and/or interaction data (e.g., indicating previous transactions or interactions of users), and so on, to determine which users to recommend to join an event.

At operation 815, the event-based transfer system 100 is configured to, and can, determine an information source that is configured to include information about the event. At operation 820, the event-based transfer system 100 is configured to, and can, monitor information from the information source to track a status of the event. The information from the data source can include, for instance, sensor data from the sensor(s) 110, event data from the event tracking system(s) 115, event data from the event data DS 120, data from the data source(s) 125. In some examples, the even tracking system(s) 115 can be used to monitor the information from the information source to track the status of the event.

The information about the event can include, and/or be based on, sensor data from the sensor(s) 110, event data from the event tracking system(s) 115, event data from the event data DS 120, data from the data source(s) 125), or a combination thereof. The information about the event can be referred to as event data, event information, event status data, event status information, contextual data, and/or contextual information. The information about the event can include, for instance, indications that a score of the event 105 (e.g., the score of a game) has changed, indications that at least one specified person has entered a specified region (e.g., a player has entered an endzone), indications that at least one specified person has reached and/or crossed a threshold (e.g., a racer has reached and/or crossed a finish line), indications that at least one specified person has exited a specified region, indications that at least one specified object has entered a specified region (e.g., a ball or puck has entered a goal or basket), indications that at least one specified object has reached and/or crossed a threshold (e.g., a car or other vehicle has reached or crossed a finish line), indications that at least one specified object has exited a specified region, indications that at least one person or object has reached or exceeded a specified speed (e.g., a ball, vehicle, or person has reached or exceeded the specified speed), indications that at least one person or object is moving in a specified direction, indications that at least one person or object has moved at least a specified distance, indications that at least one person or object has moved along a specified path (e.g., a ball reaches a goal or basket from a specific distance or area), indications that at least one person or object has changed state (e.g., location, direction, orientation, speed, altitude, temperature, or another characteristic), indications that at least one person or object has maintained state (e.g., location, direction, orientation, speed, altitude, temperature, or another characteristic) for at least a predetermined amount of time, indications of detection of a specified object or person in image data captured by image sensor(s) of the sensor(s) 110, indications of detection of a specified sound in audio data captured by microphone(s) of the sensor(s) 110, indications of one or more news articles or items about the event 105, indications of one or more social media posts or items about the event 105, indications of weather at the event 105 (or changes thereto), indications of one or more updates in data feeds about the event 105, indications of one or more updates in websites about the event 105, indications of one or more updates in apps about the event 105, indications of one or more updates in other resources about the event 105, indications of one or more transactions related to the event 105, indications of one or more transactions related to the event 105, indications of one or more asset transfers related to the event 105, or a combination thereof.

In some examples, the event-based transfer system 100 is configured to, and can, utilize event information, event status information, and/or contextual information to identify, determine, select, etc. one or more information source(s) (e.g., validation or verification sources) to recommend to the user in association with an event. For example, utilizing event information, event status information, and/or contextual information, the event-based transfer system 100 can determine an optimal information source (e.g., validation or verification source) for a particular event and/or user. In some examples, such optimization can be based on the accuracy of individual information sources, timeliness of individual information sources (e.g., how close in time validation or verification is provided), relevance of individual information sources to a particular event, preferences of the user, channel of validation or verification (e.g., radio vs. television vs. streaming vs. self-submitted photo or video vs. in-person reporting, etc.), and so on. In some examples, the conditional asset transfer system(s) 130 can utilize one or more machine-trained models to determine optimal validation or verification source(s) to recommend to a user. In some examples, the conditional asset transfer system(s) 130 can automatically select an optimal validation or verification source for the user and/or the event. In some examples, multiple information sources can be recommended and/or selected to ensure accurate, timely validation or verification. In some examples, information sources can be third-party or external information sources, which can be integrated into a payment resource via an application programming interface or the like. Data can be received from the information sources, and by the validator engine 140, to validate or verify the outcome of an event, as described herein.

At operation 825, the event-based transfer system 100 is configured to, and can, determine, based on the information from the information source, a settled outcome of the event, wherein a direction of transfer of amount of the asset (e.g., to the user's account or from the user's account) is based on the settled outcome of the event (e.g., whether the settled outcome is one possible outcome or another possible outcome).

In some examples, the information from the information source includes a news article from a news source, and determining the settled outcome of the event based on the information from the information source includes determining the settled outcome of the event based on parsing the news article from the news source (e.g., using the trained ML model(s) 145) to find an indication of the settled outcome in the news article. In some examples, the information from the information source includes a feed from a social media platform, and determining the settled outcome of the event based on the information from the information source includes determining the settled outcome of the event based on parsing the feed from the social media platform (e.g., using the trained ML model(s) 145) to find an indication of the settled outcome in the feed from the social media platform. In some examples, the information from the information source includes at least one image of a scene, and wherein the settled outcome of the event based on the information from the information source includes determining the settled outcome of the event based on an image analysis (e.g., using the trained ML model(s) 145) of the at least one image of the scene to detect an indication of the settled outcome depicted at least one image of the scene. In some examples, the information from the information source includes biometric sensor data from a wearable device, and determining the settled outcome of the event based on the information from the information source includes determining the settled outcome of the event based on a sensor data analysis of the biometric sensor data from the wearable device to detect an indication of the settled outcome in the biometric sensor data from the wearable device. In some examples, the information from the information source includes a transaction history of the user, and determining the settled outcome of the event based on the information from the information source includes determining the settled outcome of the event based on a tracking of the transaction history of the user to detect an indication of the settled outcome in the transaction history of the user.

At operation 830, the event-based transfer system 100 is configured to, and can, determine whether or not a settled outcome of the event is determined. If the settled outcome of the event is not yet determined (e.g., the outcome is still pending and not yet settled or the settled outcome is not yet known or validated by the event-based transfer system 100), operation 830 is followed by operation 815, operation 820, and/or operation 825. If the settled outcome of the event is determined at operation 830, then operation 830 is followed by operation 835.

In some examples, the event-based transfer system 100 is configured to, and can, from the at least one user device, an indication that the settled outcome is validated via the at least one user device. Validation can be performed as discussed with respect to the validator engine 140 and/or the verification of FIG. 7B.

At operation 835, the event-based transfer system 100 is configured to, and can, automatically transmit, to at least one user device, an alert indicating the settled outcome of the event and the direction of transfer of amount of the asset.

In some examples, the at least one user device is associated with at least one of the user or another user. For instance, the at least one user device can be the first user device 170, the second user device 185, the user device 215, the user device 315A, the user device 315B, the user device 415, or the user device 515, any of the computing systems of FIG. 7A-7B, or a combination thereof.

At operation 840, the event-based transfer system 100 is configured to, and can, cause the at least one user device to surface the alert within a local application on the at least one user device. Examples of such an alert include the UI 250, the UI 350, the UI 355, or the UI 450.

At operation 845, the event-based transfer system 100 is configured to, and can, automatically facilitate, based on the direction of transfer of the amount of the asset, the transfer of the amount of the asset between the first account and the second account. In some examples, based on the settled outcome, the transfer of the amount of the asset is from the first account to the second account. In some examples, based on the settled outcome, the transfer of the amount of the asset is from the second account to the first account.

In some examples, the event-based transfer system 100 is configured to, and can, receive contextual information associated with the user and identify the event as being relevant to the user based on contextual information. Based at least in part on the identifying, an indication of the event is surfaced to the user at a time or a location relevant to the event.

In some examples, the event-based transfer system 100 is configured to, and can, predict the settled outcome of the event based on the tracking of the status of the event, and can prepare, based on the prediction, at least a portion of the transfer of the amount of the asset before determining the settled outcome of the event.

In some examples, the transfer of the amount of the asset between the first account and the second account is part of a transfer of a second amount of the asset between a first plurality of accounts and a second plurality of accounts. The first plurality of accounts includes the first account, and the second plurality of accounts includes the second account. In this way, the transfer of the amount of the asset can be part of a group transfer, as in the transfer for the gaming tournament event 520 of FIG. 5.

In some examples, the event-based transfer system 100 is configured to, and can, receive an indication that the settled outcome is in dispute. The event-based transfer system 100 can delay the facilitating of the transfer of the amount of the asset based on the indication until receipt of an indication of a resolution of the dispute. The event-based transfer system 100 can receive an indication of the resolution of the dispute.

In some examples, the event-based transfer system 100 is configured to, and can, receive an indication of a change to the settled outcome. The event-based transfer system 100 can, in response to receiving the indication of the change to the settled outcome, automatically transmit a second alert indicating the change to at least one user device, cause the at least one user device to surface the second alert within the local application on the at least one user device, and automatically facilitate, based on the direction of transfer of the amount of the asset, a second transfer of the asset between the first account and the second account. For instance, if an initial indication suggested that Team A won, but the initial indication turned out to be incorrect and Team B won based on further indications, then any transfer that the conditional asset transfer system(s) 130 may have affected can be reversed using the second transfer.

The event-based transfer system 100 described in FIGS. 8A-8B and otherwise herein can provide technical improvements over other systems that only provide information about events (e.g., news platforms, social media platforms, sports score portals, etc.), which are inefficient because they only provide an avenue to track the status of an event without a way to do anything about the status of the event. The event-based transfer system 100 also provide a technical improvement over other systems that only facilitate asset transfers, which are inefficient because they do not provide the type of automation, conditions, or rules to transfers that are provided using the event-based transfer system 100. For instance, the event-based transfer system 100 can automatically monitor and/or analyze dynamic information sources at operations 820-830 (e.g., in real-time or near-real-time) to track a pending outcome of an event, can automatically determine when the pending outcome becomes a settled outcome of the event, can automatically determine a direction of transfer of a specified amount of a specified asset based on the settled outcome, and can automatically facilitate transfer of the specified amount of the specified asset in the between accounts according to the determined direction (e.g., in operation 845). As used here, "automatic" or "automatically" can refer to the performance of one or more operations without input, or further input, from a user at the time the operation(s) are performed. Automation of the outcome verification and transfer is efficient and frictionless, and allows for the transfer of the amount of the asset to be automatically transferred without any further interaction(s) with any user interface by any user after the initial request (and, in some cases, confirmation(s) by participating user(s)). This improves efficiency in the user interface and experience, and also dramatically reduces bandwidth usage and data storage requirements by limiting user interface interactions that the user(s) conduct to process the transfer.

The event-based transfer system 100 addresses an Internet-centric challenge of alerting a user (e.g., at operations 835-840) with time-sensitive information (e.g., regarding a settled outcome of an event and/or the resulting transfer) even when a user mobile device (e.g., the first user device 170, the second user device 185, the user device 215, the user device 315A, the user device 315B, the user device 415, or the user device 515, any of the computing systems of FIG. 7A-7B, or a combination thereof.) is offline, for instance by activating the local application on the user mobile device when the event-based transfer system 100 and/or the user mobile device come online, and/or by causing the event-based transfer system 100 and/or the user mobile device to come online and activate the local application. The event-based transfer system 100 addresses an Internet-centric challenge of alerting a user (e.g., at operations 835-840) with time-sensitive information (e.g., regarding the settled outcome of the event and/or the resulting transfer) even when an associated local application is closed or in the background, for instance by bringing the local application on the user mobile device from the background or closed state to a foreground state, which can be referred to as surfacing the local application.

In some examples, the event-based transfer system 100 further provides conditional transfers based on outcomes of events that are customized, personalized, and/or tailored to different users, different events, different outcomes, and different assets. The customization may be stored at system(s) (e.g., server(s) and/or distributed ledger(s)) that can be remote from user device(s) of the user(s) to whom the conditional transfers are personalized to. In some examples, the event-based transfer system 100 provides user-level customization even when sifting through enormous volumes of data in dynamic event information feeds without becoming intractably complex, for instance, by comparing information about the events to stored information about the conditional transfer (e.g., identifying what outcome(s) trigger the transfer). This improves efficiency in the user interface and experience, and also dramatically reduces bandwidth usage and data storage requirements by limiting what is shared with users to recommended causes that are determined to be relevant to the user.

In some examples, the event-based transfer system 100 further provide customized interactive elements, such as specially configured identifiers having a particular syntax, quick response (QR) codes, or near field communication (NFC) tags, that can be generated on-the-fly, for example, in response to initiating the conditional transfer for the event. The customized interactive elements can provide a frictionless way to allow another user to join as parties to the conditional transfer, for instance by using the user device of the other user to scan the QR code, tap the NFC tag, or otherwise interact with the interactive element. In some examples, the interaction with the interactive element provides a technical solution to improve security by providing additional factors of authentication (e.g., two-factor authentication or N-factor authentication, where Nis greater than or equal to two) for the conditional transfer, on top of other factors of authentication such as passwords, personal identification number (PIN) codes, signatures, biometric sensor-based authentication, and the like.

In some examples, the event-based transfer system 100 further provide for new kinds of storage elements (e.g., files, ledgers), such as distributed ledgers and/or smart contracts associated with the record of operation 810, that are tailored to different users and allow an event-based transfer system 100 to automatically identify satisfaction of a condition—a specific settled outcome to an event—and even automatically conduct an associated transfer, all even before a user device has detected the settled outcome.

In some examples, the event-based transfer system 100 uses an unconventional distributed architecture (e.g., including the sensor(s) 110, the event tracking system(s) 115, the data source(s) 125, the conditional asset tracking system(s) 130, the asset management system(s) 150, the first user device 170, the second user device 185, the blockchain ledger 600, other distributed ledger(s), smart contract(s), the verifying computer systems of FIGS. 7A-7B, other systems discussed herein, or combinations thereof) to automatically monitor and track event data, to automatically analyze dynamic information sources (e.g., in real-time or near-real-time) to track a pending outcome of an event, to automatically determine when the pending outcome becomes a settled outcome of the event, to automatically determine a direction of transfer of a specified amount of a specified asset based on the settled outcome, and to automatically facilitate transfer of the specified amount of the specified asset in the between accounts according to the determined direction. A centralized system can make it very difficult to keep up with the massive record flows of event data, for instance from sensors and various network-based dynamic data feed systems. Dynamic systems, such as an event-based transfer system 100 that uses distributed ledger(s) and/or smart contract(s), can allow the event-based transfer system 100 to improve scalability and efficiency, for instance reducing the volume of even data sent to any one system, and spreading computational load from even data analysis from any one system.

FIG. 8B is a flow diagram illustrating a process 800B for event-based asset transfer. The process 800B may be performed by the event-based transfer system 100 or a subset thereof, such as the event tracking system(s) 115, the conditional asset transfer system(s) 130, the asset management system(s) 150, or a combination thereof.

At operation 850, the event-based transfer system 100 is configured to, and can, store a condition associated with event, an asset to be transferred if settled outcome satisfies condition, and account identifiers (e.g., of accounts of the user(s) who are wagering on the outcome of the event). In some examples, the conditions are examples of data stored in the record of operation 810. In some examples, the conditions include data stored in the record of operation 810.

At operation 855, the event-based transfer system 100 is configured to, and can, monitor event data to determine if pending outcome becomes settled, and/or if condition is satisfied. In some examples, operation 855 includes operation(s) 815, 820, 825, and/or 830, or vice versa. At operation 860, the event-based transfer system 100 is configured to, and can, verify the outcome becoming settled and/or condition being satisfied, for instance as discussed with respect to the validator engine 140 and/or the verification of FIG.

7B. In some examples, operation 860 includes operation(s) 815, 820, 825, and/or 830, or vice versa. If the verification of operation 860 fails, then operation 860 can be followed by operation 850 and/or operation 860. If the verification of operation 860 succeeds, then operation 860 can be followed by operation 865.

At operation 865, the event-based transfer system 100 is configured to, and can, automatically initiate transfer of asset between first account and second account (e.g., the transfer 195). In some examples, operation 865 includes operation(s) 835, 840, and/or 845, or vice versa.

Figure 9:
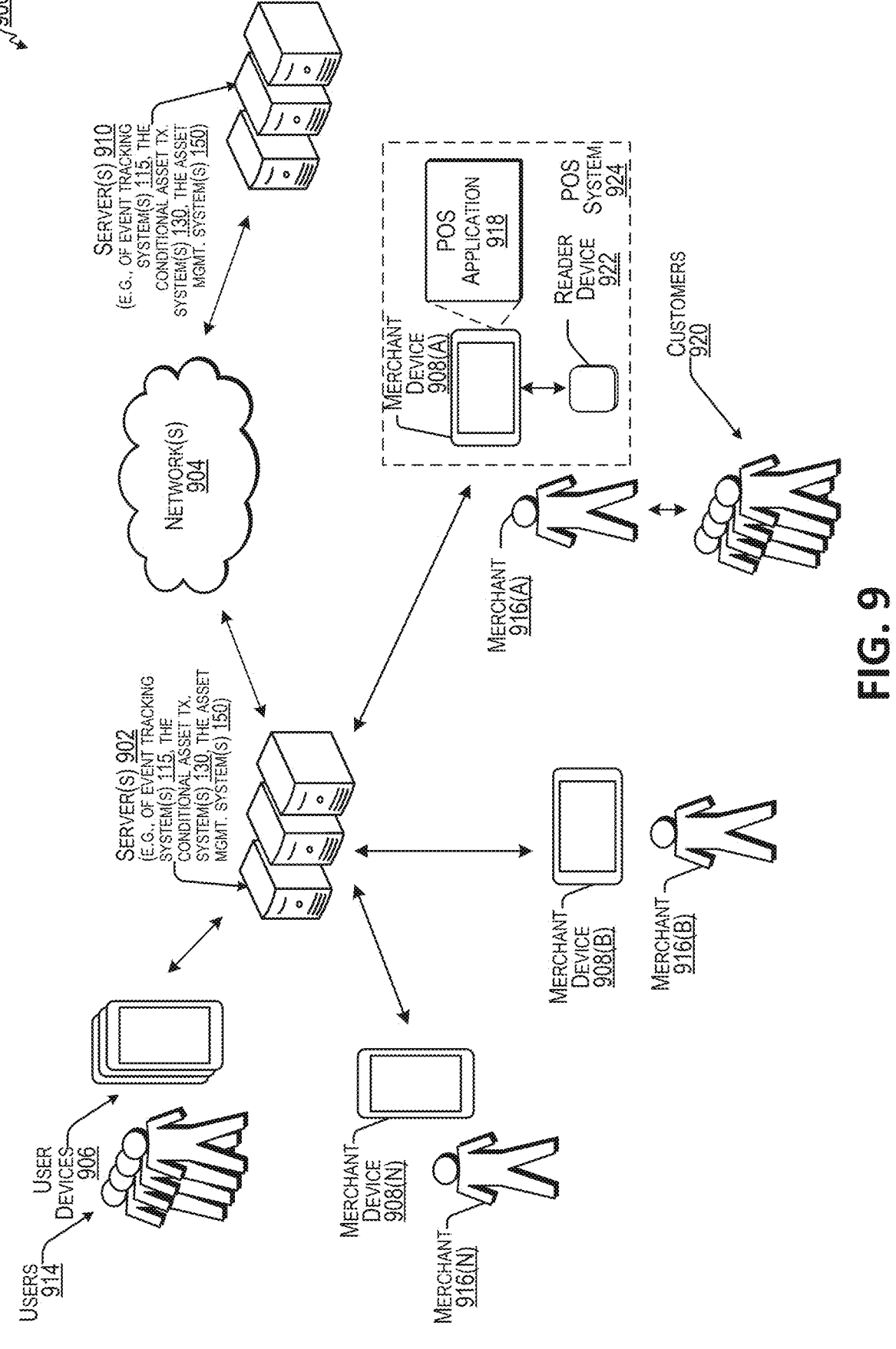
FIG. 9 is a block diagram illustrating an environment that includes various devices associated with one or more merchants, in accordance with some examples.

FIG. 9 is a block diagram illustrating an environment 900 that includes various devices associated with one or more merchants. The environment 900 includes server(s) 902 that can communicate over a network 904 with user devices 906 (which, in some examples can be merchant devices 908 (individually, 908(A)-908(N))) and/or server(s) 910 associated with third-party service provider(s). The server(s) 902 can be associated with a service provider that can provide one or more services for the benefit of users 914, as described below. Actions attributed to the service provider can be performed by the server(s) 902.

The first user 165 and/or the second user 180 may be examples of one of the users 914, the customers 920, and/or merchants 916(A)-916(N). The first user device 170 and/or the second user device 185 may be examples of one of the user devices 906, the merchant devices 908(A)-908(N), the reader device 922, and/or the POS system 924. Examples of the payment resource 175 and/or the payment resource 190 can include the POS application 918 as well as any local applications that run on the user devices 906, the merchant devices 908(A)-908(N), the reader device 922, and/or the POS system 924. In some examples, the merchants 916(A)-916(N) can be recipient entities, and the customers 920 (and/or the users 914) can be examples of the first user 165 and/or the second user 180, with the purchase(s) described in FIG. 9 being examples of the transfer 195.

The environment 900 can include a plurality of user devices 906, as described above. Each one of the plurality of user devices 906 can be any type of computing device such as a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, etc. In some examples, individual ones of the user devices can be operable by users 914. The users 914 can be referred to as customers, buyers, merchants, sellers, borrowers, employees, employers, payors, payees, couriers and so on. The users 914 can interact with the user devices 906 via user interfaces presented via the user devices 906. In at least one example, a user interface can be presented via a web browser, or the like. In other examples, a user interface can be presented via an application, such as a mobile application or desktop application, which can be provided by the service provider or which can be an otherwise dedicated application. In some examples, individual of the user devices 906 can have an instance or versioned instance of an application, which can be downloaded from an application store, for example, which can present the user interface(s) described herein. In at least one example, a user 914 can interact with the user interface via touch input, spoken input, or any other type of input.

As described above, in at least one example, the users 914 can include merchants 916 (individually, 916(A)-916(N)).

In an example, the merchants 916 can operate respective merchant devices 908, which can be user devices 906 configured for use by merchants 916. For the purpose of this discussion, a "merchant" can be any entity that offers items (e.g., goods or services) for purchase or other means of acquisition (e.g., rent, borrow, barter, etc.). The merchants 916 can offer items for purchase or other means of acquisition via brick-and-mortar stores, mobile stores (e.g., pop-up shops, food trucks, etc.), online stores, combinations of the foregoing, and so forth. In some examples, at least some of the merchants 916 can be associated with a same entity but can have different merchant locations and/or can have franchise/franchisee relationships. In additional or alternative examples, the merchants 916 can be different merchants. That is, in at least one example, the merchant 916(A) is a different merchant than the merchant 916(B) and/or the merchant 916(C).

For the purpose of this discussion, "different merchants" can refer to two or more unrelated merchants. "Different merchants" therefore can refer to two or more merchants that are different legal entities (e.g., natural persons and/or corporate persons) that do not share accounting, employees, branding, etc. "Different merchants," as used herein, have different names, employer identification numbers (EIN) s, lines of business (in some examples), inventories (or at least portions thereof), and/or the like. Thus, the use of the term "different merchants" does not refer to a merchant with various merchant locations or franchise/franchisee relationships. Such merchants—with various merchant locations or franchise/franchisee relationships—can be referred to as merchants having different merchant locations and/or different commerce channels.

Each merchant device 908 can have an instance of a POS application 918 stored thereon. The POS application 918 can configure the merchant device 908 as a POS terminal, which enables the merchant 916(A) to interact with one or more customers 920. As described above, the users 914 can include customers, such as the customers 920 shown as interacting with the merchant 916(A). For the purpose of this discussion, a "customer" can be any entity that acquires items from merchants. While only two customers 920 are illustrated in FIG. 9, any number of customers 920 can interact with the merchants 916. Further, while FIG. 9 illustrates the customers 920 interacting with the merchant 916(A), the customers 920 can interact with any of the merchants 916.

In at least one example, interactions between the customers 920 and the merchants 916 that involve the exchange of funds (from the customers 920) for items (from the merchants 916) can be referred to as "transactions." In at least one example, the POS application 918 can determine transaction data associated with the POS transactions. Transaction data can include payment information, which can be obtained from a reader device 922 associated with the merchant device 908(A), user authentication data, purchase amount information, point-of-purchase information (e.g., item(s) purchased, date of purchase, time of purchase, etc.), etc. The POS application 918 can send transaction data to the server(s) 902 such that the server(s) 902 can track transactions of the customers 920, merchants 916, and/or any of the users 914 over time. Furthermore, the POS application 918 can present a UI to enable the merchant 916(A) to interact with the POS application 918 and/or the service provider via the POS application 918.

In at least one example, the merchant device 908(A) can be a special-purpose computing device configured as a POS terminal (via the execution of the POS application 918). In at least one example, the POS terminal may be connected to a reader device 922, which is capable of accepting a variety of payment instruments, such as credit cards, debit cards, gift cards, short-range communication based payment instruments, and the like, as described below. In at least one example, the reader device 922 can plug in to a port in the merchant device 908(A), such as a microphone port, a headphone port, an audio-jack, a data port, or other suitable port. In additional or alternative examples, the reader device 922 can be coupled to the merchant device 908(A) via another wired or wireless connection, such as via a Bluetooth®, BLE, and so on. Additional details are described below with reference to FIG. 12. In some examples, the reader device 922 can read information from alternative payment instruments including, but not limited to, wrist-bands and the like.

In some examples, the reader device 922 may physically interact with payment instruments such as magnetic stripe payment cards, EMV payment cards, and/or short-range communication (e.g., near field communication (NFC), radio frequency identification (RFID), Bluetooth®, Bluetooth® low energy (BLE), etc.) payment instruments (e.g., cards or devices configured for tapping). The POS terminal may provide a rich user interface, communicate with the reader device 922, and communicate with the server(s) 902, which can provide, among other services, a payment processing service. The server(s) 902 associated with the service provider can communicate with server(s) 910, as described below. In this manner, the POS terminal and reader device 922 may collectively process transaction(s) between the merchants 916 and customers 920. In some examples, POS terminals and reader devices can be configured in one-to-one pairings. In other examples, the POS terminals and reader devices can be configured in many-to-one pairings (e.g., one POS terminal coupled to multiple reader devices or multiple POS terminals coupled to one reader device). In some examples, there could be multiple POS terminal(s) connected to a number of other devices, such as "secondary" terminals, e.g., back-of-the-house systems, printers, line-buster devices, POS readers, and the like, to allow for information from the secondary terminal to be shared between the primary POS terminal(s) and secondary terminal(s), for example via short-range communication technology. This kind of arrangement may also work in an offline-online scenario to allow one device (e.g., secondary terminal) to continue taking user input, and synchronize data with another device (e.g., primary terminal) when the primary or secondary terminal switches to online mode. In other examples, such data synchronization may happen periodically or at randomly selected time intervals.

While the POS terminal and the reader device 922 of the POS system 924 are shown as separate devices, in additional or alternative examples, the POS terminal and the reader device 922 can be part of a single device. In some examples, the reader device 922 can have a display integrated therein for presenting information to the customers 920. In additional or alternative examples, the POS terminal can have a display integrated therein for presenting information to the customers 920. POS systems, such as the POS system 924, may be mobile, such that POS terminals and reader devices may process transactions in disparate locations across the world. POS systems can be used for processing card-present transactions and card-not-present (CNP) transactions, as described below.

A card-present transaction is a transaction where both a customer 920 and his or her payment instrument are physically present at the time of the transaction. Card-present transactions may be processed by swipes, dips, taps, or any other interaction between a physical payment instrument (e.g., a card), or otherwise present payment instrument, and a reader device 922 whereby the reader device 922 is able to obtain payment data from the payment instrument. A swipe is a card-present transaction where a customer 920 slides a card, or other payment instrument, having a magnetic strip through a reader device 922 that captures payment data contained in the magnetic strip. A dip is a card-present transaction where a customer 920 inserts a payment instrument having an embedded microchip (i.e., chip) into a reader device 922 first. The dipped payment instrument remains in the payment reader until the reader device 922 prompts the customer 920 to remove the card, or other payment instrument. While the payment instrument is in the reader device 922, the microchip can create a one-time code which is sent from the POS system 924 to the server(s) 910 (which can be associated with third-party service providers that provide payment services, including but not limited to, an acquirer bank, an issuer, and/or a card payment network (e.g., Mastercard®, VISA®, etc.)) to be matched with an identical one-time code. A tap is a card-present transaction where a customer 920 may tap or hover his or her payment instrument (e.g., card, electronic device such as a smart phone running a payment application, etc.) over a reader device 922 to complete a transaction via short-range communication (e.g., NFC, RFID, Bluetooth®, BLE, etc.). Short-range communication enables the payment instrument to exchange information with the reader device 922. A tap may also be called a contactless payment.

A CNP transaction is a transaction where a card, or other payment instrument, is not physically present at the POS such that payment data is required to be manually keyed in (e.g., by a merchant, customer, etc.), or payment data is required to be recalled from a card-on-file data store, to complete the transaction.

The POS system 924, the server(s) 902, and/or the server(s) 910 may exchange payment information and transaction data to determine whether transactions are authorized. For example, the POS system 924 may provide encrypted payment data, user authentication data, purchase amount information, point-of-purchase information, etc. (collectively, transaction data) to server(s) 902 over the network(s) 904. The server(s) 902 may send the transaction data to the server(s) 910. As described above, in at least one example, the server(s) 910 can be associated with third-party service providers that provide payment services, including but not limited to, an acquirer bank, an issuer, and/or a card payment network (e.g., Mastercard®, VISA®, etc.)

For the purpose of this discussion, the "payment service providers" can be acquiring banks ("acquirer"), issuing banks ("issuer"), card payment networks, and the like. In an example, an acquirer is a bank or financial institution that processes payments (e.g., credit or debit card payments) and can assume risk on behalf of merchants(s). An acquirer can be a registered member of a card association (e.g., Visa®, MasterCard®), and can be part of a card payment network. The acquirer (e.g., the server(s) 910 associated therewith) can send a fund transfer request to a server computing device of a card payment network (e.g., Mastercard®, VISA®, etc.) to determine whether the transaction is authorized or deficient. In at least one example, the service provider can serve as an acquirer and connect directly with the card payment network.

The card payment network (e.g., the server(s) 910 associated therewith) can forward the fund transfer request to an issuing bank (e.g., "issuer"). The issuer is a bank or financial institution that offers a financial account (e.g., credit or debit card account) to a user. An issuer can issue payment cards to users and can pay acquirers for purchases made by cardholders to which the issuing bank has issued a payment card. The issuer (e.g., the server(s) 910 associated therewith) can make a determination as to whether the customer has the capacity to absorb the relevant charge associated with the payment transaction. In at least one example, the service provider can serve as an issuer and/or can partner with an issuer. The transaction is either approved or rejected by the issuer and/or the card payment network (e.g., the server(s) 910 associated therewith), and a payment authorization message is communicated from the issuer to the POS device via a path opposite of that described above, or via an alternate path.

As described above, the server(s) 910, which can be associated with payment service provider(s), may determine whether the transaction is authorized based on the transaction data, as well as information relating to parties to the transaction (e.g., the customer 920 and/or the merchant 916(A)). The server(s) 910 may send an authorization notification over the network(s) 904 to the server(s) 902, which may send the authorization notification to the POS system 924 over the network(s) 904 to indicate whether the transaction is authorized. The server(s) 902 may also transmit additional information such as transaction identifiers to the POS system 924. In one example, the server(s) 902 may include a merchant application and/or other functional components for communicating with the POS system 924 and/or the server(s) 910 to authorize or decline transactions.

Based on the authentication notification that is received by the POS system 924 from server(s) 902, the merchant 916(A) may indicate to the customer 920 whether the transaction has been approved. In some examples, approval may be indicated at the POS system 924, for example, at a display of the POS system 924. In other examples, such as with a smart phone or watch operating as a short-range communication payment instrument, information about the approved transaction may be provided to the short-range communication payment instrument for presentation via a display of the smart phone or watch. In some examples, additional or alternative information can additionally be presented with the approved transaction notification including, but not limited to, receipts, special offers, coupons, or loyalty program information.

As mentioned above, the service provider can provide, among other services, payment processing services, inventory management services, catalog management services, business banking services, financing services, lending services, reservation management services, web-development services, payroll services, employee management services, appointment services, loyalty tracking services, restaurant management services, order management services, fulfillment services, onboarding services, identity verification (IDV) services, and so on. In some examples, the users 914 can access all of the services of the service provider. In other examples, the users 914 can have gradated access to the services, which can be based on risk tolerance, IDV outputs, subscriptions, and so on. In at least one example, access to such services can be availed to the merchants 916 via the POS application 918. In additional or alternative examples, each service can be associated with its own access point (e.g., application, web browser, etc.).

The service provider can offer payment processing services for processing payments on behalf of the merchants 916, as described above. For example, the service provider can provision payment processing software, payment processing hardware and/or payment processing services to merchants 916, as described above, to enable the merchants 916 to receive payments from the customers 920 when conducting POS transactions with the customers 920. For instance, the service provider can enable the merchants 916 to receive cash payments, payment card payments, and/or electronic payments from customers 920 for POS transactions and the service provider can process transactions on behalf of the merchants 916.

As the service provider processes transactions on behalf of the merchants 916, the service provider can maintain accounts or balances for the merchants 916 in one or more ledgers. For example, the service provider can analyze transaction data received for a transaction to determine an amount of funds owed to a merchant 916(A) for the transaction. In at least one example, such an amount can be a total purchase price less fees charged by the service provider for providing the payment processing services. Based on determining the amount of funds owed to the merchant 916(A), the service provider can deposit funds into an account of the merchant 916(A). The account can have a stored balance, which can be managed by the service provider. The account can be different from a conventional bank account at least because the stored balance is managed by a ledger of the service provider and the associated funds are accessible via various withdrawal channels including, but not limited to, scheduled deposit, same-day deposit, instant deposit, and a linked payment instrument.

A scheduled deposit can occur when the service provider transfers funds associated with a stored balance of the merchant 916(A) to a bank account of the merchant 916(A) that is held at a bank or other financial institution (e.g., associated with the server(s) 910). Scheduled deposits can occur at a prearranged time after a POS transaction is funded, which can be a business day after the POS transaction occurred, or sooner or later. In some examples, the merchant 916(A) can access funds prior to a scheduled deposit. For instance, the merchant 916(A) may have access to same-day deposits (e.g., wherein the service provider deposits funds from the stored balance to a linked bank account of the merchant on a same day as POS transaction, in some examples prior to the POS transaction being funded) or instant deposits (e.g., wherein the service provider deposits funds from the stored balance to a linked bank account of the merchant on demand, such as responsive to a request). Further, in at least one example, the merchant 916(A) can have a payment instrument that is linked to the stored balance that enables the merchant to access the funds without first transferring the funds from the account managed by the service provider to the bank account of the merchant 916(A).

In at least one example, the service provider may provide inventory management services. That is, the service provider may provide inventory tracking and reporting. Inventory management services may enable the merchant 916(A) to access and manage a database storing data associated with a quantity of each item that the merchant 916(A) has available (i.e., an inventory). Furthermore, in at least one example, the service provider can provide catalog management services to enable the merchant 916(A) to maintain a catalog, which can be a database storing data associated with items that the merchant 916(A) has available for acquisition (i.e., catalog management services). In at least one example, the catalog may include a plurality of data items and a data item of the plurality of data items may represent an item that the merchant 9121(A) has available for acquisition. The service provider can offer recommendations related to pricing of the items, placement of items on the catalog, and multi-party fulfilment of the inventory.

In at least one example, the service provider can provide business banking services, which allow the merchant 916(A) to track deposits (from payment processing and/or other sources of funds) into an account of the merchant 916(A), payroll payments from the account (e.g., payments to employees of the merchant 916(A)), payments to other merchants (e.g., business-to-business) directly from the account or from a linked debit card, withdrawals made via scheduled deposit and/or instant deposit, etc. Furthermore, the business banking services can enable the merchant 916(A) to obtain a customized payment instrument (e.g., credit card), check how much money they are earning (e.g., via presentation of available earned balance), understand where their money is going (e.g., via deposit reports (which can include a breakdown of fees), spend reports, etc.), access/use earned money (e.g., via scheduled deposit, instant deposit, linked payment instrument, etc.), feel in control of their money (e.g., via management of deposit schedule, deposit speed, linked instruments, etc.), etc. Moreover, the business banking services can enable the merchants 916 to visualize their cash flow to track their financial health, set aside money for upcoming obligations (e.g., savings), organize money around goals, etc.

In at least one example, the service provider can provide financing services and products, such as via business loans, consumer loans, fixed term loans, flexible term loans, and the like. In at least one example, the service provider can utilize one or more risk signals to determine whether to extend financing offers and/or terms associated with such financing offers.

In at least one example, the service provider can provide financing services for offering and/or lending a loan to a borrower that is to be used for, in some instances, financing the borrower's short-term operational needs (e.g., a capital loan). For instance, a potential borrower that is a merchant can obtain a capital loan via a capital loan product in order to finance various operational costs (e.g., rent, payroll, inventory, etc.). In at least one example, the service provider can offer different types of capital loan products. For instance, in at least one example, the service provider can offer a daily repayment loan product, wherein a capital loan is repaid daily, for instance, from a portion of transactions processed by the payment processing service on behalf of the borrower. Additionally and/or alternatively, the service provider can offer a monthly repayment loan product, wherein a capital loan is repaid monthly, for instance, via a debit from a bank account linked to the payment processing service. The credit risk of the merchant may be evaluated using risk models that take into account factors, such as payment volume, credit risk of similarly situated merchants, past transaction history, seasonality, credit history, and so on.

Additionally or alternatively, the service provider can provide financing services for offering and/or lending a loan to a borrower that is to be used for, in some instances, financing the borrower's consumer purchase (e.g., a consumer loan). In at least one example, a borrower can submit a request for a loan to enable the borrower to purchase an item from a merchant, which can be one of the merchants 916. The service provider can generate the loan based at least in part on determining that the borrower purchased or intends to purchase the item from the merchant. The loan can be associated with a balance based on an actual purchase price of the item and the borrower can repay the loan over time. In some examples, the borrower can repay the loan via installments, which can be paid via funds managed and/or maintained by the service provider (e.g., from payments owed to the merchant from payments processed on behalf of the merchant, funds transferred to the merchant, etc.). The service provider can offer specific financial products, such as payment instruments, tied specifically to the loan products. For example, in one implementation, the server provider 912 associates capital to a merchant or customer's debit card, where the use of the debit card is defined by the terms of the loan. In some examples, the merchant may only use the debit card for making specific purchases. In other examples, the "installment" associated with the loan product is credited directly via the payment instrument. The payment instrument is thus customized to the loan and/or the parties associated with the loan.

The service provider can provide web-development services, which enable users 914 who are unfamiliar with HTML, XML, Javascript, CSS, or other web design tools to create and maintain professional and aesthetically pleasing websites. Some of these web page editing applications allow users to build a web page and/or modify a web page (e.g., change, add, or remove content associated with a web page). Further, in addition to websites, the web-development services can create and maintain other online omni-channel presences, such as social media posts for example. In some examples, the resulting web page(s) and/or other content items can be used for offering item(s) for sale via an online/e-commerce platform. That is, the resulting web page(s) and/or other content items can be associated with an online store or offering by the one or more of the merchants 916. In at least one example, the service provider can recommend and/or generate content items to supplement omni-channel presences of the merchants 916. That is, if a merchant of the merchants 916 has a web page, the service provider-via the web-development or other services—can recommend and/or generate additional content items to be presented via other channel(s), such as social media, email, etc.

Furthermore, the service provider can provide payroll services to enable employers to pay employees for work performed on behalf of employers. In at least one example, the service provider can receive data that includes time worked by an employee (e.g., through imported timecards and/or POS interactions), sales made by the employee, gratuities received by the employee, and so forth. Based on such data, the service provider can make payroll payments to employee(s) on behalf of an employer via the payroll service. For instance, the service provider can facilitate the transfer of a total amount to be paid out for the payroll of an employee from the bank of the employer to the bank of the service provider to be used to make payroll payments. In at least one example, when the funds have been received at the bank of the service provider, the service provider can pay the employee, such as by check or direct deposit, often a day, a week, or more after when the work was actually performed by the employee. In additional or alternative examples, the service provider can enable employee(s) to receive payments via same-day or instant deposit based at least in part on risk and/or reliability analyses performed by the service provider.

Moreover, in at least one example, the service provider can provide employee management services for managing schedules of employees. Further, the service provider can provide appointment services for enabling users 914 to set schedules for scheduling appointments and/or users 914 to schedule appointments.

In some examples, the service provider can provide restaurant management services to enable users 914 to make and/or manage reservations, to monitor front-of-house and/or back-of-house operations, and so on. In such examples, the merchant device(s) 908 and/or server(s) 902 can be configured to communicate with one or more other computing devices, which can be located in the front-of-house (e.g., POS device(s)) and/or back-of-house (e.g., kitchen display system(s) (KDS)). In at least one example, the service provider can provide order management services and/or fulfillment services to enable restaurants to manage open tickets, split tickets, and so on and/or manage fulfillment services. In some examples, such services can be associated with restaurant merchants, as described above. In additional or alternative examples, such services can be any type of merchant.

In at least one example, the service provider can provide fulfilment services, which can use couriers for delivery, wherein couriers can travel between multiple locations to provide delivery services, photography services, etc. Couriers can be users 914 who can travel between locations to perform services for a requesting user 914 (e.g., deliver items, capture images, etc.). In some examples, the courier can receive compensation from the service provider. The courier can employ one or more vehicles, such as automobiles, bicycles, scooters, motorcycles, buses, airplanes, helicopters, boats, skateboards, etc. Although, in other instances the courier can travel by foot or otherwise without a vehicle. Some examples discussed herein enable people to participate as couriers in a type of crowdsourced service economy. Here, essentially any person with a mobile device is able to immediately become a courier, or cease to be a courier, in a courier network that provides services as described herein. In at least one example, the couriers can be unmanned aerial vehicles (e.g., drones), autonomous vehicles, or any other type of vehicle capable of receiving instructions for traveling between locations. In some examples, the service provider can receive requests for courier services, automatically assign the requests to active couriers, and communicate dispatch instructions to couriers via user interface (e.g., application, web browser, or other access point) presented via respective devices 906.

In some examples, the service provider can provide omni-channel fulfillment services. For instance, if a customer places an order with a merchant and the merchant cannot fulfill the order because one or more items are out of stock or otherwise unavailable, the service provider can leverage other merchants and/or sales channels that are part of the platform of the service provider to fulfill the customer's order. That is, another merchant can provide the one or more items to fulfill the order of the customer. Furthermore, in some examples, another sales channel (e.g., online, brick-and-mortar, etc.) can be used to fulfill the order of the customer.

In some examples, the service provider can enable conversational commerce via conversational commerce services, which can use one or more machine learning mechanisms to analyze messages exchanged between two or more users 914, voice inputs into a virtual assistant or the like, to determine intents of user(s) 914. In some examples, the service provider can utilize determined intents to automate customer service, offer promotions, provide recommendations, or otherwise interact with customers in real-time. In at least one example, the service provider can integrate products and services, and payment mechanisms into a communication platform (e.g., messaging, etc.) to enable customers to make purchases, or otherwise transact, without having to call, email, or visit a web page or other channel of a merchant. That is, conversational commerce alleviates the need for customers to toggle back and forth between conversations and web pages to gather information and make purchases.

In at least one example, a user 914 may be new to the service provider such that the user 914 that has not registered (e.g., subscribed to receive access to one or more services offered by the service provider) with the service provider. The service provider can offer onboarding services for registering a potential user 914 with the service provider. In some examples, onboarding can involve presenting various questions, prompts, and the like to a potential user 914 to obtain information that can be used to generate a profile for the potential user 914. In at least one example, the service provider can provide limited or short-term access to its services prior to, or during, onboarding (e.g., a user of a peer-to-peer payment service can transfer and/or receive funds prior to being fully onboarded, a merchant can process payments prior to being fully onboarded, etc.). In at least one example, responsive to the potential user 914 providing all necessary information, the potential user 914 can be onboarded to the service provider. In such an example, any limited or short-term access to services of the service provider can be transitioned to more permissive (e.g., less limited) or longer-term access to such services.

The service provider can be associated with IDV services, which can be used by the service provider for compliance purposes and/or can be offered as a service, for instance to third-party service providers (e.g., associated with the server(s) 910). That is, the service provider can offer IDV services to verify the identity of users 914 seeking to use or using their services. Identity verification requires a customer (or potential customer) to provide information that is used by compliance departments to prove that the information is associated with an identity of a real person or entity. In at least one example, the service provider can perform services for determining whether identifying information provided by a user 914 accurately identifies the customer (or potential customer) (i.e., Is the customer who they say they are?).

The service provider is capable of providing additional or alternative services and the services described above are offered as a sampling of services. In at least one example, the service provider can exchange data with the server(s) 910 associated with third-party service providers. Such third-party service providers can provide information that enables the service provider to provide services, such as those described above. In additional or alternative examples, such third-party service providers can access services of the service provider. That is, in some examples, the third-party service providers can be subscribers, or otherwise access, services of the service provider.

Techniques described herein can be configured to operate in both real-time/online and offline modes. "Online" modes refer to modes when devices are capable of communicating with the service provider (e.g., the server(s) 902) and/or the server(s) 910 via the network(s) 904. In some examples, the merchant device(s) 908 are not capable of connecting with the service provider (e.g., the server(s) 902) and/or the server(s) 910, due to a network connectivity issue, for example. In additional or alternative examples, the server(s) 902 are not capable of communicating with the server(s) 910 due to network connectivity issue, for example. In such examples, devices may operate in "offline" mode where at least some payment data is stored (e.g., on the merchant device(s) 908) and/or the server(s) 902 until connectivity is restored and the payment data can be transmitted to the server(s) 902 and/or the server(s) 910 for processing.

In at least one example, the service provider can be associated with a hub, such as an order hub, an inventory hub, a fulfillment hub and so on, which can enable integration with one or more additional service providers (e.g., associated with the additional server(s) 910). In some examples, such additional service providers can offer additional or alternative services and the service provider can provide an interface or other computer-readable instructions to integrate functionality of the service provider into the one or more additional service providers.

Techniques described herein are directed to services provided via a distributed system of user devices 906 that are in communication with one or more server computing devices 902 of the service provider. That is, techniques described herein are directed to a specific implementation—or, a practical application—of utilizing a distributed system of user devices 906 that are in communication with one or more server computing devices 902 of the service provider to perform a variety of services, as described above. The unconventional configuration of the distributed system described herein enables the server(s) 902 that are remotely-located from end-users (e.g., users 914) to intelligently offer services based on aggregated data associated with the end-users, such as the users 914 (e.g., data associated with multiple, different merchants and/or multiple, different buyers), in some examples, in near-real time. Accordingly, techniques described herein are directed to a particular arrangement of elements that offer technical improvements over conventional techniques for performing payment processing services and the like. For small business owners in particular, the business environment is typically fragmented and relies on unrelated tools and programs, making it difficult for an owner to manually consolidate and view such data. The techniques described herein constantly or periodically monitor disparate and distinct merchant accounts, e.g., accounts within the control of the service provider, and those outside of the control of the service provider, to track the business standing (payables, receivables, payroll, invoices, appointments, capital, etc.) of the merchants. The techniques herein provide a consolidated view of a merchant's cash flow, predict needs, preemptively offer recommendations or services, such as capital, coupons, etc., and/or enable money movement between disparate accounts (merchant's, another merchant's, or even payment service's) in a frictionless and transparent manner.

As described herein, artificial intelligence, machine learning, and the like can be used to dynamically make determinations, recommendations, and the like, thereby adding intelligence and context-awareness to an otherwise one-size-fits-all scheme for providing payment processing services and/or additional or alternative services described herein. In some implementations, the distributed system is capable of applying the intelligence derived from an existing user base to a new user, thereby making the onboarding experience for the new user personalized and frictionless when compared to traditional onboarding methods. Thus, techniques described herein improve existing technological processes.

As described above, various graphical user interfaces (GUIs) can be presented to facilitate techniques described herein. Some of the techniques described herein are directed to user interface features presented via GUIs to improve interaction between users 914 and user devices 906. Furthermore, such features are changed dynamically based on the profiles of the users involved interacting with the GUIs.

As such, techniques described herein are directed to improvements to computing systems.

Figure 10:
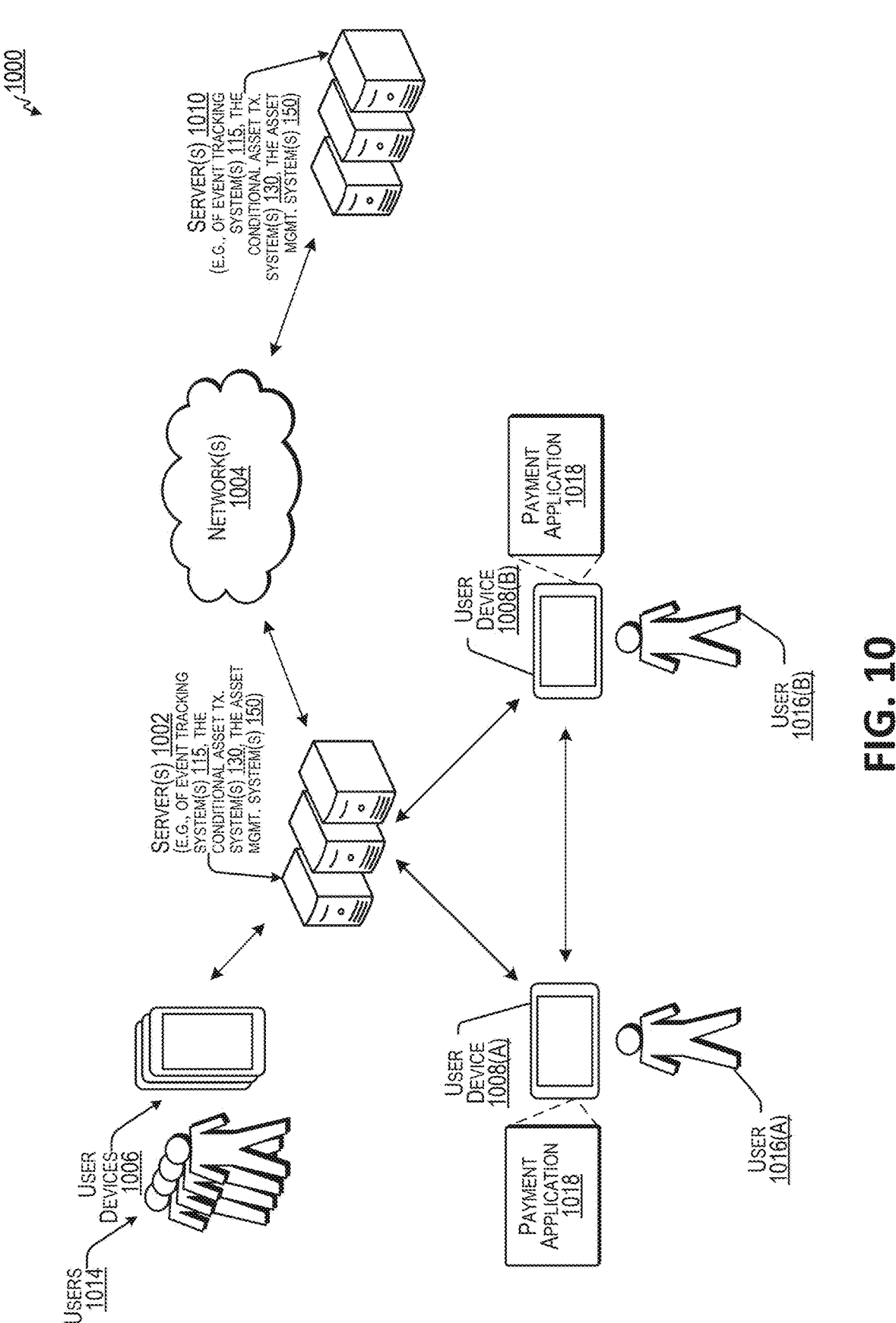
FIG. 10 is a block diagram illustrating an environment that includes various devices associated with one or more payment services, in accordance with some examples.

FIG. 10 is a block diagram illustrating an environment 1000 that includes various devices associated with one or more payment services. The environment 1000 includes server(s) 1002 that can communicate over a network 1004 with user devices 1006 (which, in some examples can be user devices 1008 (individually, 1008(A), 1008(B)) and/or server(s) 1010 associated with third-party service provider(s). The server(s) 1002 can be associated with a service provider that can provide one or more services for the benefit of users 1014, as described below. Actions attributed to the service provider can be performed by the server(s) 1002. In some examples, the service provider referenced in FIG. 9 can be the same or different than the service provider referenced in FIG. 10.

The first user 165 and/or the second user 180 may be examples of one of the users 1014 and/or users 1016(A)-1016(B). The first user device 170 and/or the second user device 185 may be examples of one of the user devices 1006 and/or the user devices 1008(A)-1008(B). Examples of the payment resource 175 and/or the payment resource 190 can include the payment application 1018 as well as any local applications that run on the user devices 1006. In some examples, the user 1016(B) can be a recipient entity, and the user 1016(A) can be an example of the first user 165 and/or the second user 180, with the P2P payment described in FIG. 10 being an example of transfer 195.

The environment 1000 can include a plurality of user devices 1006, as described above. Each one of the plurality of user devices 1006 can be any type of computing device such as a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, etc. In some examples, individual ones of the user devices can be operable by users 1014. The users 1014 can be referred to as customers, buyers, merchants, sellers, borrowers, employees, employers, payors, payees, couriers and so on. The users 1014 can interact with the user devices 1006 via user interfaces presented via the user devices 1006. In at least one example, a user interface can be presented via a web browser, or the like. In other examples, a user interface can be presented via an application, such as a mobile application or desktop application, which can be provided by the service provider or which can be an otherwise dedicated application. In some examples, individual of the user devices 1006 can have an instance or versioned instance of an application, which can be downloaded from an application store, for example, which can present the user interface(s) described herein. In at least one example, a user 1014 can interact with the user interface via touch input, spoken input, or any other type of input.

In at least one example, the service provider can provide a peer-to-peer payment service that enables peer-to-peer payments between two or more users 1014. Two users, user 1016(A) and user 1016(B) are illustrated in FIG. 10 as "peers" in a peer-to-peer payment. In at least one example, the service provider can communicate with instances of a payment application 1018 (or other access point) installed on devices 1006 configured for operation by users 1014. In an example, an instance of the payment application 1018 executing on a first device 1008(A) operated by a payor (e.g., user 1016(A)) can send a request to the service provider to transfer an asset (e.g., fiat currency, non-fiat currency, cryptocurrency, securities, gift cards, and/or related assets) from the payor to a payee (e.g., user 1016(B)) via a peer-to-peer payment. In some examples, assets associated with an account of the payor are transferred to an account of the payee. In some examples, assets can be held at least temporarily in an account of the service provider prior to transferring the assets to the account of the payee.

In some examples, the service provider can utilize a ledger system to track transfers of assets between users 1014.

Figure 11:
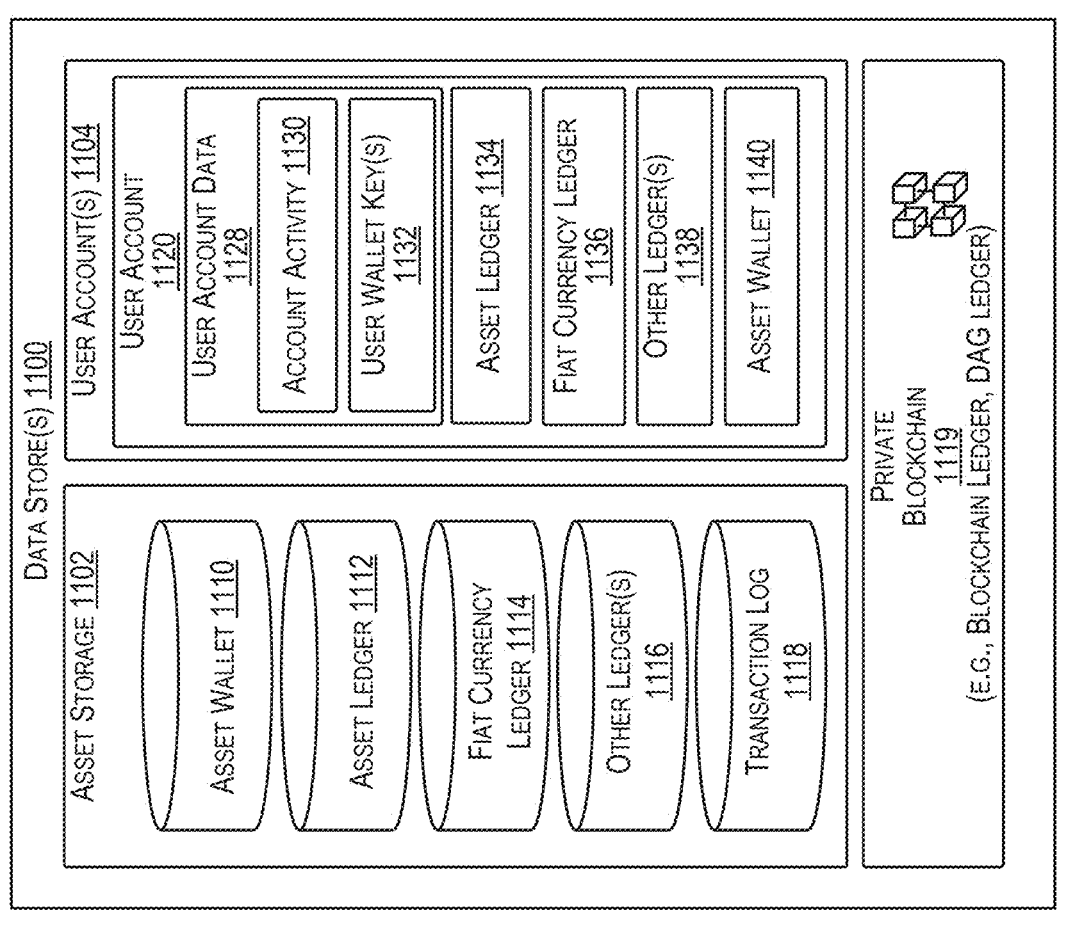
FIG. 11 is a block diagram illustrating a ledger system, in accordance with some examples.

FIG. 11 is a block diagram illustrating a ledger system. The ledger system of FIG. 11 may provide additional details associated with a ledger system that may be used with the systems of FIG. 9 and/or FIG. 10. The ledger system can enable users 1014 to own fractional shares of assets that are not conventionally available. For instance, a user can own a fraction of a Bitcoin or a stock. Additional details are described herein.

In at least one example, the service provider can facilitate transfers and can send notifications related thereto to instances of the payment application 1018 executing on user device(s) of payee(s). As an example, the service provider can transfer assets from an account of user 1016(A) to an account of the user 1016(B) and can send a notification to the user device 1008(B) of the user 1016(B) for presentation via a user interface. The notification can indicate that a transfer is in process, a transfer is complete, or the like. In some examples, the service provider can send additional or alternative information to the instances of the payment application 1018 (e.g., low balance to the payor, current balance to the payor or the payee, etc.). In some examples, the payor and/or payee can be identified automatically, e.g., based on context, proximity, prior transaction history, and so on. In other examples, the payee can send a request for funds to the payor prior to the payor initiating the transfer of funds. In some embodiments, the service provider funds the request to payee on behalf of the payor, to speed up the transfer process and compensate for any lags that may be attributed to the payor's financial network.

In some examples, the service provider can trigger the peer-to-peer payment process through identification of a "payment proxy" having a particular syntax. For example, the syntax can include a monetary currency indicator prefixing one or more alphanumeric characters (e.g., $Cash). The currency indicator operates as the tagging mechanism that indicates to the server(s) 1002 to treat the inputs as a request from the payor to transfer assets, where detection of the syntax triggers a transfer of assets. The currency indicator can correspond to various currencies including but not limited to, dollar ($), euro (€), pound (£), rupee (₹), yuan (¥), etc. Although use of the dollar currency indicator ($) is used herein, it is to be understood that any currency symbol could equally be used. In some examples, additional or alternative identifiers can be used to trigger the peer-to-peer payment process. For instance, email, telephone number, social media handles, and/or the like can be used to trigger and/or identify users of a peer-to-peer payment process.

In some examples, the peer-to-peer payment process can be initiated through instances of the payment application 1018 executing on the user devices 1006. In at least some embodiments, the peer-to-peer process can be implemented within a landing page associated with a user and/or an identifier of a user. The term "landing page," as used here, refers to a virtual location identified by a personalized location address that is dedicated to collect payments on behalf of a recipient associated with the personalized location address. The personalized location address that identifies the landing page can include a payment proxy discussed above. The service provider can generate the landing page to enable the recipient to conveniently receive one or more payments from one or more senders. In some examples, the personalized location address identifying the landing page can be a uniform resource locator (URL) that incorporates the payment proxy. In such examples, the landing page can be a web page, e.g., www.cash.me/$Cash.

In some examples, the peer-to-peer payment process can be implemented within a forum. The term "forum," as used here, refers to a content provider's media channel (e.g., a social networking platform, a microblog, a blog, video sharing platform, a music sharing platform, etc.) that enables user interaction and engagement through comments, posts, messages on electronic bulletin boards, messages on a social networking platform, and/or any other types of messages. In some examples, the content provider can be the service provider as described with reference to FIG. 10 or a third-party service provider associated with the server(s) 1010. In examples where the content provider is a third-party service provider, the server(s) 1010 can be accessible via one or more APIs or other integrations. The forum can be employed by a content provider to enable users of the forum to interact with one another (e.g., through creating messages, posting comments, etc.). In some examples, "forum" may also refer to an application or webpage of an e-commerce or retail organization that offers products and/or services. Such websites can provide an online "form" to complete before or after the products or services are added to a virtual cart. The online form may include one or more fields to receive user interaction and engagement. Examples include name and other identification of the user, shipping address of the user, etc. Some of these fields may be configured to receive payment information, such as a payment proxy, in lieu of other kinds of payment mechanisms, such as credit cards, debit cards, prepaid cards, gift cards, virtual wallets, etc.

In some embodiments, the peer-to-peer process can be implemented within a communication application, such as a messaging application. The term "messaging application," as used here, refers to any messaging application that enables communication between users (e.g., sender and recipient of a message) over a wired or wireless communications network, through use of a communication message. The messaging application can be employed by the service provider referenced in FIG. 10. For instance, the service provider can offer messaging services that provides a communication service to users via a messaging application (e.g., chat or messaging capability). The messaging application can include, for example, a text messaging application for communication between phones (e.g., conventional mobile telephones or smartphones), or a cross-platform instant messaging application for smartphones and phones that use the Internet for communication. The messaging application can be executed on a user device 1006 (e.g., mobile device or conventional personal computer (PC)) based on instructions transmitted to and from the server(s) 1002 (which, in such an example can be called a "messaging server"). In some instances, the messaging application can include a payment application with messaging capability that enables users of the payment application to communicate with one another. In such instances, the payment application can be executed on a user device 1006 based on instructions transmitted to and from the server(s) 1002 (e.g., the payment service discussed in this description or another payment service that supports payment transactions). In some examples, the messaging application can be provided by a third-party service provider associated with the server(s) 1010. In examples where the messaging application is a third-party service provider, the server(s) 1010 can be accessible via one or more APIs or other integrations.

As described above, the service provider can facilitate peer-to-peer transactions, which can enable users 1014 to transfer fiat currency, non-fiat currency, cryptocurrency, securities, or other assets, or portions thereof, to other users 1014. In at least one example, individual users can be associated with user accounts. Additional details associated with user accounts and the transfer of assets between users 1014 are described below with reference to FIG. 11.

Furthermore, the service provider of FIG. 10 can enable users 1014 to perform banking transactions via instances of the payment application 1018. For example, users can configure direct deposits or other deposits for adding assets to their various ledgers/balances. Further, users 1014 can configure bill pay, recurring payments, and/or the like using assets associated with their accounts. In addition to sending and/or receiving assets via peer-to-peer transactions, users 1014 buy and/or sell assets via asset networks such as cryptocurrency networks, securities networks, and/or the like.

FIG. 11 illustrates example data store(s) 1100 that can be associated with the server(s) 1002.

In at least one example, the data store(s) 1100 can store assets in an asset storage 1102, as well as data in user account(s) 1104, merchant account(s) 1106, and/or customer account(s) 1108. In at least one example, the asset storage 1102 can be used to store assets managed by the service provider of FIG. 10. In at least one example, the asset storage 1102 can be used to record whether individual of the assets are registered to users. For example, the asset storage 1102 can include an asset wallet 1110 for storing records of assets owned by the service provider of FIG. 10, such as cryptocurrency, securities, or the like, and communicating with one or more asset networks, such as cryptocurrency networks, securities networks, or the like. In some examples, the asset network can be a first-party network or a third-party network, such as a cryptocurrency exchange or the stock market. In examples where the asset network is a third-party network, the server(s) 1010 can be associated therewith. In some examples, the asset wallet 1110 can communication with the asset network via one or more components associated with the server(s) 1002.

Account(s) associated with the first user 165 and/or the second user 180, the event data DS 120, the condition DS 135, the asset DS 155, the data source(s) 125, and the blockchain ledger 600 may be examples of the user account 1120, the asset wallet 1140, and/or the asset wallet 1110, and/or may be associated with the fiat currency ledger 1114, the fiat currency ledger 1136, the asset ledger 1112, the asset ledger 1134, and/or the private blockchain 1119.

The asset wallet 1110 can be associated with one or more addresses and can vary addresses used to acquire assets (e.g., from the asset network(s)) so that its holdings are represented under a variety of addresses on the asset network. In examples where the service provider of FIG. 10 has its own holdings of cryptocurrency (e.g., in the asset wallet 1110), a user can acquire cryptocurrency directly from the service provider of FIG. 10. In some examples, the service provider of FIG. 10 can include logic for buying and selling cryptocurrency to maintain a desired level of cryptocurrency. In some examples, the desired level can be based on a volume of transactions over a period of time, balances of collective cryptocurrency ledgers, exchange rates, or trends in changing of exchange rates such that the cryptocurrency is trending towards gaining or losing value with respect to the fiat currency. In all of these scenarios, the buying and selling of cryptocurrency, and therefore the associated updating of the public ledger of asset network can be separate from any customer-merchant transaction or peer-to-peer transaction, and therefore not necessarily time-sensitive. This can enable batching transactions to reduce computational resources and/or costs. The service provider can provide the same or similar functionality for securities or other assets.

The asset storage 1102 may contain ledgers that store records of assignments of assets to users 1014. Specifically, the asset storage 1102 may include asset wallet 1110 (e.g., asset ledger), fiat currency ledger 1114, and other ledger(s) 1116, which can be used to record transfers of assets between users 1014 of the service provider and/or one or more third-parties (e.g., merchant network(s), payment card network(s), ACH network(s), equities network(s), the asset network, securities networks, etc.). In doing so, the asset storage 1102 can maintain a running balance of assets managed by the service provider of FIG. 10. The ledger(s) of the asset storage 1102 can further indicate some of the running balance for each of the ledger(s) stored in the asset storage 1102 is assigned or registered to one or more user account(s) 1104.

In at least one example, the asset storage 1102 can include transaction logs 1118, which can include records of past transactions involving the service provider of FIG. 10. In at least one example, transaction data, as described herein, can be stored in association with the transaction logs 1118.

In some examples, the data store(s) 1100 can store a private blockchain 1119. A private blockchain 1119 can function to record sender addresses, recipient addresses, public keys, values of cryptocurrency transferred, and/or can be used to verify ownership of cryptocurrency tokens to be transferred. In some examples, the service provider of FIG. 10 can record transactions taking place within the service provider of FIG. 10 involving cryptocurrency until the number of transactions has exceeded a determined limit (e.g., number of transactions, storage space allocation, etc.). Based at least in part on determining that the limit has been reached, the service provider of FIG. 10 can publish the transactions in the private blockchain 1119 to a public blockchain (e.g., associated with the asset network), where miners can verify the transactions and record the transactions to blocks on the public blockchain. In at least one example, the service provider of FIG. 10 can participate as miner(s) at least for its transactions to be posted to the public blockchain.

In at least one example, the data store(s) 1100 can store and/or manage accounts, such as user account(s) 1104, merchant account(s) 1106, and/or customer account(s) 1108. In at least one example, the user account(s) 1104 may store records of user accounts associated with the users 1014. In at least one example, the user account(s) 1104 can include a user account 1120, which can be associated with a user (of the users 1014). Other user accounts of the user account(s) 1104 can be similarly structured to the user account 1120, according to some examples. In other examples, other user accounts may include more or less data and/or account information than that provided by the user account 1120. In at least one example, the user account 1120 can include user account data 1128, which can include, but is not limited to, data associated with user identifying information (e.g., name, phone number, address, etc.), user identifier(s) (e.g., alphanumeric identifiers, etc.), user preferences (e.g., learned or user-specified), purchase history data (e.g., identifying one or more items purchased (and respective item information), linked payment sources (e.g., bank account(s), stored balance(s), etc.), payment instruments used to purchase one or more items, returns associated with one or more orders, statuses of one or more orders (e.g., preparing, packaging, in transit, delivered, etc.), etc.), appointments data (e.g., previous appointments, upcoming (scheduled) appointments, timing of appointments, lengths of appointments, etc.), payroll data (e.g., employers, payroll frequency, payroll amounts, etc.), reservations data (e.g., previous reservations, upcoming (scheduled) reservations, reservation duration, interactions associated with such reservations, etc.), inventory data, user service data, loyalty data (e.g., loyalty account numbers, rewards redeemed, rewards available, etc.), risk indicator(s) (e.g., level(s) of risk), etc.

In at least one example, the user account data 1128 can include account activity 1130 and user wallet key(s) 1132. The account activity 1130 may include a transaction log for recording transactions associated with the user account 1120. In some examples, the user wallet key(s) 1132 can include a public-private key-pair and a respective address associated with the asset network or other asset networks. In some examples, the user wallet key(s) 1132 may include one or more key pairs, which can be unique to the asset network or other asset networks.

In addition to the user account data 1128, the user account 1120 can include ledger(s) for account(s) managed by the service provider of FIG. 10, for the user. For example, the user account 1120 may include an asset ledger 1134, a fiat currency ledger 1136, and/or one or more other ledgers 1138. The ledger(s) can indicate that a corresponding user utilizes the service provider of FIG. 10 to manage corresponding accounts (e.g., a cryptocurrency account, a securities account, a fiat currency account, etc.). It should be noted that in some examples, the ledger(s) can be logical ledger(s) and the data can be represented in a single database. In some examples, individual of the ledger(s), or portions thereof, can be maintained by the service provider of FIG. 10.

In some examples, the asset ledger 1134 can store a balance for each of one or more cryptocurrencies (e.g., Bitcoin, Ethereum, Litecoin, etc.) registered to the user account 1120. In at least one example, the asset ledger 1134 can further record transactions of cryptocurrency assets associated with the user account 1120. For example, the user account 1120 can receive cryptocurrency from the asset network using the user wallet key(s) 1132. In some examples, the user wallet key(s) 1132 may be generated for the user upon request. User wallet key(s) 1132 can be requested by the user in order to send, exchange, or otherwise control the balance of cryptocurrency held by the service provider of FIG. 10 (e.g., in the asset wallet 1110) and registered to the user. In some examples, the user wallet key(s) 1132 may not be generated until a user account requires such. This on-the-fly wallet key generation provides enhanced security features for users, reducing the number of access points to a user account's balance and, therefore, limiting exposure to external threats.

Each account ledger can reflect a positive balance when funds are added to the corresponding account. An account can be funded by transferring currency in the form associated with the account from an external account (e.g., transferring a value of cryptocurrency to the service provider of FIG. 10 and the value is credited as a balance in asset ledger 1134), by purchasing currency in the form associated with the account using currency in a different form (e.g., buying a value of cryptocurrency from the service provider of FIG.

10 using a value of fiat currency reflected in fiat currency ledger 206, and crediting the value of cryptocurrency in asset ledger 1134), or by conducting a transaction with another user (customer or merchant) of the service provider of FIG. 10 wherein the account receives incoming currency (which can be in the form associated with the account or a different form, in which the incoming currency may be converted to the form associated with the account). In some examples, the user account data 1128 can include preferences for maintaining balances of individual of the ledgers. For example, the service provider of FIG. 10 can automatically debit the fiat currency ledger 1136 to increase the asset ledger 1134, or another account associated with the user whenever the cryptocurrency balance (e.g., of the asset ledger 1134) falls below a stated level (e.g., a threshold). Conversely, in some embodiments, the service provider of FIG. 10 can automatically credit the fiat currency ledger 1136 to decrease the asset ledger 1134 whenever cryptocurrency balance rises above a stated level (e.g., a threshold). In some examples, automatic transactions can be further defined by an exchange rate between the cryptocurrency and the fiat currency such that transactions to buy or sell cryptocurrency can occur when exchange rates are favorable.

With specific reference to funding a cryptocurrency account, a user may have a balance of cryptocurrency stored in another cryptocurrency wallet. In some examples, the other cryptocurrency wallet can be associated with a third-party (e.g., associated with third-party server(s)) unrelated to the service provider of FIG. 10 (i.e., an external account). In at least one example, the user can transfer all or a portion of a balance of the cryptocurrency stored in the third-party cryptocurrency wallet to the service provider of FIG. 10. Such a transaction can require the user to transfer an amount of the cryptocurrency in a message signed by user's private key to an address provided by the service provider of FIG. 10. In at least one example, the transaction can be sent to miners to bundle the transaction into a block of transactions and to verify the authenticity of the transactions in the block. Once a miner has verified the block, the block is written to a public, distributed blockchain where the service provider of FIG. 10 can then verify that the transaction has been confirmed and can credit the user's asset ledger 1134 with the transferred amount. When an account is funded by transferring cryptocurrency from a third-party cryptocurrency wallet, an update can be made to the public blockchain. Importantly, this update of the public blockchain need not take place at a time critical moment, such as when a transaction is being processed by a merchant in store or online.

In some examples, a user can purchase cryptocurrency to fund their cryptocurrency account. In some examples, the user can purchase cryptocurrency through services offered by the service provider of FIG. 10. As described above, in some examples, the service provider of FIG. 10 can acquire cryptocurrency from a third-party source (e.g., associated with third-party server(s)). In such examples, the asset wallet 1110 can be associated with different addresses and can vary addresses used to acquire cryptocurrency so that its holdings are represented under a variety of addresses on a blockchain. When the service provider of FIG. 10 has their own holdings of cryptocurrency, users can acquire cryptocurrency directly from the service provider of FIG. 10. In some examples, the service provider of FIG. 10 can include logic for buying and selling cryptocurrency in order to maintain a desired level of cryptocurrency. The desired level can be based on a volume of transactions over a period, balances of collective user profiles cryptocurrency ledgers, exchange rates, or trends in changing of exchange rates such that the cryptocurrency is trending towards gaining or losing value with respect to the fiat currency. In all of these examples, the buying and selling of cryptocurrency, and therefore the associated updating of the public ledger can be separate from any customer-merchant transaction, and therefore not necessarily time-sensitive.

In examples where the service provider of FIG. 10 has its own cryptocurrency assets, cryptocurrency transferred in a transaction (e.g., data with address provided for receipt of transaction and a balance of cryptocurrency transferred in the transaction) can be stored in the asset wallet 1110. In at least one example, the service provider of FIG. 10 can credit the asset ledger 1134 of the user. Additionally, while the service provider of FIG. 10 recognizes that the user retains the value of the transferred cryptocurrency through crediting the asset ledger 1134, any person that inspects the blockchain will see the cryptocurrency as having been transferred to the service provider of FIG. 10. In some examples, the asset wallet 1110 can be associated with many different addresses. In such examples, any person that inspects the blockchain may not easily associate all cryptocurrency stored in asset wallet 1110 as belonging to the same entity. It is this presence of a private ledger that is used for real-time transactions and maintained by the service provider of FIG. 10, combined with updates to the public ledger at other times, that allows for extremely fast transactions using cryptocurrency to be achieved. In some examples, the "private ledger" can refer to the asset wallet 1110 (e.g., asset ledger), which in some examples, can utilize the private blockchain 1119, as described herein. The "public ledger" can correspond to a public blockchain associated with the asset network.

In at least one example, a user's asset ledger 1134, fiat currency ledger 1136, or the like can be credited when conducting a transaction with another user (customer or merchant) wherein the user receives incoming currency. In some examples, a user can receive cryptocurrency in the form of payment for a transaction with another user. In at least one example, such cryptocurrency can be used to fund the asset ledger 1134. In some examples, a user can receive fiat currency or another currency in the form of payment for a transaction with another user. In at least one example, at least a portion of such funds can be converted into cryptocurrency by the service provider of FIG. 10 and used to fund the asset ledger 1134 of the user.

As addressed above, in some examples, users can also have other accounts maintained by the service provider of FIG. 10. For example, a user can also have an account in U.S. dollars, which can be tracked, for example, via the fiat currency ledger 1136. Such an account can be funded by transferring money from a bank account at a third-party bank to an account maintained by the service provider of FIG. 10 as is conventionally known. In some examples, a user can receive fiat currency in the form of payment for a transaction with another user. In such examples, at least a portion of such funds can be used to fund the fiat currency ledger 1136.

In some examples, a user can have one or more internal payment cards registered with the service provider of FIG. 10. Internal payment cards can be linked to one or more of the accounts associated with the user account 1120. In some embodiments, options with respect to internal payment cards can be adjusted and managed using an application (e.g., the payment application 1018).

In at least one example, as described above, each ledger can correspond to an account of the user that is managed by the service provider of FIG. 10. In at least one example, individual of the accounts can be associated with a wallet or a stored balance for use in payment transactions, peer-to-peer transactions, payroll payments, etc.

In at least one example, the user account 1120 can be associated with a asset wallet 1140. The asset wallet 1140 of the user can be associated with account information that can be stored in the user account data 1128 and, in some examples, can be associated with the user wallet key(s) 1132. In at least one example, the asset wallet 1140 can store data indicating an address provided for receipt of a cryptocurrency transaction. In at least one example, the balance of the asset wallet 1140 can be based at least in part on a balance of the asset ledger 1134. In at least one example, funds availed via the asset wallet 1140 can be stored in the asset wallet 1140 or the asset wallet 1110. Funds availed via the asset wallet 1110 can be tracked via the asset ledger 1134. The asset wallet 1140, however, can be associated with additional cryptocurrency funds.

In at least one example, when the service provider of FIG. 10 includes a private blockchain 1119 for recording and validating cryptocurrency transactions, the asset wallet 1140 can be used instead of, or in addition to, the asset ledger 1134. For example, at least one example, a merchant can provide the address of the asset wallet 1140 for receiving payments. In an example where a customer is paying in cryptocurrency and the customer has their own cryptocurrency wallet account associated with the service provider of FIG. 10, the customer can send a message signed by its private key including its wallet address (i.e., of the customer) and identifying the cryptocurrency and value to be transferred to the merchant's asset wallet 1140. The service provider of FIG. 10 can complete the transaction by reducing the cryptocurrency balance in the customer's cryptocurrency wallet and increasing the cryptocurrency balance in the merchant's asset wallet 1140. In addition to recording the transaction in the respective cryptocurrency wallets, the transaction can be recorded in the private blockchain 1119 and the transaction can be confirmed. A user can perform a similar transaction with cryptocurrency in a peer-to-peer transaction as described above. In at least one example, the cryptocurrency wallet account can be funded by a balance transfer from a third-party cryptocurrency wallet, as described above. Such a transaction can require a user to transfer an amount of cryptocurrency in a message signed by the user's private key to an address of the cryptocurrency wallet account. The transferred amount of cryptocurrency can then be within the cryptocurrency wallet account for use in later transactions.

While the asset ledger 1134 and/or asset wallet 1140 are each described above with reference to cryptocurrency, the asset ledger 1134 and/or asset wallet 1140 can alternatively be used in association with securities. In some examples, different ledgers and/or wallets can be used for different types of assets. That is, in some examples, a user can have multiple asset ledgers and/or asset wallets for tracking cryptocurrency, securities, or the like.

It should be noted that user(s) having accounts managed by the service provider of FIG. 10 is an aspect of the technology disclosed that enables technical advantages of increased processing speed and improved security.

Figure 12:
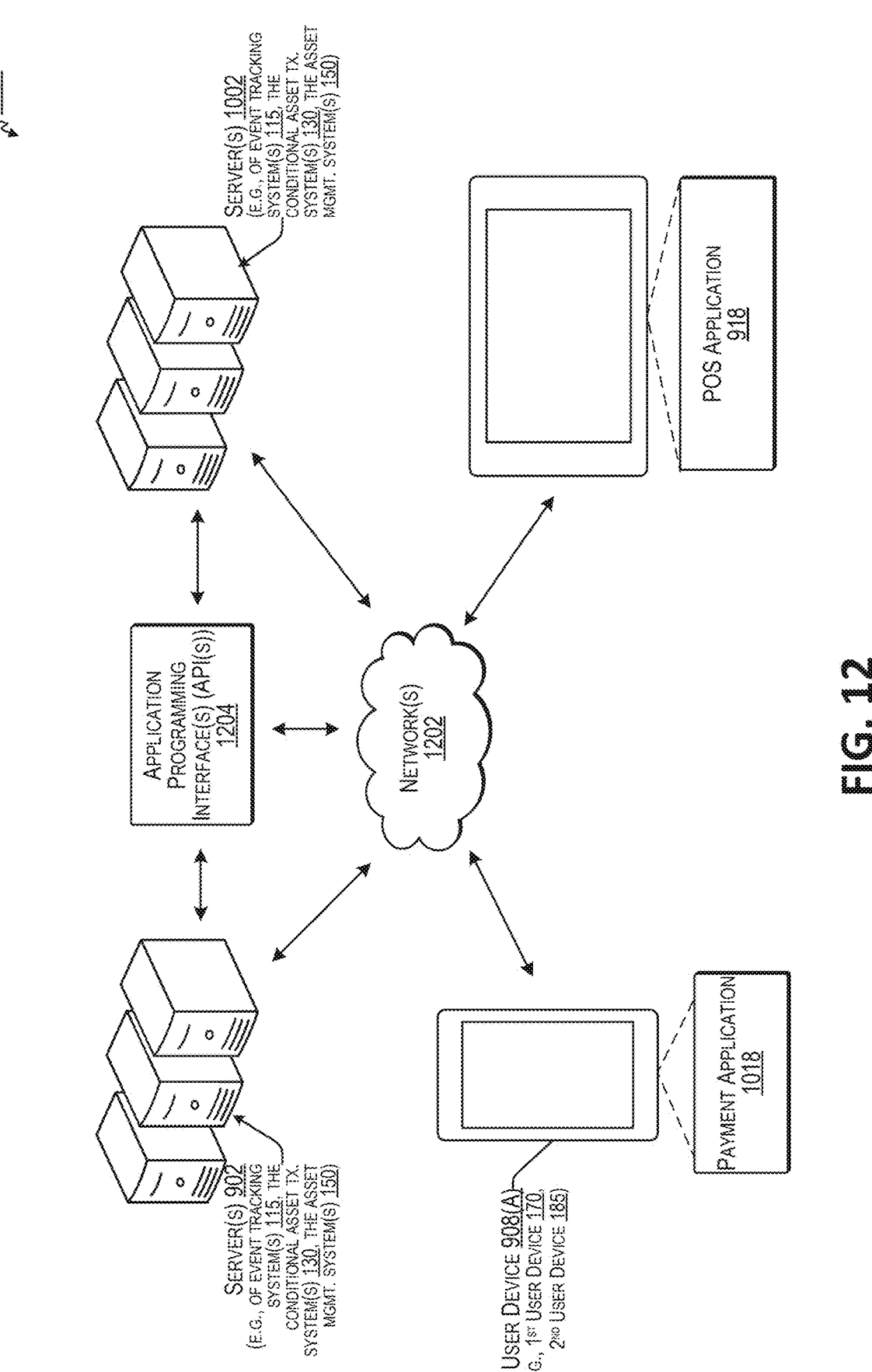
FIG. 12 is a block diagram illustrating an example environment wherein the environment of FIG. 9 and the environment of FIG. 10 can be integrated to enable payments at the point-of-sale using assets associated with user accounts in the peer-to-peer environment of FIG. 10, in accordance with some examples.

FIG. 12 illustrates an example environment 1200 wherein the environment 900 of FIG. 9 and the environment 1000 of FIG. 10 can be integrated to enable payments at the point-of-sale using assets associated with user accounts in the peer-to-peer environment 1000 of FIG. 10. As illustrated, each of the components can communicate with one another via one or more networks 1202. In some examples, one or more APIs 1204 or other functional components can be used to facilitate such communication.

In at least one example, the example environment 1200 can enable contactless payments, via integration of peer-to-peer payment, or other payment making, platform(s) and payment processing platform(s), are described herein. For the purpose of FIG. 12, the environment 900 can refer to a payment processing platform and the environment 1000 can refer to a peer-to-peer payment, or payment making, platform. In an example, such an integration can enable a customer to participate in a transaction via their own computing device instead of interacting with a merchant device of a merchant, such as the merchant device 908(A). In such an example, the POS application 918, associated with a payment processing platform and executable by the merchant device 908(A) of the merchant, can present a Quick Response (QR) code, or other code that can be used to identify a transaction (e.g., a transaction code), in association with a transaction between the customer and the merchant. The QR code, or other transaction code, can be provided to the POS application 918 via an API associated with the peer-to-peer payment platform. In an example, the customer can utilize their own computing device, such as the user device 1008(A), to capture the QR code, or the other transaction code, and to provide an indication of the captured QR code, or other transaction code, to server(s) 902 and/or server(s) 1002.

Based at least in part on the integration of the peer-to-peer payment platform and the payment processing platform (e.g., via the API), the server(s) 902 and/or 1002 associated with each can exchange communications with each other—and with a payment application 1018 associated with the peer-to-peer payment platform and/or the POS application 918—to process payment for the transaction using a peer-to-peer payment where the customer is a first "peer" and the merchant is a second "peer." In at least one example, the peer-to-peer payment platform can transfer funds from an account of the customer, maintained by the peer-to-peer payment platform, to an account of the merchant, maintained by the payment processing platform, thereby facilitating a contactless (peer-to-peer) payment for the transaction. That is, based at least in part on receiving an indication of which payment method a user (e.g., customer or merchant) intends to use for a transaction, techniques described herein utilize an integration between a peer-to-peer payment platform and payment processing platform (which can be a first- or third-party integration) such that a QR code, or other transaction code, specific to the transaction can be used for providing transaction details, location details, customer details, or the like to a computing device of the customer, such as the user device 1008(A), to enable a contactless (peer-to-peer) payment for the transaction.

In at least one example, techniques described herein can offer improvements to conventional payment technologies at both brick-and-mortar points of sale and online points of sale. For example, at brick-and-mortar points of sale, techniques described herein can enable customers to "scan to pay," by using their computing devices to scan QR codes, or other transaction codes, encoded with data as described herein, to remit payments for transactions. In such a "scan to pay" example, a customer computing device, such as the user device 1008(A), can be specially configured as a buyer-facing device that can enable the customer to view cart building in near real-time, interact with a transaction during cart building using the customer computing device, authorize payment via the customer computing device, apply coupons or other incentives via the customer computing device, add gratuity, loyalty information, feedback, or the like via the customer computing device, etc. In another example, merchants can "scan for payment" such that a customer can present a QR code, or other transaction code, that can be linked to a payment instrument or stored balance. Funds associated with the payment instrument or stored balance can be used for payment of a transaction.

As described above, techniques described herein can offer improvements to conventional payment technologies at online points of sale, as well as brick-and-mortar points of sale. For example, multiple applications can be used in combination during checkout. That is, the POS application 918 and the payment application 1018, as described herein, can process a payment transaction by routing information input via the merchant application to the payment application for completing a "frictionless" payment. This can be referred to as "in-application payment." In another example of "in-application payment," the payment application described herein can be created or modified via a software developer kit (SDK) to enable in-application payment.

Returning to the "scan to pay" examples described herein, QR codes, or other transaction codes, can be presented in association with a merchant web page or ecommerce web page. In at least one example, techniques described herein can enable customers to "scan to pay," by using their computing devices to scan or otherwise capture QR codes, or other transaction codes, encoded with data, as described herein, to remit payments for online/ecommerce transactions. In such a "scan to pay" example, a customer computing device, such as the user device 1008(A), can be specially configured as a buyer-facing device that can enable the customer to view cart building in near real-time, interact with a transaction during cart building using the customer computing device, authorize payment via the customer computing device, apply coupons or other incentives via the customer computing device, add gratuity, loyalty information, feedback, or the like via the customer computing device, etc.

In an example, a customer can desire to purchase items from a merchant. When the customer approaches the merchant to check out, the merchant (e.g., a worker associated therewith) can add indications of the items to a virtual cart via the POS application 918, associated with a payment processing platform, on the merchant device 908(A). In an example, the merchant can use the payment processing platform to process payments, and the payment processing platform can process payments for the merchant, as well as other merchants. That is, the payment processing platform can be an aggregator. After adding the first item, or otherwise providing an indication to start a transaction, a display of the merchant device 908(A) can present a QR code, or other transaction code, that can be associated with a peer-to-peer payment platform. The customer can use a camera associated with the user device 1008(A) to scan, or otherwise capture, the QR code. If the customer is already associated with the peer-to-peer payment platform (e.g., has an existing account, previously onboarded, etc.), the peer-to-peer platform can provide an indication of the scanned QR code to the payment processing platform. This interaction—between the customer computing device and the QR code—can trigger communications between the peer-to-peer payment platform and the payment processing platform (e.g., via an API) to facilitate a transfer of funds from a stored balance of the customer, that is managed and/or maintained by the peer-to-peer payment platform, to a stored balance of the merchant, that is managed and/or maintained by the payment processing platform. As such, the customer can use such funds for contactless payment of the transaction. Such a payment can be structured as a peer-to-peer payment wherein the customer is the first "peer" and the payment processing platform is the second "peer." The payment processing platform can deposit funds received from the peer-to-peer payment platform in an account of the merchant to settle the transaction on behalf of the merchant. In some examples, the payment processing platform can deposit funds into an account of the merchant to settle the transaction prior to receiving funds from the peer-to-peer payment platform.

As an additional or alternative example, a customer can desire to purchase items from a merchant. When the customer approaches the merchant to check out, the merchant (e.g., a worker associated therewith) can add indications of the items to a virtual cart via the POS application 918, associated with a payment processing platform, on the merchant device 908(A). In an example, the merchant can use the payment processing platform to process payments, and the payment processing platform can process payments for the merchant, as well as other merchants. That is, the payment processing platform can be an aggregator. After adding the first item, or otherwise providing an indication to start a transaction, the POS application 918 can cause a text message with a resource locator (e.g., uniform resource locator (URL)) that can be associated with a peer-to-peer payment platform to be sent to the user device 1008(A). The customer can interact with the resource locator and, if the customer is already associated with the peer-to-peer payment platform (e.g., has an existing account, previously onboarded, etc.), the peer-to-peer payment platform can provide an indication of the interaction with the resource locator to the payment processing platform. This interaction-between the customer and the resource locator presented via the customer computing device—can trigger communications between the peer-to-peer payment platform and the payment processing platform (e.g., via an API) to facilitate a transfer of funds from a stored balance of the customer, that is managed and/or maintained by the peer-to-peer payment platform, to a stored balance of the merchant, that is managed and/or maintained by the payment processing platform. As such, the customer can use such funds for contactless payment of the transaction. As described above, such a payment can be structured as a peer-to-peer payment wherein the customer is the first "peer" and the payment processing platform is the second "peer." The payment processing platform can deposit funds received from the peer-to-peer payment platform in an account of the merchant to settle the transaction on behalf of the merchant. In some examples, the payment processing platform can deposit funds into an account of the merchant to settle the transaction prior to receiving funds from the peer-to-peer payment platform.

The same or similar techniques can be applicable in online and/or ecommerce selling channels as well. In such an example, a QR code, or other transaction code, can be presented via an online store/ecommerce web page of a merchant. The customer can use a camera associated with a customer computing device, such as the user device 1008 (A), to scan, or otherwise capture, the QR code. If the customer is already associated with the peer-to-peer payment platform (e.g., has an existing account, previously onboarded, etc.), the peer-to-peer platform can provide an indication of the scanned QR code to the payment processing platform. This interaction-between the customer computing device and the QR code—can trigger communications between the peer-to-peer payment platform and the payment processing platform (e.g., via an API) to facilitate a transfer of funds from a stored balance of the customer, that is managed and/or maintained by the peer-to-peer payment platform, to a stored balance of the merchant, that is managed and/or maintained by the payment processing platform. As such, the customer can use such funds for contactless payment of the transaction. Such a payment can be structured as a peer-to-peer payment wherein the customer is the first "peer" and the payment processing platform is the second "peer." The payment processing platform can deposit funds received from the peer-to-peer payment platform in an account of the merchant to settle the transaction on behalf of the merchant. In some examples, the payment processing platform can deposit funds into an account of the merchant to settle the transaction prior to receiving funds from the peer-to-peer payment platform.

As described above, techniques described herein offer improvements to conventional payment technologies. In an example, techniques described herein can enable transaction data to be sent from a POS application 918 of a merchant device 908(A) at a brick-and-mortar store of a merchant to a payment application 1018 of a user device 1008(A) of a customer to enable the customer to participate in a transaction via their own computing device. For instance, in a "scan to pay" example as described above, based at least in part on capturing the QR code, or other transaction code, via the user device 1008(A), the payment processing platform can provide transaction data to the peer-to-peer payment platform for presentation via the payment application 1018 on the user device 1008(A). In some examples, the customer can watch items being added to their cart (e.g., via a user interface presented via the payment application). As an item is added to a virtual cart by the merchant-via the POS application 918 on the merchant device 908(A) of the merchant—the customer can see the item in their virtual cart on their own computing device in near-real time. In another example, the peer-to-peer payment platform can analyze transaction data as it is received to determine whether an incentive (e.g., a discount, a loyalty reward, prioritized access or booking, etc.) is applicable to the transaction and can automatically apply the incentive or send a recommendation to the payment application 1018 for presentation via a user interface associated therewith. In addition to enabling a customer to participate in a transaction during cart building, techniques described herein can enable a customer to complete a transaction, and in some examples, provide gratuity (i.e., a tip), feedback, loyalty information, or the like, via the user device 1008(A) during or after payment of the transaction.

In some examples, based at least in part on capturing the QR code, or other transaction code, the payment processing platform can provide transaction data to the peer-to-peer payment platform for presentation via the payment application 1018 on the computing device of the customer, such as the user device 1008(A), to enable the customer to complete the transaction via their own computing device. In some examples, in response to receiving an indication that the QR code, or other transaction code, has been captured or otherwise interacted with via the customer computing device, the peer-to-peer payment platform can determine that the customer authorizes payment of the transaction using funds associated with a stored balance of the customer that is managed and/or maintained by the peer-to-peer payment platform. Such authorization can be implicit such that the interaction with the transaction code can imply authorization of the customer. In some examples, in response to receiving an indication that the QR code, or other transaction code, has been captured or otherwise interacted with via the customer computing device, the peer-to-peer payment platform can request authorization to process payment for the transaction using the funds associated with the stored balance and the customer can interact with the payment application to authorize the settlement of the transaction. A response to such a request can provide an express authorization of the customer. In some examples, such an authorization (implicit or express) can be provided prior to a transaction being complete and/or initialization of a conventional payment flow. That is, in some examples, such an authorization can be provided during cart building (e.g., adding item(s) to a virtual cart) and/or prior to payment selection. In some examples, such an authorization can be provided after payment is complete (e.g., via another payment instrument). Based at least in part on receiving an authorization to use funds associated with the stored balance (e.g., implicitly or explicitly) of the customer, the peer-to-peer payment platform can transfer funds from the stored balance of the customer to the payment processing platform. In at least one example, the payment processing platform can deposit the funds, or a portion thereof, into a stored balance of the merchant that is managed and/or maintained by the payment processing platform. That is, techniques described herein enable the peer-to-peer payment platform to transfer funds to the payment processing platform to settle payment of the transaction. In such an example, the payment processing platform can be a "peer" to the customer in a peer-to-peer transaction.

In some examples, techniques described herein can enable the customer to interact with the transaction after payment for the transaction has been settled. For example, in at least one example, the payment processing platform can cause a total amount of a transaction to be presented via a user interface associated with the payment application 1018 such that the customer can provide gratuity, feedback, loyalty information, or the like, via an interaction with the user interface. In some examples, because the customer has already authorized payment via the peer-to-peer payment platform, if the customer inputs a tip, the peer-to-peer payment platform can transfer additional funds, associated with the tip, to the payment processing platform. This pre-authorization (or maintained authorization) of sorts can enable faster, more efficient payment processing when the tip is received. Further, the customer can provide feedback and/or loyalty information via the user interface presented by the payment application, which can be associated with the transaction.

As described above—and also below—techniques described herein enable contactless payments. That is, by integrating the payment processing platform with the peer-to-peer payment platform, merchants and customers can participate in transactions via their own computing devices without needing to touch, or otherwise be in contact, with one another. By moving aspects of a transaction that are traditionally performed on a computing device of a merchant to a computing device of a customer, customers can have more control over the transaction and can have more privacy. That is, customers can monitor items that are added to their cart to ensure accuracy. Further, customers can authorize payments, use rewards, claim incentives, add gratuity, or the like without being watched by the merchant or other customers.

In some examples, such as when the QR code, or other transaction code, is captured by the computing device of the customer prior to a payment selection user interface being presented via the POS application 918, payment for the transaction can be pre-authorized such that when the time comes to complete the transaction, neither the payment processing platform nor the peer-to-peer payment platform need to re-authorize payment at that time. That is, techniques described herein can enable faster, more efficient transactions. Further, in some examples, when a customer adds a tip after payment for a transaction has been settled, in some examples, because the peer-to-peer payment platform has already been authorized, the peer-to-peer payment platform and the payment processing platform may not need to obtain another authorization to settle funds associated with the tip. That is, in such examples, fewer data transmissions are required and thus, techniques described herein can conserve bandwidth and reduce network congestion. Moreover, as described above, funds associated with tips can be received faster and more efficiently than with conventional payment technologies.

In addition to the improvements described above, techniques described herein can provide enhanced security in payment processing. In some examples, if a camera, or other sensor, used to capture a QR code, or other transaction code, is integrated into a payment application 1018 (e.g., instead of a native camera, or other sensor), techniques described herein can utilize an indication of the QR code, or other transaction code, received from the payment application for two-factor authentication to enable more secure payments.

It should be noted that, while techniques described herein are directed to contactless payments using QR codes or other transaction codes, in additional or alternative examples, techniques described herein can be applicable for contact payments. That is, in some examples, instead of scanning, capturing, or otherwise interacting with a QR code or transaction code, a customer can swipe a payment instrument (e.g., a credit card, a debit card, or the like) via a reader device associated with a merchant device, dip a payment instrument into a reader device associated with a merchant computing device, tap a payment instrument with a reader device associated with a merchant computing device, or the like, to initiate the provisioning of transaction data to the customer computing device. For example, based at least in part on detecting a dip, tap, swipe, or the like, the payment processing platform can associate a customer with a transaction and provide at least a portion of transaction data associated with the transaction to a customer computing device associated therewith. In some examples, the payment instrument can be associated with the peer-to-peer payment platform as described herein (e.g., a debit card linked to a stored balance of a customer) such that when the payment instrument is caused to interact with a payment reader, the payment processing platform can exchange communications with the peer-to-peer payment platform to authorize payment for a transaction and/or provision associated transaction data to a computing device of the customer associated with the transaction.

Figure 13:
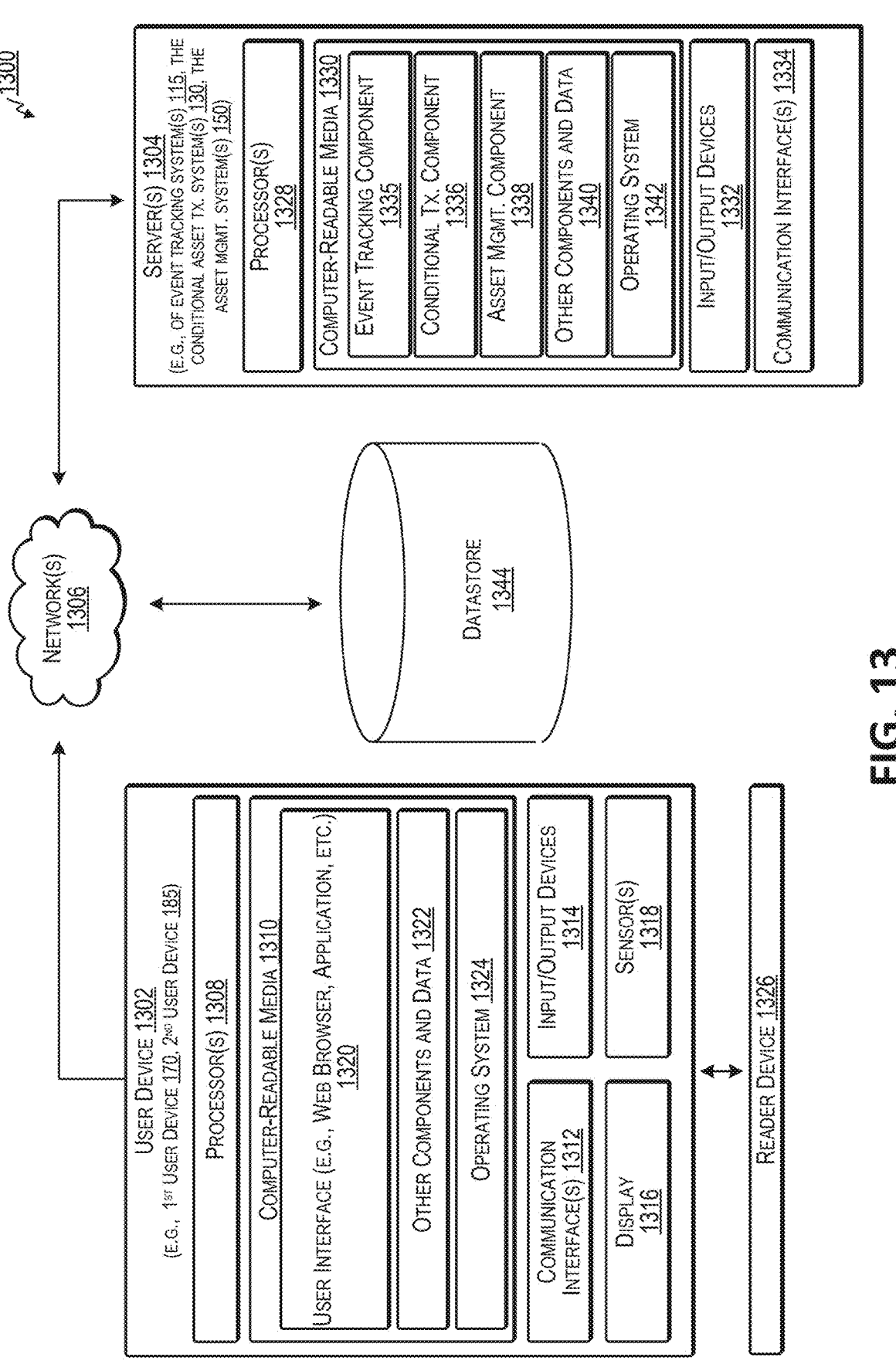
FIG. 13 is a block diagram illustrating a system for performing techniques described herein, in accordance with some examples.

FIG. 13 block diagram illustrating a system 1300 for performing techniques described herein. The system 1300 includes a user device 1302, that communicates with server computing device(s) (e.g., server(s) 1304) via network(s) 1306 (e.g., the Internet, cable network(s), cellular network(s), cloud network(s), wireless network(s) (e.g., Wi-Fi) and wired network(s), as well as close-range communications such as Bluetooth®, Bluetooth® low energy (BLE), and the like). While a single user device 1302 is illustrated, in additional or alternate examples, the system 1300 can have multiple user devices, as described above with reference to FIG. 10.

In some examples, any of the devices and/or elements in the system 1300 (e.g., the user device 1302, the server(s) 1304, the reader device(s) 1326, the datastore 1344) can include, run, or access the event-based transfer system 100, the event tracking system(s) 115, the conditional asset transfer system(s) 130, the asset management system(s) 150, the first user device 170, the second user device 185, the mobile device 215, the mobile device 315A, the mobile device 315B, the mobile device 415, the mobile device 515, the blockchain ledger 600, the computing systems of FIGS. 7A-7B, the server(s) 902, the network(s) 904, the user devices 906, the merchant device(s) 908(A)-908(N), the server(s) 910, the POS application 918, the reader device 922, the POS system 924, the server(s) 1002, the network(s) 1004, the user devices 1006, the user device(s) 1008(A)-908(N), the server(s) 1010, the payment application 1018, the data store(s) 1100, the asset storage 1102, the user account(s) 1104, the private blockchain 1119, the application programming interfaces (APIs) 1204, the network(s) 1202, or a combination thereof.

In at least one example, the user device 1302 can be any suitable type of computing device, e.g., portable, semi-portable, semi-stationary, or stationary. Some examples of the user device 1302 can include, but are not limited to, a tablet computing device, a smart phone or mobile communication device, a laptop, a netbook or other portable computer or semi-portable computer, a desktop computing device, a terminal computing device or other semi-stationary or stationary computing device, a dedicated device, a wearable computing device or other body-mounted computing device, an augmented reality device, a virtual reality device, an Internet of Things (IoT) device, etc. That is, the user device 1302 can be any computing device capable of sending communications and performing the functions according to the techniques described herein. The user device 1302 can include devices, e.g., payment card readers, or components capable of accepting payments, as described below.

In the illustrated example, the user device 1302 includes one or more processors 1308, one or more computer-readable media 1310, one or more communication interface(s) 1312, one or more input/output (I/O) devices 1314, a display 1316, and sensor(s) 1318.

In at least one example, each processor 1308 can itself comprise one or more processors or processing cores. For example, the processor(s) 1308 can be implemented as one or more microprocessors, microcomputers, microcontrollers, digital signal processors, central processing units, state machines, logic circuitries, and/or any devices that manipulate signals based on operational instructions. In some examples, the processor(s) 1308 can be one or more hardware processors and/or logic circuits of any suitable type specifically programmed or configured to execute the algorithms and processes described herein. The processor(s) 1308 can be configured to fetch and execute computer-readable processor-executable instructions stored in the computer-readable media 1310.

Depending on the configuration of the user device 1302, the computer-readable media 1310 can be an example of tangible non-transitory computer storage media and can include volatile and nonvolatile memory and/or removable and non-removable media implemented in any type of technology for storage of information such as computer-readable processor-executable instructions, data structures, program components or other data. The computer-readable media 1310 can include, but is not limited to, RAM, ROM, EEPROM, flash memory, solid-state storage, magnetic disk storage, optical storage, and/or other computer-readable media technology. Further, in some examples, the user device 1302 can access external storage, such as RAID storage systems, storage arrays, network attached storage, storage area networks, cloud storage, or any other medium that can be used to store information and that can be accessed by the processor(s) 1308 directly or through another computing device or network. Accordingly, the computer-readable media 1310 can be computer storage media able to store instructions, components or components that can be executed by the processor(s) 1308. Further, when mentioned, non-transitory computer-readable media exclude media such as energy, carrier signals, electromagnetic waves, and signals per se.

The computer-readable media 1310 can be used to store and maintain any number of functional components that are executable by the processor(s) 1308. In some implementations, these functional components comprise instructions or programs that are executable by the processor(s) 1308 and that, when executed, implement operational logic for performing the actions and services attributed above to the user device 1302. Functional components stored in the computer-readable media 1310 can include an event tracking component 1335 that tracks event status as discussed with respect to the event tracking system(s) 115, a conditional transaction component 1336 that sets up and manages conditional transactions as discussed with respect to the conditional asset transfer system(s) 130, an asset management component 1338 that manages assets and asset accounts as discussed with respect to the asset management system(s) 150, and other components and data 1340.

Depending on the type of the user device 1302, the computer-readable media 1310 can also optionally include other functional components and data, such as other components and data 1322, which can include programs, drivers, etc., and the data used or generated by the functional components. In addition, the computer-readable media 1310 can also store data, data structures and the like, that are used by the functional components. Further, the user device 1302 can include many other logical, programmatic and physical components, of which those described are merely examples that are related to the discussion herein.

In at least one example, the computer-readable media 1310 can include additional functional components, such as an operating system 1324 for controlling and managing various functions of the user device 1302 and for enabling basic user interactions.

The communication interface(s) 1312 can include one or more interfaces and hardware components for enabling communication with various other devices, such as over the network(s) 1306 or directly. For example, communication interface(s) 1312 can enable communication through one or more network(s) 1306, which can include, but are not limited any type of network known in the art, such as a local area network or a wide area network, such as the Internet, and can include a wireless network, such as a cellular network, a cloud network, a local wireless network, such as Wi-Fi and/or close-range wireless communications, such as Bluetooth®, BLE, NFC, RFID, a wired network, or any other such network, or any combination thereof. Accordingly, network(s) 1306 can include both wired and/or wireless communication technologies, including Bluetooth®, BLE, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail.

Embodiments of the disclosure may be provided to users through a cloud computing infrastructure. Cloud computing refers to the provision of scalable computing resources as a service over a network, to enable convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

The user device 1302 can further include one or more input/output (I/O) devices 1314. The I/O devices 1314 can include speakers, a microphone, a camera, and various user controls (e.g., buttons, a joystick, a keyboard, a keypad, etc.), a haptic output device, and so forth. The I/O devices 1314 can also include attachments that leverage the accessories (audio-jack, USB-C, Bluetooth, etc.) to connect with the user device 1302.

In at least one example, user device 1302 can include a display 1316. Depending on the type of computing device(s) used as the user device 1302, the display 1316 can employ any suitable display technology. For example, the display 1316 can be a liquid crystal display, a plasma display, a light emitting diode display, an OLED (organic light-emitting diode) display, an electronic paper display, or any other suitable type of display able to present digital content thereon. In at least one example, the display 1316 can be an augmented reality display, a virtually reality display, or any other display able to present and/or project digital content. In some examples, the display 1316 can have a touch sensor associated with the display 1316 to provide a touchscreen display configured to receive touch inputs for enabling interaction with a graphic interface presented on the display 1316. Accordingly, implementations herein are not limited to any particular display technology. Alternatively, in some examples, the user device 1302 may not include the display 1316, and information can be presented by other means, such as aurally, haptically, etc.

In addition, the user device 1302 can include sensor(s) 1318. The sensor(s) 1318 can include a GPS device able to indicate location information. Further, the sensor(s) 1318 can include, but are not limited to, an accelerometer, gyroscope, compass, proximity sensor, camera, microphone, and/or a switch.

In some example, the GPS device can be used to identify a location of a user. In at least one example, the location of the user can be used by the service provider, described above, to provide one or more services. That is, in some examples, the service provider can implement geofencing to provide particular services to users. As an example, with a lending service, location can be used to confirm that a stated purpose of a loan corresponds to evidence of use (e.g., Is the user using the loan consistent with what he or she said he or she was going to use it for?). Furthermore, in some examples, location can be used for payroll purposes. As an example, if a contractor completes a project, the contractor can provide a geo-tagged image (e.g., tagged based on location information availed by the GPS device). In some examples, location can be used for facilitating peer-to-peer payments between nearby users 914 and/or for sending users 914 notifications regarding available appointments with merchant(s) located proximate to the users 914. In at least one example, location can be used for taking payments from nearby customers when they leave a geofence, or location can be used to initiate an action responsive to users 914 enter a brick-and-mortar store of a merchant. Location can be used in additional or alternative ways as well.

Additionally, the user device 1302 can include various other components that are not shown, examples of which include removable storage, a power source, such as a battery and power control unit, a barcode scanner, a printer, a cash drawer, and so forth.

In addition, in some examples, the user device 1302 can include, be connectable to, or otherwise be coupled to a reader device 1326, for reading payment instruments and/or identifiers associated with payment objects. In some examples, as described above, the reader device 1326 can plug in to a port in the user device 1302, such as a microphone port, a headphone port, an audio-jack, a data port, or other suitable port. In additional or alternative examples, the reader device 1326 can be coupled to the user device 1302 via another wired or wireless connection, such as via a Bluetooth®, BLE, and so on. The reader device 1326 can include a read head for reading a magnetic strip of a payment card, and further can include encryption technology for encrypting the information read from the magnetic strip. Additionally or alternatively, the reader device 1326 can be an EMV payment reader, which in some examples, can be embedded in the user device 1302. Moreover, numerous other types of readers can be employed with the user device 1302 herein, depending on the type and configuration of the user device 1302.

The reader device 1326 may be a portable magnetic stripe card reader, optical scanner, smartcard (card with an embedded IC chip) reader (e.g., an EMV-compliant card reader or short-range communication-enabled reader), RFID reader, or the like, configured to detect and obtain data off any payment instrument. Accordingly, the reader device 1326 may include hardware implementation, such as slots, magnetic tracks, and rails with one or more sensors or electrical contacts to facilitate detection and acceptance of a payment instrument. That is, the reader device 1326 may include hardware implementations to enable the reader device 1326 to interact with a payment instrument via a swipe (i.e., a card-present transaction where a customer slides a card having a magnetic strip through a payment reader that captures payment data contained in the magnetic strip), a dip (i.e., a card-present transaction where a customer inserts a card having an embedded microchip (i.e., chip) into a payment reader first until the payment reader prompts the customer to remove the card), or a tap (i.e., a card-present transaction where a customer may tap or hover his or her electronic device such as a smart phone running a payment application over a payment reader to complete a transaction via short-range communication) to obtain payment data associated with a customer. Additionally or optionally, the reader device 1326 may also include a biometric sensor to receive and process biometric characteristics and process them as payment instruments, given that such biometric characteristics are registered with the event-based transfer system 100.

The reader device 1326 may include processing unit(s), computer-readable media, a reader chip, a transaction chip, a timer, a clock, a network interface, a power supply, and so on. The processing unit(s) of the reader device 1326 may execute one or more components and/or processes to cause the reader device 1326 to perform a variety of functions, as set forth above and explained in further detail in the following disclosure. In some examples, the processing unit(s) may include a central processing unit (CPU), a graphics processing unit (GPU), a CPU and a GPU, or processing units or components known in the art. Additionally, each of the processing unit(s) may possess its own local memory, which also may store program components, program data, and/or one or more operating systems. Depending on the exact configuration and type of the reader device 1326, the computer-readable media may include volatile memory (such as RAM), non-volatile memory (such as ROM, flash memory, miniature hard drive, memory card, or the like), or some combination thereof. In at least one example, the computer-readable media of the reader device 1326 may include at least one component for performing various functions as described herein.

The reader chip may perform functionalities to control the operations and processing of the reader device 1326. That is, the reader chip may perform functionalities to control payment interfaces (e.g., a contactless interface, a contact interface, etc.), a wireless communication interface, a wired interface, a user interface (e.g., a signal condition device (FPGA)), etc. Additionally, the reader chip may perform functionality to control the timer, which may provide a timer signal indicating an amount of time that has lapsed following a particular event (e.g., an interaction, a power-down event, etc.). Moreover, the reader chip may perform functionality to control the clock, which may provide a clock signal indicating a time. Furthermore, the reader chip may perform functionality to control the network interface, which may interface with the network(s) 1306, as described below.

Additionally, the reader chip may perform functionality to control the power supply. The power supply may include one or more power supplies such as a physical connection to AC power or a battery. Power supply may include power conversion circuitry for converting AC power and generating a plurality of DC voltages for use by components of reader device 1326. When power supply includes a battery, the battery may be charged via a physical power connection, via inductive charging, or via any other suitable method.

The transaction chip may perform functionalities relating to processing of payment transactions, interfacing with payment instruments, cryptography, and other payment-specific functionality. That is, the transaction chip may access payment data associated with a payment instrument and may provide the payment data to a POS terminal, as described above. The payment data may include, but is not limited to, a name of the customer, an address of the customer, a type (e.g., credit, debit, etc.) of a payment instrument, a number associated with the payment instrument, a verification value (e.g., PIN Verification Key Indicator (PVKI), PIN Verification Value (PVV), Card Verification Value (CVV), Card Verification Code (CVC), etc.) associated with the payment instrument, an expiration data associated with the payment instrument, a primary account number (PAN) corresponding to the customer (which may or may not match the number associated with the payment instrument), restrictions on what types of charges/debts may be made, etc. Additionally, the transaction chip may encrypt the payment data upon receiving the payment data.

It should be understood that in some examples, the reader chip may have its own processing unit(s) and computer-readable media and/or the transaction chip may have its own processing unit(s) and computer-readable media. In other examples, the functionalities of reader chip and transaction chip may be embodied in a single chip or a plurality of chips, each including any suitable combination of processing units and computer-readable media to collectively perform the functionalities of reader chip and transaction chip as described herein.

While, the user device 1302, which can be a POS terminal, and the reader device 1326 are shown as separate devices, in additional or alternative examples, the user device 1302 and the reader device 1326 can be part of a single device, which may be a battery-operated device. In such an example, components of both the user device 1302 and the reader device 1326 may be associated with the single device. In some examples, the reader device 1326 can have a display integrated therewith, which can be in addition to (or as an alternative of) the display 1316 associated with the user device 1302.

The server(s) 1304 can include one or more servers or other types of computing devices that can be embodied in any number of ways. For example, in the example of a server, the components, other functional components, and data can be implemented on a single server, a cluster of servers, a server farm or data center, a cloud-hosted computing service, a cloud-hosted storage service, and so forth, although other computer architectures can additionally or alternatively be used.

Further, while the figures illustrate the components and data of the server(s) 1304 as being present in a single location, these components and data can alternatively be distributed across different computing devices and different locations in any manner. Consequently, the functions can be implemented by one or more server computing devices, with the various functionality described above distributed in various ways across the different computing devices. Multiple server(s) 1304 can be located together or separately, and organized, for example, as virtual servers, server banks and/or server farms. The described functionality can be provided by the servers of a single merchant or enterprise, or can be provided by the servers and/or services of multiple different customers or enterprises.

In the illustrated example, the server(s) 1304 can include one or more processors 1328, one or more computer-readable media 1330, one or more I/O devices 1332, and one or more communication interfaces 1334. Each processor 1328 can be a single processing unit or a number of processing units, and can include single or multiple computing units or multiple processing cores. The processor(s) 1328 can be implemented as one or more microprocessors, microcomputers, microcontrollers, digital signal processors, central processing units, state machines, logic circuitries, and/or any devices that manipulate signals based on operational instructions. For example, the processor(s) 1328 can be one or more hardware processors and/or logic circuits of any suitable type specifically programmed or configured to execute the algorithms and processes described herein. The processor(s) 1328 can be configured to fetch and execute computer-readable instructions stored in the computer-readable media 1330, which can program the processor(s) 1328 to perform the functions described herein.

The computer-readable media 1330 can include volatile and nonvolatile memory and/or removable and non-removable media implemented in any type of technology for storage of information, such as computer-readable instructions, data structures, program components, or other data. Such computer-readable media 1330 can include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the server(s) 1304, the computer-readable media

1330 can be a type of computer-readable storage media and/or can be a tangible non-transitory media to the extent that when mentioned, non-transitory computer-readable media exclude media such as energy, carrier signals, electromagnetic waves, and signals per se.

The computer-readable media 1330 can be used to store any number of functional components that are executable by the processor(s) 1328. In many implementations, these functional components comprise instructions or programs that are executable by the processors 1328 and that, when executed, specifically configure the one or more processors 1328 to perform the actions attributed above to the service provider and/or payment processing service. Functional components stored in the computer-readable media 1310 can include a event tracking component 1335 that tracks event status as discussed with respect to the event tracking system(s) 115, a conditional transaction component 1336 that sets up and manages conditional transactions as discussed with respect to the conditional asset transfer system(s) 130, an asset management component 1338 that manages assets and asset accounts as discussed with respect to the asset management system(s) 150, and other components and data 1340.

Further, the one or more other components and data 1340 can include programs, drivers, etc., and the data used or generated by the functional components, such as any elements described herein as used by the event-based transfer system 100. Further, the server(s) 1304 can include many other logical, programmatic and physical components, of which those described above are merely examples that are related to the discussion herein.

The one or more "components" referenced herein may be implemented as more components or as fewer components, and functions described for the components may be redistributed depending on the details of the implementation. The term "component," as used herein, refers broadly to software stored on non-transitory storage medium (e.g., volatile or non-volatile memory for a computing device), hardware, or firmware (or any combination thereof) components. Modules are typically functional such that they that may generate useful data or other output using specified input(s). A component may or may not be self-contained. An application program (also called an "application") may include one or more components, or a component may include one or more application programs that can be accessed over a network or downloaded as software onto a device (e.g., executable code causing the device to perform an action). An application program (also called an "application") may include one or more components, or a component may include one or more application programs. In additional and/or alternative examples, the component(s) may be implemented as computer-readable instructions, various data structures, and so forth via at least one processing unit to configure the computing device(s) described herein to execute instructions and to perform operations as described herein.

In some examples, a component may include one or more application programming interfaces (APIs) to perform some or all of its functionality (e.g., operations). In at least one example, a software developer kit (SDK) can be provided by the service provider to allow third-party developers to include service provider functionality and/or avail service provider services in association with their own third-party applications. Additionally or alternatively, in some examples, the service provider can utilize a SDK to integrate third-party service provider functionality into its applications. That is, API(s) and/or SDK(s) can enable third-party developers to customize how their respective third-party applications interact with the service provider or vice versa.

The computer-readable media 1330 can additionally include an operating system 1342 for controlling and managing various functions of the server(s) 1304.

The communication interface(s) 1334 can include one or more interfaces and hardware components for enabling communication with various other devices, such as over the network(s) 1306 or directly. For example, communication interface(s) 1334 can enable communication through one or more network(s) 1306, which can include, but are not limited any type of network known in the art, such as a local area network or a wide area network, such as the Internet, and can include a wireless network, such as a cellular network, a local wireless network, such as Wi-Fi and/or close-range wireless communications, such as Bluetooth®, BLE, NFC, RFID, a wired network, or any other such network, or any combination thereof. Accordingly, network(s) 1306 can include both wired and/or wireless communication technologies, including Bluetooth®, BLE, Wi-Fi and cellular communication technologies, as well as wired or fiber optic technologies. Components used for such communications can depend at least in part upon the type of network, the environment selected, or both. Protocols for communicating over such networks are well known and will not be discussed herein in detail.

The server(s) 1304 can further be equipped with various I/O devices 1332. Such I/O devices 1332 can include a display, various user interface controls (e.g., buttons, joystick, keyboard, mouse, touch screen, biometric or sensory input devices, etc.), audio speakers, connection ports and so forth.

In at least one example, the system 1300 can include a datastore 1344 that can be configured to store data that is accessible, manageable, and updatable. In some examples, the datastore 1344 can be integrated with the user device 1302 and/or the server(s) 1304. In other examples, as shown in FIG. 13, the datastore 1344 can be located remotely from the server(s) 1304 and can be accessible to the server(s) 1304. The datastore 1344 can comprise multiple databases and/or servers connected locally and/or remotely via the network(s) 1306.

In at least one example, the datastore 1344 can store user profiles, which can include merchant profiles, customer profiles, and so on.

Merchant profiles can store, or otherwise be associated with, data associated with merchants. For instance, a merchant profile can store, or otherwise be associated with, information about a merchant (e.g., name of the merchant, geographic location of the merchant, operating hours of the merchant, employee information, etc.), a merchant category classification (MCC), item(s) offered for sale by the merchant, hardware (e.g., device type) used by the merchant, transaction data associated with the merchant (e.g., transactions conducted by the merchant, payment data associated with the transactions, items associated with the transactions, descriptions of items associated with the transactions, itemized and/or total spends of each of the transactions, parties to the transactions, dates, times, and/or locations associated with the transactions, etc.), loan information associated with the merchant (e.g., previous loans made to the merchant, previous defaults on said loans, etc.), risk information associated with the merchant (e.g., indications of risk, instances of fraud, chargebacks, etc.), appointments information (e.g., previous appointments, upcoming (scheduled) appointments, timing of appointments, lengths of appointments, etc.), payroll information (e.g., employees, payroll frequency, payroll amounts, etc.), employee information, reservations data (e.g., previous reservations, upcoming (scheduled) reservations, interactions associated with such reservations, etc.), inventory data, customer service data, etc. The merchant profile can securely store bank account information as provided by the merchant. Further, the merchant profile can store payment information associated with a payment instrument linked to a stored balance of the merchant, such as a stored balance maintained in a ledger by the service provider.

Customer profiles can store customer data including, but not limited to, customer information (e.g., name, phone number, address, banking information, etc.), customer preferences (e.g., learned or customer-specified), purchase history data (e.g., identifying one or more items purchased (and respective item information), payment instruments used to purchase one or more items, returns associated with one or more orders, statuses of one or more orders (e.g., preparing, packaging, in transit, delivered, etc.), etc.), appointments data (e.g., previous appointments, upcoming (scheduled) appointments, timing of appointments, lengths of appointments, etc.), payroll data (e.g., employers, payroll frequency, payroll amounts, etc.), reservations data (e.g., previous reservations, upcoming (scheduled) reservations, reservation duration, interactions associated with such reservations, etc.), inventory data, customer service data, etc.

In at least one example, the account(s) 160 described above with reference to FIG. 1, can include or be associated with the merchant profiles and/or customer profiles described above.

Furthermore, in at least one example, the datastore 1344 can store inventory database(s) and/or catalog database(s). As described above, an inventory can store data associated with a quantity of each item that a merchant has available to the merchant. Furthermore, a catalog can store data associated with items that a merchant has available for acquisition. The datastore 1344 can store additional or alternative types of data as described herein.

The phrases "in some examples," "according to various examples," "in the examples shown," "in one example," "in other examples," "various examples," "some examples," and the like generally mean the particular feature, structure, or characteristic following the phrase is included in at least one example of the present invention, and may be included in more than one example of the present invention. In addition, such phrases do not necessarily refer to the same examples or to different examples.

If the specification states a component or feature "can," "may," "could," or "might" be included or have a characteristic, that particular component or feature is not required to be included or have the characteristic.

Further, the aforementioned description is directed to devices and applications that are related to payment technology. However, it will be understood, that the technology can be extended to any device and application. Moreover, techniques described herein can be configured to operate irrespective of the kind of payment object reader, POS terminal, web applications, mobile applications, POS topologies, payment cards, computer networks, and environments.

Various figures included herein are flowcharts showing example methods involving techniques as described herein. The methods illustrated are described with reference to components described in the figures for convenience and ease of understanding. However, the methods illustrated are not limited to being performed using components described the figures and such components are not limited to performing the methods illustrated herein.

Furthermore, the methods described above are illustrated as collections of blocks in logical flow graphs, which represent sequences of operations that can be implemented in hardware, software, or a combination thereof. In the context of software, the blocks represent computer-executable instructions stored on one or more computer-readable storage media that, when executed by processor(s), perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In some embodiments, one or more blocks of the process can be omitted entirely. Moreover, the methods can be combined in whole or in part with each other or with other methods.

Illustrative aspects of the disclosure include:

Aspect 1. A method implemented by at least one computing device of an asset transfer service, the method comprising: receiving, by the at least one computing device, a request to set up an automated transfer associated with a pending outcome of an event, wherein the automated transfer includes a transfer of an amount of an asset between a first account associated with a first user and a second account associated with a second user, and wherein the first user and the second user have agreed upon a direction of transfer of the amount of the asset based on a settled outcome of the event; generating, by the at least one computing device and based on the request, a record to be stored in a data store, the record identifying at least the automated transfer, the amount of the asset, a first identifier associated with the first user, a second identifier associated with the second user, and the event; determining, by the at least one computing device and based on the request, an information source that is configured to include information about the event; monitoring, in near-real-time and by the at least one computing device, information from the information source to track a status of the event; determining, by the at least one computing device and based on the information from the information source, the settled outcome of the event; and in response to determining the settled outcome of the event: automatically transmitting, from the at least one computing device to at least one user device, an alert indicating that the settled outcome of the event and the direction of transfer of the amount of the asset; causing the at least one user device to surface the alert within a local application on the at least one user device; and automatically facilitating, by the at least one computing device and based on the direction of transfer of the asset, the transfer of the amount of the asset between the first account and the second account.

Aspect 2. The method of Aspect 1, wherein the data store includes a distributed ledger, wherein the record is at least part of a payload of a block in the distributed ledger, wherein the record is associated with a smart contract, and wherein determining the settled outcome of the event and facilitating the transfer is associated with execution of the smart contract.

Aspect 3. The method of any of Aspects 1 to 2, further comprising: receiving, by the at least one computing device, contextual information associated with at least one of the first user or the second user; identifying, by the at least one computing device and based on the contextual information, the event as being relevant to at least one of the first user or the second user; and recommending, by the at least one computing device, the event to at least one of the first user or the second user.

Aspect 4. A method implemented by at least one computing device of an asset transfer service, the method comprising: receiving, by the at least one computing device, a request to set up an automated transfer associated with a pending outcome of an event, wherein the automated transfer includes a transfer of an amount of an asset between a first account associated with a user and a second account; generating, by the at least one computing device and based on the request, a record to be stored in a data store, the record identifying at least the automated transfer, the amount of the asset, a first identifier associated with the user, and the event; determining, by the at least one computing device and based on the request, an information source that is configured to include information about the event; monitoring, by the at least one computing device, information from the information source to track a status of the event; determining, by the at least one computing device and based on the information from the information source, a settled outcome of the event, wherein a direction of transfer of amount of the asset is based on the settled outcome of the event; and in response to determining the settled outcome of the event: automatically transmitting, from the at least one computing device to at least one user device, an alert indicating the settled outcome of the event and the direction of transfer of amount of the asset; causing the at least one user device to surface the alert within a local application on the at least one user device; and automatically facilitating, by the at least one computing device and based on the direction of transfer of the amount of the asset, the transfer of the amount of the asset between the first account and the second account.

Aspect 5. The method of Aspect 4, wherein the second account is associated with a second user.

Aspect 6. The method of any of Aspects 4 to 5, further comprising: receiving, by the at least one computing device and from a first user device associated with the user, agreement upon the direction of transfer of the amount of the asset based on the settled outcome of the event; and receiving, by the at least one computing device and from a second user device associated with the second user, agreement upon the direction of transfer of the amount of the asset based on the settled outcome of the event.

Aspect 7. The method of any of Aspects 4 to 6, wherein the data store includes a distributed ledger, wherein the record is at least part of a payload of a block in the distributed ledger, wherein the record is associated with a smart contract, and wherein determining the settled outcome of the event and facilitating the transfer is associated with execution of the smart contract.

Aspect 8. The method of any of Aspects 4 to 7, further comprising: receiving, by the at least one computing device, contextual information associated with the user; and identifying, by the at least one computing device, the event as being relevant to the user based on contextual information, wherein based at least in part on the identifying, an indication of the event is surfaced to the user at a time or a location relevant to the event.

Aspect 9. The method of any of Aspects 4 to 8, further comprising: transmitting, by the at least one computing device to a first account system, a first request for the first account system to earmark the amount of the asset in the first account to prevent a balance of the first account from falling below the amount of the asset before the transfer of the amount of the asset; and transmitting, by the at least one computing device to a second account system, a second request for the second account system to earmark the amount of the asset in the second account to prevent a balance of the second account from falling below the amount of the asset before the transfer of the amount of the asset.

Aspect 10. The method of any of Aspects 4 to 9, wherein the event is at least one of a sporting event, a gaming event, a chore event, an athletics event, a workout goal, a work event, a work goal, a financial goal, a dietary goal, or a personal challenge.

Aspect 11. The method of any of Aspects 4 to 10, wherein the information from the information source includes a news article from a news source, and wherein determining the settled outcome of the event based on the information from the information source includes determining the settled outcome of the event based on parsing the news article from the news source to find an indication of the settled outcome in the news article.

Aspect 12. The method of any of Aspects 4 to 11, wherein the information from the information source includes a feed from a social media platform, and wherein determining the settled outcome of the event based on the information from the information source includes determining the settled outcome of the event based on parsing the feed from the social media platform to find an indication of the settled outcome in the feed from the social media platform.

Aspect 13. The method of any of Aspects 4 to 12, wherein the information from the information source includes at least one image of a scene, and wherein determining the settled outcome of the event based on the information from the information source includes determining the settled outcome of the event based on an image analysis of the at least one image of the scene to detect an indication of the settled outcome depicted at least one image of the scene.

Aspect 14. The method of any of Aspects 4 to 13, wherein the information from the information source includes biometric sensor data from a wearable device, and wherein determining the settled outcome of the event based on the information from the information source includes determining the settled outcome of the event based on a sensor data analysis of the biometric sensor data from the wearable device to detect an indication of the settled outcome in the biometric sensor data from the wearable device.

Aspect 15. The method of any of Aspects 4 to 14, wherein the information from the information source includes a transaction history of the user, and wherein determining the settled outcome of the event based on the information from the information source includes determining the settled outcome of the event based on a tracking of the transaction history of the user to detect an indication of the settled outcome in the transaction history of the user.

Aspect 16. The method of any of Aspects 4 to 15, further comprising: predicting, by the at least one computing device, the settled outcome of the event based on the tracking of the status of the event; and preparing, by the at least one computing device and based on the predicting the settled outcome, at least a portion of the transfer of the amount of the asset before determining the settled outcome of the event.

Aspect 17. The method of any of Aspects 4 to 16, wherein the transfer of the amount of the asset between the first account and the second account is part of a transfer of a second amount of the asset between a first plurality of accounts and a second plurality of accounts, wherein the first plurality of accounts includes the first account, and wherein the second plurality of accounts includes the second account.

Aspect 18. The method of any of Aspects 4 to 17, further comprising: receiving, by the at least one computing device, an indication that the settled outcome is in dispute; delaying, by the at least one computing device, the facilitating of the transfer of the amount of the asset based on the indication until receipt of an indication of a resolution of the dispute; and receiving, by the at least one computing device, an indication of the resolution of the dispute.

Aspect 19. The method of any of Aspects 4 to 18, further comprising: receiving, by the at least one computing device, an indication of a change to the settled outcome; and in response to receiving the indication of the change to the settled outcome: automatically transmitting, from the at least one computing device to at least one user device, a second alert indicating the change; causing the at least one user device to surface the second alert within the local application on the at least one user device; and automatically facilitating, by the at least one computing device and based on the direction of transfer of the amount of the asset, a second transfer of the asset between the first account and the second account.

Aspect 20. A system of an asset transfer service, the system comprising: at least one memory; and at least one processor coupled to the at least one memory, the at least one processor configured to: receive a request to set up an automated transfer associated with a pending outcome of an event, wherein the automated transfer includes a transfer of an amount of an asset between a first account associated with a user and a second account; generate, based on the request, a record to be stored in a data store, the record identifying at least the automated transfer, the amount of the asset, a first identifier associated with the user, a second identifier associated with the second account, and the event; determine, based on the request, an information source that is configured to include information about the event; monitor information from the information source to track a status of the event; determine, based on the information from the information source, a settled outcome of the event, wherein a direction of transfer of amount of the asset is based on the settled outcome of the event; and in response to determining the settled outcome of the event: automatically transmit, to at least one user device, an alert indicating that the settled outcome of the event and the direction of transfer of amount of the asset; cause the at least one user device to surface the alert within a local application on the at least one user device; and automatically facilitate, based on the direction of transfer of the amount of the asset, the transfer of the amount of the asset between the first account and the second account.

Aspect 21. The system of Aspect 20, further comprising operation(s) and/or element(s) from any of Aspects 2 to 19.

Aspect 22. A non-transitory computer-readable medium having stored thereon instructions that, when executed by one or more processors, cause the one or more processors to perform operations according to any of Aspects 1 to 21.

Aspect 23. An apparatus for image processing, the apparatus comprising one or more means for performing operations according to any of Aspects 1 to 21.

What is claimed is:

1. A method implemented by at least one computing device of an asset transfer service, the method comprising:

receiving, by the at least one computing device and from a local application on at least one user device, a customized request to set up an automated transfer associated with a condition based on a pending outcome of an event occurring in a geographical area, wherein the automated transfer includes instructions to trigger a transfer of an amount of an asset between a first account associated with a first user and a second account associated with a second user, and wherein the instructions indicate a direction of transfer of the amount of the asset based on a settled outcome satisfying the condition;

generating, by the at least one computing device and based on the customized request, a customized record to be stored in a distributed ledger, the customized record identifying at least the condition, the automated transfer, the amount of the asset, a first identifier associated with the first account, a second identifier associated with the second account, and the event;

identifying, by the at least one computing device and based on the customized request, one or more sensors that capture sensor data associated with the geographical area during the event;

analyzing, by the at least one computing device and based on one or more event rules of the event, the sensor data using an object recognition algorithm to detect one or more representations in the sensor data of an object in the geographical area crossing a geographical threshold within the geographical area during the event to indicate a status change in the event, wherein the object crossing the geographical threshold is indicative of the status change in the event based on the one or more event rules of the event;

analyzing the sensor data by the at least one computing device and based on the one or more event rules to validate the status change in the event;

updating a status record of the event dynamically based on the status change in the event as indicated by the sensor data;

determining, by the at least one computing device and based on updating the status record of the event, the settled outcome of the event;

validating, through a quorum of computing devices associated with the distributed ledger and based on the sensor data and the one or more event rules, that the settled outcome satisfies the condition associated with the customized request, the quorum of computing devices including the at least one computing device, the quorum of computing devices being nodes of a distributed system associated with the distributed ledger; and in response to validating that the settled outcome satisfies the condition:

automatically transmitting, from the at least one computing device to the at least one user device, an alert indicating the settled outcome of the event and the direction of transfer of the amount of the asset;

causing the at least one user device to surface the alert within the local application on the at least one user device; and automatically facilitating, using at least one of the quorum of computing devices and via execution of the instructions and based on the direction of transfer of the asset, the transfer of the amount of the asset between the first account and the second account.

2. The method of claim 1, wherein the customized record is at least part of a payload of a block in the distributed ledger, wherein the customized record and the instructions are associated with a smart contract, and wherein determining the settled outcome of the event and facilitating the transfer is associated with execution of the instructions via the smart contract.

3. The method of claim 1, further comprising:

receiving, by the at least one computing device, contextual information associated with at least one of the first user or the second user;

identifying, by the at least one computing device and based on the contextual information, the event as being relevant to at least one of the first user or the second user; and recommending, by the at least one computing device, the event to at least one of the first user or the second user.

4. A method implemented by at least one computing device of an asset transfer service, the method comprising:

receiving, by the at least one computing device and from a local application on at least one user device, a customized request to set up an automated transfer associated with a condition based on a pending outcome of an event occurring in a geographical area, wherein the automated transfer includes instructions to trigger a transfer of an amount of an asset between a first account associated with a user and a second account;

generating, by the at least one computing device and based on the customized request, a customized record to be stored in a distributed ledger that is stored across a plurality of devices, the customized record identifying at least the condition, the automated transfer, the amount of the asset, a first identifier associated with the first account, and the event;

identifying, by the at least one computing device and based on the customized request, one or more sensors that capture sensor data associated with the geographical area during the event;

analyzing, by the at least one computing device and based on one or more event rules of the event, the sensor data using an object recognition algorithm to detect one or more representations in the sensor data of an object in the geographical area crossing a geographical threshold within the geographical area during the event to indicate a status change in the event, wherein the object crossing the geographical threshold is indicative of the status change in the event based on the one or more event rules of the event;

analyzing the sensor data by the at least one computing device and based on the one or more event rules to validate the status change in the event;

updating a status record of the event dynamically based on the status change in the event as indicated by the sensor data;

determining, by the at least one computing device and based on updating the status record of the event, a settled outcome of the event, wherein the instructions indicate a direction of transfer of the amount of the asset is based on the settled outcome of the event;

validating, through a quorum of computing devices associated with the distributed ledger and based on the sensor data and the one or more event rules, that the settled outcome satisfies the condition associated with the customized request, the quorum of computing devices including the at least one computing device, the quorum of computing devices being nodes of a distributed system associated with the distributed ledger; and in response to validating that the settled outcome satisfies the condition:

automatically transmitting, from the at least one computing device to the at least one user device, an alert indicating the settled outcome of the event and the direction of transfer of the amount of the asset;

causing the at least one user device to surface the alert within the local application on the at least one user device; and automatically facilitating, using at least one of the quorum of computing devices and based on the direction of transfer of the amount of the asset, the transfer of the amount of the asset between the first account and the second account.

5. The method of claim 4, further comprising:

receiving, by the at least one computing device and from a first user device associated with the user, agreement upon the direction of transfer of the amount of the asset based on the settled outcome of the event; and receiving, by the at least one computing device and from a second user device associated with a second user, agreement upon the direction of transfer of the amount of the asset based on the settled outcome of the event.

6. The method of claim 4, wherein the customized record is at least part of a payload of a block in the distributed ledger, wherein the customized record and the instructions are associated with a smart contract, and wherein determining the settled outcome of the event and facilitating the transfer is associated with execution of the instructions via the smart contract.

7. The method of claim 4, further comprising:

receiving, by the at least one computing device, contextual information associated with the user;

identifying, by the at least one computing device, the event as being relevant to the user based on the contextual information; and causing, based at least in part on the identifying, an indication of the event to surface at the at least one user device at least one of a time relevant to the event or a location relevant to the event.

8. The method of claim 4, further comprising:

transmitting, by the at least one computing device to a first account system, a first request for the first account system to earmark the amount of the asset in the first account to prevent a balance of the first account from falling below the amount of the asset before the transfer of the amount of the asset; and transmitting, by the at least one computing device to a second account system, a second request for the second account system to earmark the amount of the asset in the second account to prevent a balance of the second account from falling below the amount of the asset before the transfer of the amount of the asset.

9. The method of claim 4, further comprising:

receiving information from an information source, wherein the analyzing the sensor data includes analyzing the information and the sensor data to track the status record of the event, wherein the information from the information source includes a news article from a news source, and wherein determining the settled outcome of the event includes determining the settled outcome of the event based on parsing the news article from the news source to find an indication of the settled outcome in the news article.

10. The method of claim 4, further comprising:

receiving information from an information source, wherein the analyzing the sensor data includes analyzing the information and the sensor data to track the status record of the event, wherein the information from the information source includes a feed from a social media platform, and wherein determining the settled outcome of the event includes determining the settled outcome of the event based on parsing the feed from the social media platform to find an indication of the settled outcome in the feed from the social media platform.

11. The method of claim 4, wherein the sensor data includes at least one image of a scene in the geographical area, and wherein determining the settled outcome of the event includes determining the settled outcome of the event based on an image analysis of the at least one image of the scene to detect an indication of the settled outcome depicted in the at least one image of the scene.

12. The method of claim 4, wherein the sensor data includes biometric sensor data from a wearable device in the geographical area, and wherein determining the settled outcome of the event includes determining the settled outcome of the event based on a sensor data analysis of the biometric sensor data from the wearable device to detect an indication of the settled outcome in the biometric sensor data from the wearable device.

13. The method of claim 4, further comprising:

receiving information from an information source, wherein the analyzing the sensor data includes analyzing the information and the sensor data to track the status record of the event, wherein the information from the information source includes a transaction history of the user, and wherein determining the settled outcome of the event includes determining the settled outcome of the event based on a tracking of the transaction history of the user to detect an indication of the settled outcome in the transaction history of the user.

14. The method of claim 4, further comprising:

predicting the settled outcome of the event based on the status record of the event; and preparing, by the at least one computing device and based on the predicting the settled outcome, at least a portion of the transfer of the amount of the asset before determining the settled outcome of the event.

15. The method of claim 4, wherein the transfer of the amount of the asset between the first account and the second account is part of a transfer of a second amount of the asset between a first plurality of accounts and a second plurality of accounts, wherein the first plurality of accounts includes the first account, and wherein the second plurality of accounts includes the second account.

16. The method of claim 4, further comprising:

receiving, by the at least one computing device, an indication that the settled outcome is in dispute;

delaying, by the at least one computing device, the facilitating of the transfer of the amount of the asset based on the indication until receipt of an indication of a resolution of the dispute; and receiving, by the at least one computing device, the indication of the resolution of the dispute.

17. The method of claim 4, further comprising:

receiving, by the at least one computing device, an indication of a change to the settled outcome; and in response to receiving the indication of the change to the settled outcome:

automatically transmitting, from the at least one computing device to the at least one user device, a second alert indicating the change;

causing the at least one user device to surface the second alert within the local application on the at least one user device; and automatically facilitating, using at least one of the quorum of computing devices and based on the direction of transfer of the amount of the asset, a second transfer of the asset between the first account and the second account.

18. A system of an asset transfer service, the system comprising:

at least one memory; and at least one processor coupled to the at least one memory, the at least one processor configured to:

receive a customized request to set up an automated transfer associated with a condition based on a pending outcome of an event occurring in a geographical area, wherein the automated transfer includes instructions to trigger a transfer of an amount of an asset between a first account associated with a user and a second account;

generate, based on the customized request, a customized record to be stored in a distributed ledger that is stored across a plurality of devices, the customized record identifying at least the condition, the automated transfer, the amount of the asset, a first identifier associated with the first account, a second identifier associated with the second account, and the event;

identify, based on the customized request, one or more sensors that capture sensor data associated with the geographical area during the event;

analyze, based on one or more event rules of the event, the sensor data using an object recognition algorithm to detect one or more representations in the sensor data of an object in the geographical area crossing a geographical threshold within the geographical area during the event to indicate a status change in the event, wherein the object crossing the geographical threshold is indicative of the status change in the event based on the one or more event rules of the event;

analyze the sensor data based on the one or more event rules to validate the status change in the event;

update a status record of the event dynamically based on the status change in the event as indicated by the sensor data;

determine, based on updating the status record of the event, a settled outcome of the event, wherein the instructions indicate a direction of transfer of the amount of the asset is based on the settled outcome of the event;

validate, through a quorum of computing devices associated with the distributed ledger and based on the sensor data and the one or more event rules, that the settled outcome satisfies the condition associated with the customized request, the quorum of computing devices being nodes of a distributed system associated with the distributed ledger; and in response to validating that the settled outcome satisfies the condition:

automatically transmit, to at least one user device, an alert indicating the settled outcome of the event and the direction of transfer of amount of the asset;

cause the at least one user device to surface the alert within a local application on the at least one user device; and automatically facilitate, based on the direction of transfer of the amount of the asset, the transfer of the amount of the asset between the first account and the second account.

19. The method of claim 4, wherein identifying, by the at least one computing device and based on the customized request, the one or more sensors that capture the sensor data associated with the geographical area during the event, further includes:

causing, by the at least one computing device and based on the customized request, an image sensor to capture video data of at least a portion of the geographical area during the event; and causing, by the at least one computing device and based on the customized request, a second sensor to capture additional data associated with the geographical area during the event, wherein the second sensor is a different type of sensor that the image sensor.

20. The method of claim 4, wherein the sensor data is analyzed by a trained machine learning model associated with the at least one computing device.

* * * * *